(12) United States Patent
Derrig

(10) Patent No.: US 11,490,698 B2
(45) Date of Patent: Nov. 8, 2022

(54) JEWELRY AND METHODS OF FORMING THE SAME FROM MULTIPLE COMPONENTS

(71) Applicant: Frederick Goldman, Inc., New York, NY (US)

(72) Inventor: Andrew Derrig, Lynbrook, NY (US)

(73) Assignee: Frederick Goldman, Inc., New York, NY (US)

( * ) Notice: Subject to any disclaimer, the term of this patent is extended or adjusted under 35 U.S.C. 154(b) by 0 days.

(21) Appl. No.: 15/996,035

(22) Filed: Jun. 1, 2018

(65) Prior Publication Data

US 2018/0343993 A1 Dec. 6, 2018

Related U.S. Application Data

(60) Provisional application No. 62/514,590, filed on Jun. 2, 2017.

(51) Int. Cl.
*A44C 9/00* (2006.01)
*A44C 27/00* (2006.01)
(Continued)

(52) U.S. Cl.
CPC .............. *A44C 27/002* (2013.01); *A44C 9/00* (2013.01); *A44C 9/0015* (2013.01);
(Continued)

(58) Field of Classification Search
CPC ... A44C 5/0084; A44C 5/0092; A44C 9/0007; A44C 9/0015; A44C 9/0023; A44C 9/003
(Continued)

(56) References Cited

U.S. PATENT DOCUMENTS 1,586,606 A 6/1926 Cain et al.
4,226,094 A 10/1980 Wolpoff
(Continued)

FOREIGN PATENT DOCUMENTS

CN 104273811 1/2015
CN 204105057 1/2015
(Continued)

OTHER PUBLICATIONS

International Search Report and Written Opinion dated Aug. 29, 2018 in related International Application No. PCT/US18/35668 filed Jun. 1, 2018 (14 pages).

*Primary Examiner* — Jack W Lavinder
(74) *Attorney, Agent, or Firm* — Dentons US LLP

(57) ABSTRACT

In an under component having a proximal end and a distal end, the under component comprising a cylindrical portion extending from the proximal end to the distal end; wherein the proximal end includes a rim that extends laterally from the cylindrical portion and that is flush with the proximal end; the rim extending from the cylindrical portion, wherein the rim includes a proximal edge and a distal edge. An over component having a proximal end and a distal end and a rim having a proximal edge and a distal edge, wherein the distal end of the under component extending to a position flush with a proximal edge of the rim of the over component, wherein the distal end of the over component extending to a position flush with a distal edge of the rim of the under component. A central component, wherein the central component is coupled to the over component, and the over component is coupled to the under component

28 Claims, 19 Drawing Sheets

(51) Int. Cl.
*B23K 1/00* (2006.01)
*B22F 7/06* (2006.01)
*B22F 5/10* (2006.01)
*A44C 5/00* (2006.01)
*B22F 3/15* (2006.01)
*B22F 3/22* (2006.01)
*C22C 29/06* (2006.01)

(52) U.S. Cl.
CPC .......... *A44C 9/0023* (2013.01); *A44C 27/005* (2013.01); *A44C 27/006* (2013.01); *B23K 1/0008* (2013.01); *A44C 5/0092* (2013.01); *B22F 3/15* (2013.01); *B22F 3/225* (2013.01); *B22F 3/227* (2013.01); *B22F 5/106* (2013.01); *B22F 7/06* (2013.01); *B22F 2998/10* (2013.01); *B22F 2999/00* (2013.01); *C22C 29/06* (2013.01)

(58) Field of Classification Search
USPC ..................................................... 63/15, 15.1
See application file for complete search history.

(56) References Cited

U.S. PATENT DOCUMENTS

| | | | |
|---|---|---|---|
| 5,228,316 A | 7/1993 | Meyrowitz | |
| 5,678,428 A | 10/1997 | Pasquetti | |
| 5,701,765 A | 12/1997 | Cerqua | |
| 6,484,536 B1 * | 11/2002 | Gould | A44C 9/0023 |
| | | | 63/15 |
| 7,722,245 B2 | 5/2010 | Baba et al. | |
| 7,950,251 B2 | 5/2011 | Silvant | |
| 8,448,464 B2 * | 5/2013 | Varcin | A44C 9/02 |
| | | | 63/15.1 |
| 8,661,848 B2 | 3/2014 | Bisserier | |
| 9,398,792 B2 | 7/2016 | Liao | |
| 2001/0020369 A1 | 9/2001 | Hirano | |
| 2006/0090511 A1 * | 5/2006 | Boone | A44C 9/0015 |
| | | | 63/15.1 |
| 2009/0293541 A1 | 12/2009 | Webb | |
| 2011/0203316 A1 | 8/2011 | Aymes | |
| 2014/0265114 A1 | 9/2014 | Laniewicz | |
| 2015/0113809 A1 * | 4/2015 | Ng | A44C 27/002 |
| | | | 29/896.412 |
| 2016/0037882 A1 | 2/2016 | Heinz | |
| 2017/0035161 A1 | 2/2017 | Malo | |

FOREIGN PATENT DOCUMENTS

| | | |
|---|---|---|
| CN | 204969828 | 1/2016 |
| CN | 106360896 | 2/2017 |
| CN | 206043665 | 3/2017 |
| CN | 206043666 | 3/2017 |
| CN | 206043667 | 3/2017 |
| CN | 206043669 | 3/2017 |
| DE | 29719888 | 2/1998 |
| DE | 20019378 | 2/2001 |
| DE | 10238688 | 3/2004 |
| DE | 202008009307 | 11/2008 |
| DE | 202008013898 | 1/2009 |
| DE | 102009052274 | 5/2011 |
| EP | 1809136 | 7/2007 |
| FR | 2903581 | 1/2008 |
| KR | 20060083938 | 7/2006 |
| KR | 20110085685 | 7/2011 |
| KR | 101174049 | 8/2012 |
| RU | 108928 | 10/2011 |
| WO | WO2005102094 | 11/2005 |
| WO | WO2006026887 | 7/2007 |
| WO | WO200170067 | 10/2011 |
| WO | WO2013160755 | 10/2013 |
| WO | WO2016010395 | 1/2016 |

* cited by examiner

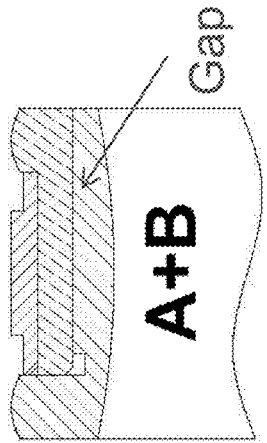

FIG. 7A

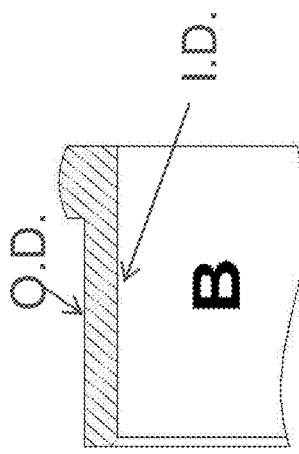

FIG. 7B

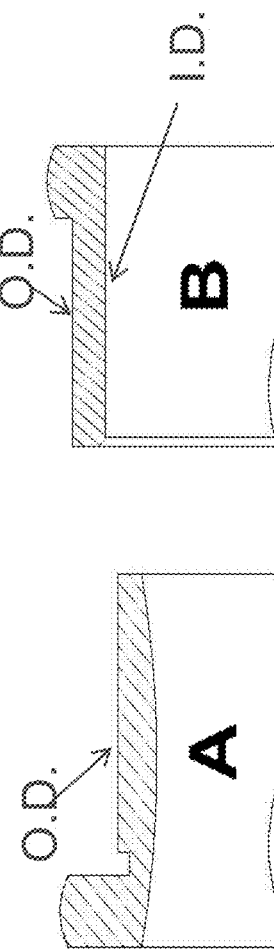

FIG. 7C

Compression fit

| Finger size | Tungsten Base A Inside diameter | | Tungsten Base A Outside diameter | | Gap size | | Tungsten Base B Inside diameter | | Tungsten Base B Outside diameter | | Insert specification Inside diameter | |
|---|---|---|---|---|---|---|---|---|---|---|---|---|
| | Tungsten Base A (I.D.) | Tolerance (mm) | Tungsten Base A (O.D.) | Tolerance (mm) | Size (mm) | Tolerance (mm) | Tungsten Base B (I.D.) | Tolerance (mm) | Tungsten Base B (O.D.) | Tolerance (mm) | Insert (I.D.) | Tolerance (mm) |
| 07.00 | 17.30mm | +/-0.10 | 19.30mm | +/-0.10 | 0.025mm | +/-.005 | 19.325mm | +/-0.10 | 20.95mm | 0.0mm | 21.00mm | -0.00/+0.05 |
| 07.50 | 17.70mm | +/-0.10 | 19.70mm | +/-0.10 | 0.025mm | +/-.005 | 19.725mm | +/-0.10 | 21.35mm | 0.0mm | 21.40mm | -0.00/+0.05 |
| 08.00 | 18.10mm | +/-0.10 | 20.10mm | +/-0.10 | 0.025mm | +/-.005 | 20.125mm | +/-0.10 | 21.75mm | 0.0mm | 21.80mm | -0.00/+0.05 |
| 08.50 | 18.50mm | +/-0.10 | 20.50mm | +/-0.10 | 0.025mm | +/-.005 | 20.525mm | +/-0.10 | 22.15mm | 0.0mm | 22.20mm | -0.00/+0.05 |
| 09.00 | 18.90mm | +/-0.10 | 20.90mm | +/-0.10 | 0.025mm | +/-.005 | 20.925mm | +/-0.10 | 22.55mm | 0.0mm | 22.60mm | -0.00/+0.05 |
| 09.50 | 19.40mm | +/-0.10 | 21.40mm | +/-0.10 | 0.025mm | +/-.005 | 21.425mm | +/-0.10 | 23.05mm | 0.0mm | 23.10mm | -0.00/+0.05 |
| 10.00 | 19.80mm | +/-0.10 | 21.80mm | +/-0.10 | 0.025mm | +/-.005 | 21.825mm | +/-0.10 | 23.45mm | 0.0mm | 23.50mm | -0.00/+0.05 |
| 10.50 | 20.20mm | +/-0.10 | 22.20mm | +/-0.10 | 0.025mm | +/-.005 | 22.225mm | +/-0.10 | 23.85mm | 0.0mm | 23.90mm | -0.00/+0.05 |
| 11.00 | 20.60mm | +/-0.10 | 22.60mm | +/-0.10 | 0.025mm | +/-.005 | 22.625mm | +/-0.10 | 24.25mm | 0.0mm | 24.30mm | -0.00/+0.05 |
| 11.50 | 21.00mm | +/-0.10 | 23.00mm | +/-0.10 | 0.025mm | +/-.005 | 23.025mm | +/-0.10 | 24.65mm | 0.0mm | 24.70mm | -0.00/+0.05 |
| 12.00 | 21.40mm | +/-0.10 | 23.40mm | +/-0.10 | 0.025mm | +/-.005 | 23.425mm | +/-0.10 | 25.05mm | 0.0mm | 25.10mm | -0.00/+0.05 |
| 12.50 | 21.80mm | +/-0.10 | 23.80mm | +/-0.10 | 0.025mm | +/-.005 | 23.825mm | +/-0.10 | 25.45mm | 0.0mm | 25.50mm | -0.00/+0.05 |
| 13.00 | 22.20mm | +/-0.10 | 24.20mm | +/-0.10 | 0.025mm | +/-.005 | 24.225mm | +/-0.10 | 25.85mm | 0.0mm | 25.90mm | -0.00/+0.05 |

FIG. 7D

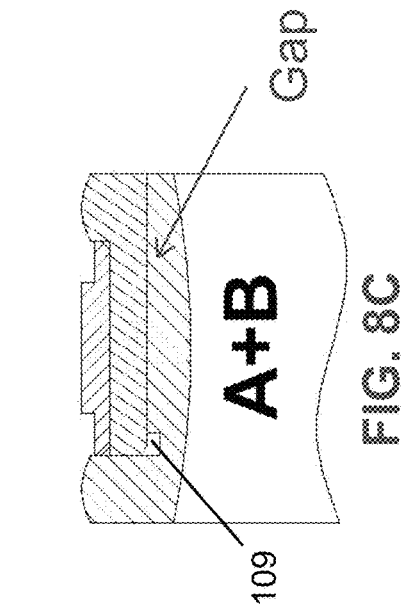
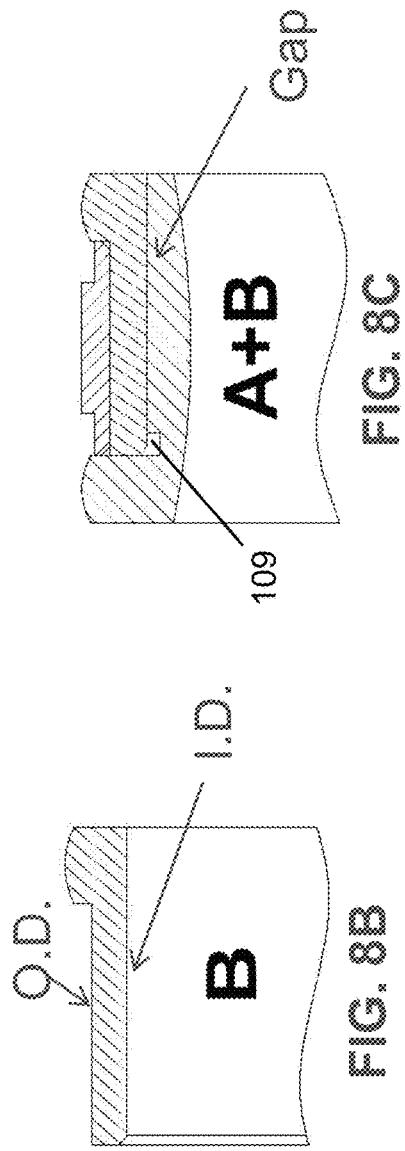
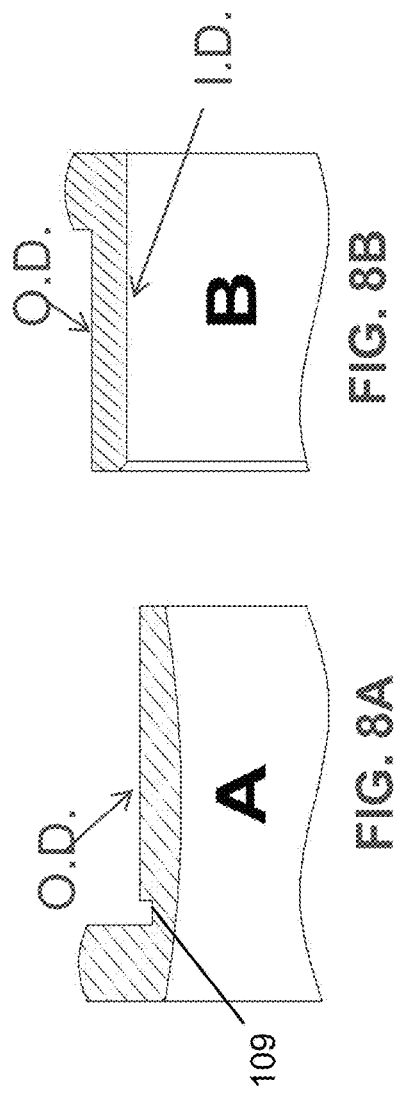

FIG. 8A  FIG. 8B  FIG. 8C

| Finger size | Tungsten Base A Inside diameter | | Tungsten Base A Outside diameter | | Gap size | | Tungsten Base B Inside diameter | | Tungsten Base B Outside diameter | | Insert specification Inside diameter | |
|---|---|---|---|---|---|---|---|---|---|---|---|---|
| | Tungsten Base A (I.D.) | Tolerance (mm) | Tungsten Base A (O.D.) | Tolerance (mm) | Size (mm) | Tolerance (mm) | Tungsten Base B (I.D.) | Tolerance (mm) | Tungsten Base B (O.D.) | Tolerance (mm) | Insert (I.D.) | Tolerance (mm) |
| 07.00 | 17.30mm | +/-0.10 | 19.30mm | +/-0.10 | 0.10mm | +/-.0025 | 19.40mm | +/-0.10 | 20.95mm | 0.0mm | 21.00mm | -0.00/+0.05 |
| 07.50 | 17.70mm | +/-0.10 | 19.70mm | +/-0.10 | 0.10mm | +/-.0025 | 19.80mm | +/-0.10 | 21.35mm | 0.0mm | 21.40mm | -0.00/+0.05 |
| 08.00 | 18.10mm | +/-0.10 | 20.10mm | +/-0.10 | 0.10mm | +/-.0025 | 20.20mm | +/-0.10 | 21.75mm | 0.0mm | 21.80mm | -0.00/+0.05 |
| 08.50 | 18.50mm | +/-0.10 | 20.50mm | +/-0.10 | 0.10mm | +/-.0025 | 20.60mm | +/-0.10 | 22.15mm | 0.0mm | 22.20mm | -0.00/+0.05 |
| 09.00 | 18.90mm | +/-0.10 | 20.90mm | +/-0.10 | 0.10mm | +/-.0025 | 21.00mm | +/-0.10 | 22.55mm | 0.0mm | 22.60mm | -0.00/+0.05 |
| 09.50 | 19.40mm | +/-0.10 | 21.40mm | +/-0.10 | 0.10mm | +/-.0025 | 21.50mm | +/-0.10 | 23.05mm | 0.0mm | 23.10mm | -0.00/+0.05 |
| 10.00 | 19.80mm | +/-0.10 | 21.80mm | +/-0.10 | 0.10mm | +/-.0025 | 21.90mm | +/-0.10 | 23.45mm | 0.0mm | 23.50mm | -0.00/+0.05 |
| 10.50 | 20.20mm | +/-0.10 | 22.20mm | +/-0.10 | 0.10mm | +/-.0025 | 22.30mm | +/-0.10 | 23.85mm | 0.0mm | 23.90mm | -0.00/+0.05 |
| 11.00 | 20.60mm | +/-0.10 | 22.60mm | +/-0.10 | 0.10mm | +/-.0025 | 22.70mm | +/-0.10 | 24.25mm | 0.0mm | 24.30mm | -0.00/+0.05 |
| 11.50 | 21.00mm | +/-0.10 | 23.00mm | +/-0.10 | 0.10mm | +/-.0025 | 23.10mm | +/-0.10 | 24.65mm | 0.0mm | 24.70mm | -0.00/+0.05 |
| 12.00 | 21.40mm | +/-0.10 | 23.40mm | +/-0.10 | 0.10mm | +/-.0025 | 23.50mm | +/-0.10 | 25.05mm | 0.0mm | 25.10mm | -0.00/+0.05 |
| 12.50 | 21.80mm | +/-0.10 | 23.80mm | +/-0.10 | 0.10mm | +/-.0025 | 23.90mm | +/-0.10 | 25.45mm | 0.0mm | 25.50mm | -0.00/+0.05 |
| 13.00 | 22.20mm | +/-0.10 | 24.20mm | +/-0.10 | 0.10mm | +/-.0025 | 24.30mm | +/-0.10 | 25.85mm | 0.0mm | 25.90mm | -0.00/+0.05 |

Slip-fit

FIG. 8D

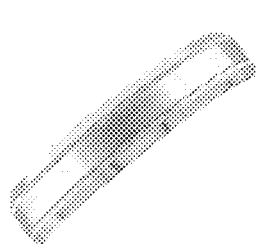
FIG. 14A
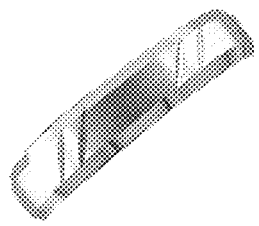
FIG. 14B
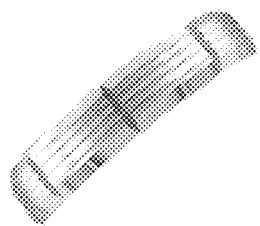
FIG. 14C
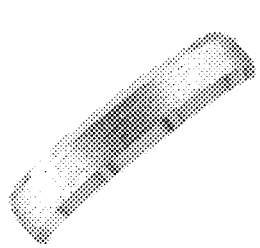
FIG. 14D
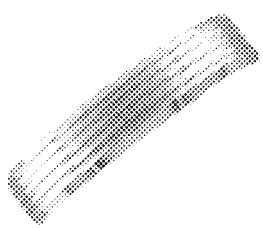
FIG. 14E
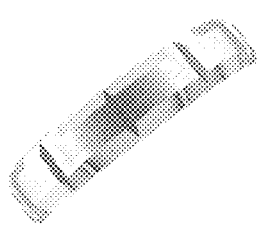
FIG. 14F
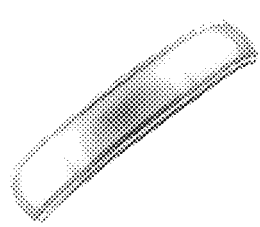
FIG. 14G
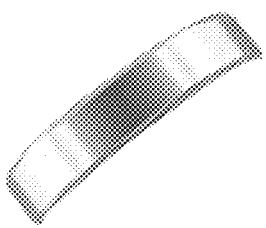
FIG. 14H
FIG. 15
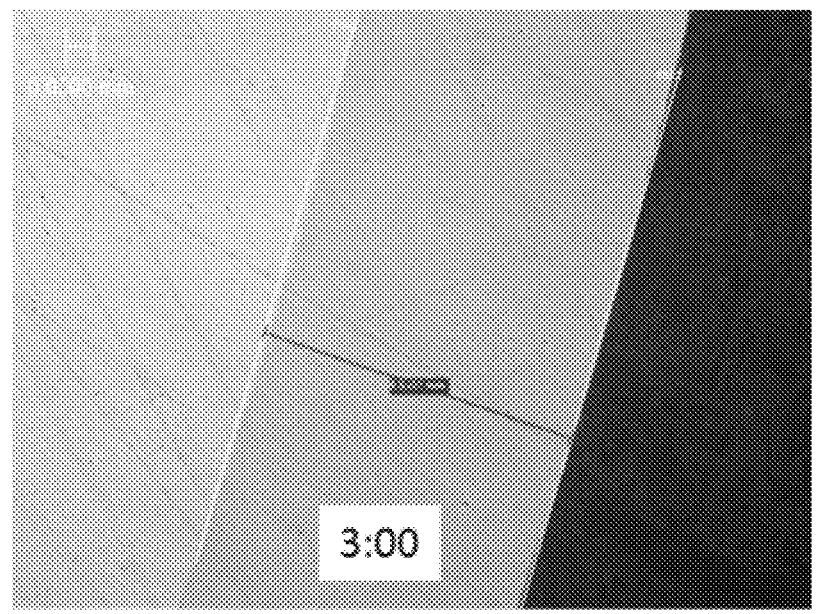
Layer thickness = 0.5391 mm

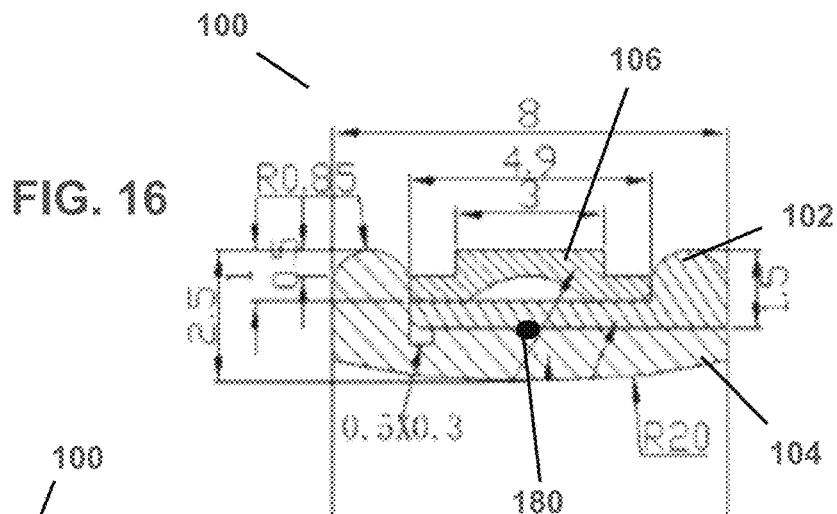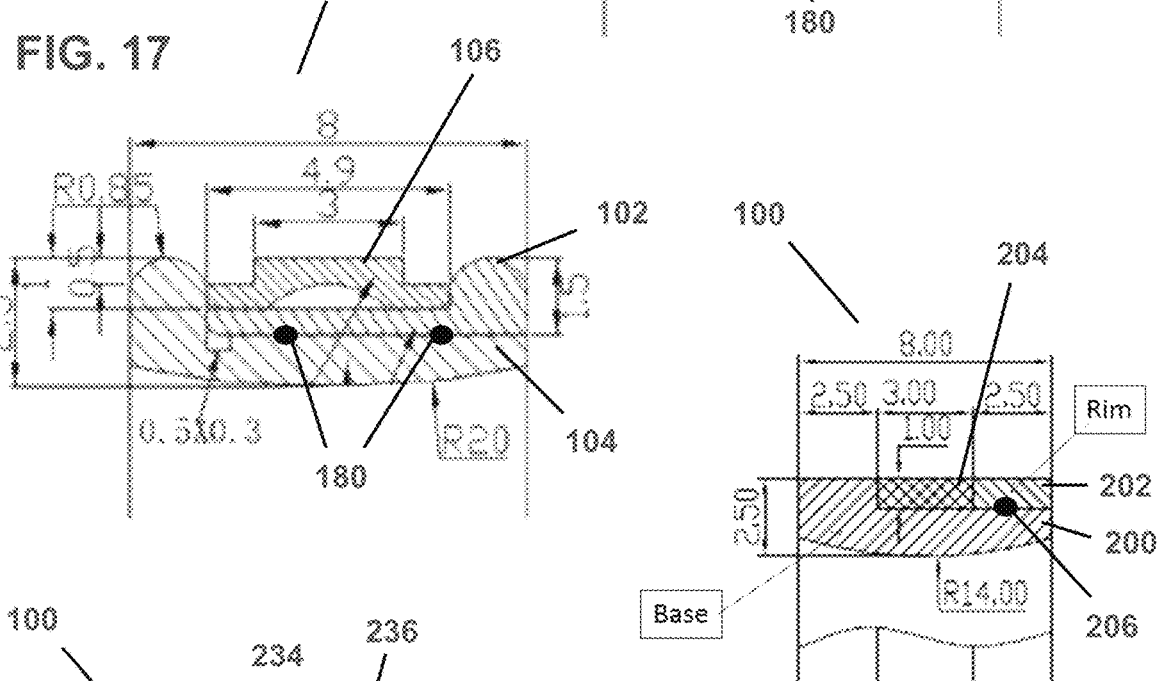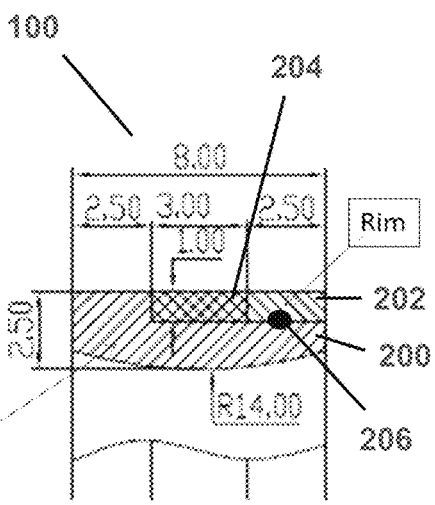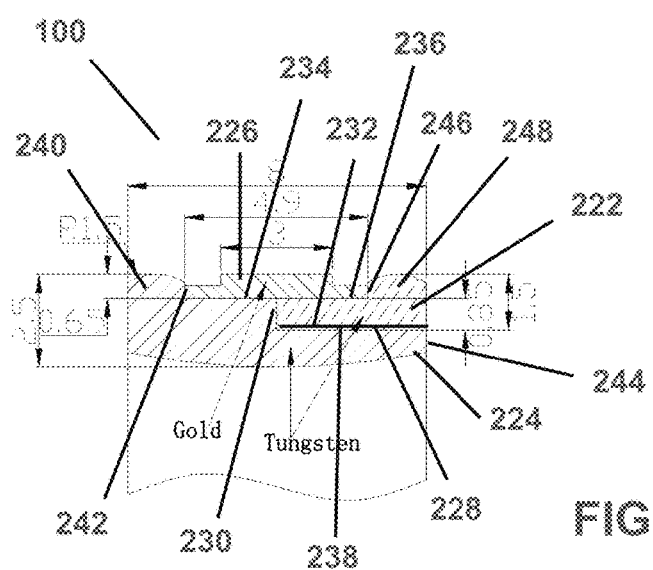

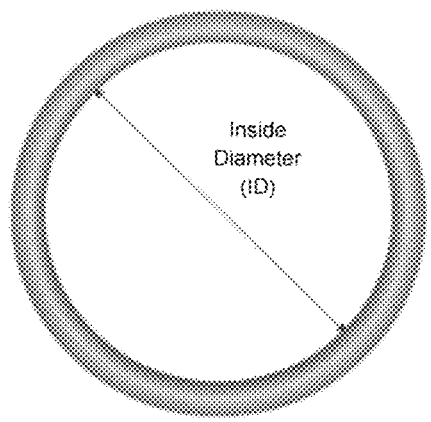
FIG. 20A
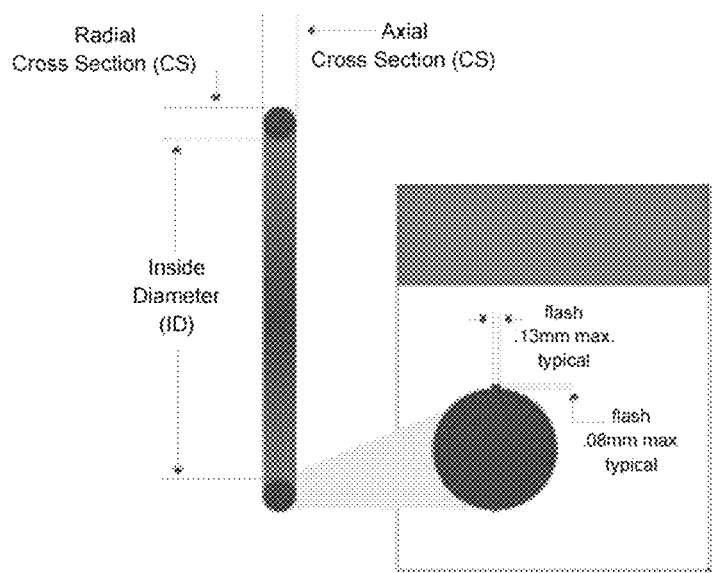
FIG. 20B
FIG. 20C

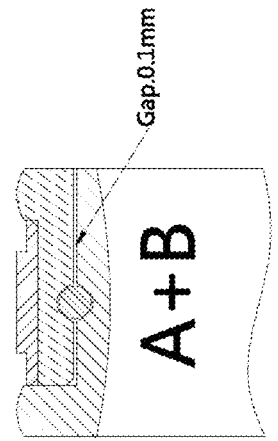

FIG. 21A

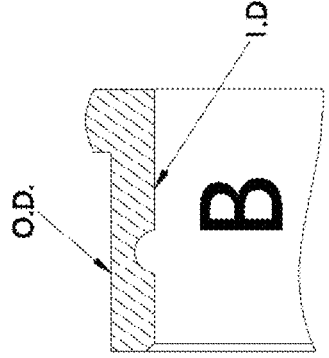

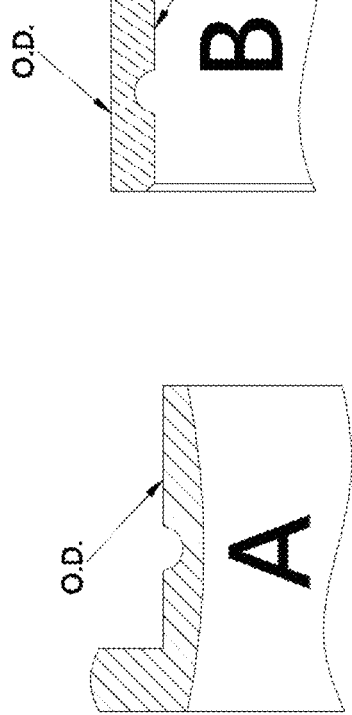

FIG. 21D

O-Ring construction

| Finger size | Tungsten Base A Inside diameter | | Tungsten Base A Outside diameter | | Gap size | | Tungsten Base B Inside diameter | | Tungsten Base B Outside diameter | | Insert specification Inside diameter | |
|---|---|---|---|---|---|---|---|---|---|---|---|---|
| | Tungsten Base A (I.D.) | Tolerance (mm) | Tungsten Base A (O.D.) | Tolerance (mm) | Size (mm) | Tolerance (mm) | Tungsten Base B (I.D.) | Tolerance (mm) | Tungsten Base B (O.D.) | Tolerance (mm) | Insert (I.D.) | Tolerance (mm) |
| 07.00 | 17.30mm | +/-0.10 | 19.30mm | +0.05/-0.00 | 0.1mm | +/-0.02 | 19.50mm | +0.00/-0.05 | 21.60mm | +0.00/-0.05 | 21.60mm | +0.05/-0.00 |
| 07.50 | 17.70mm | +/-0.10 | 19.70mm | +0.05/-0.00 | 0.1mm | +/-0.02 | 19.90mm | +0.00/-0.05 | 22.00mm | +0.00/-0.05 | 22.00mm | +0.05/-0.00 |
| 08.00 | 18.10mm | +/-0.10 | 20.10mm | +0.05/-0.00 | 0.1mm | +/-0.02 | 20.30mm | +0.00/-0.05 | 22.40mm | +0.00/-0.05 | 22.40mm | +0.05/-0.00 |
| 08.50 | 18.50mm | +/-0.10 | 20.50mm | +0.05/-0.00 | 0.1mm | +/-0.02 | 20.70mm | +0.00/-0.05 | 22.80mm | +0.00/-0.05 | 22.80mm | +0.05/-0.00 |
| 09.00 | 18.90mm | +/-0.10 | 20.90mm | +0.05/-0.00 | 0.1mm | +/-0.02 | 21.10mm | +0.00/-0.05 | 23.20mm | +0.00/-0.05 | 23.20mm | +0.05/-0.00 |
| 09.50 | 19.40mm | +/-0.10 | 21.40mm | +0.05/-0.00 | 0.1mm | +/-0.02 | 21.60mm | +0.00/-0.05 | 23.70mm | +0.00/-0.05 | 23.70mm | +0.05/-0.00 |
| 10.00 | 19.80mm | +/-0.10 | 21.80mm | +0.05/-0.00 | 0.1mm | +/-0.02 | 22.00mm | +0.00/-0.05 | 24.10mm | +0.00/-0.05 | 24.10mm | +0.05/-0.00 |
| 10.50 | 20.20mm | +/-0.10 | 22.20mm | +0.05/-0.00 | 0.1mm | +/-0.02 | 22.40mm | +0.00/-0.05 | 24.50mm | +0.00/-0.05 | 24.50mm | +0.05/-0.00 |
| 11.00 | 20.60mm | +/-0.10 | 22.60mm | +0.05/-0.00 | 0.1mm | +/-0.02 | 22.80mm | +0.00/-0.05 | 24.90mm | +0.00/-0.05 | 24.90mm | +0.05/-0.00 |
| 11.50 | 21.00mm | +/-0.10 | 23.00mm | +0.05/-0.00 | 0.1mm | +/-0.02 | 23.20mm | +0.00/-0.05 | 25.30mm | +0.00/-0.05 | 25.30mm | +0.05/-0.00 |
| 12.00 | 21.40mm | +/-0.10 | 23.40mm | +0.05/-0.00 | 0.1mm | +/-0.02 | 23.60mm | +0.00/-0.05 | 25.70mm | +0.00/-0.05 | 25.70mm | +0.05/-0.00 |
| 12.50 | 21.80mm | +/-0.10 | 23.80mm | +0.05/-0.00 | 0.1mm | +/-0.02 | 24.00mm | +0.00/-0.05 | 26.10mm | +0.00/-0.05 | 26.10mm | +0.05/-0.00 |
| 13.00 | 22.20mm | +/-0.10 | 24.20mm | +0.05/-0.00 | 0.1mm | +/-0.02 | 24.40mm | +0.00/-0.05 | 26.50mm | +0.00/-0.05 | 26.50mm | +0.05/-0.00 |

FIG. 21E

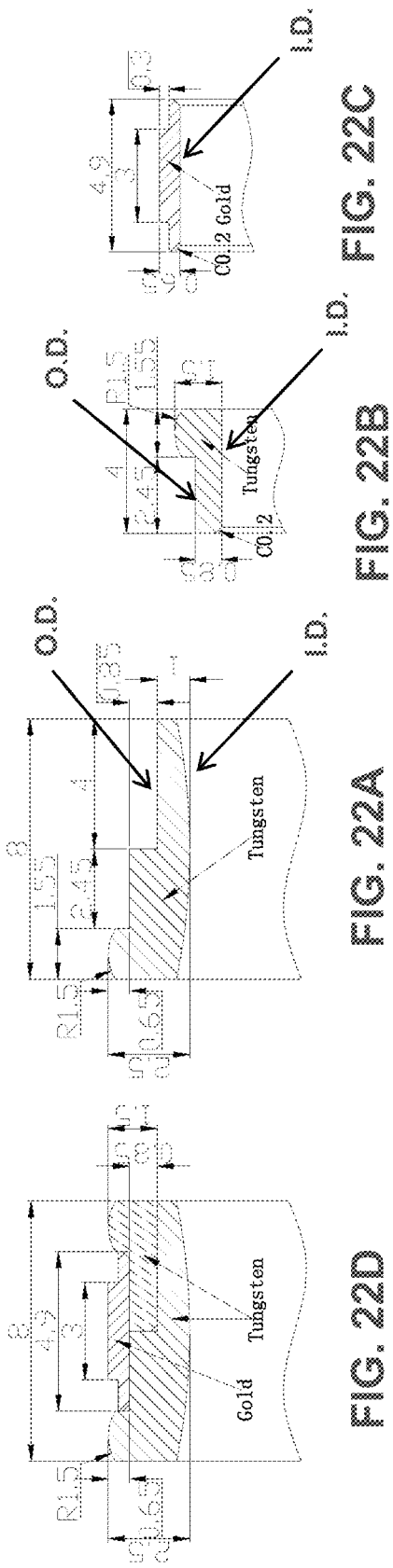

FIG. 22D  FIG. 22A  FIG. 22B  FIG. 22C

Step construction

| Finger size | Tungsten Base A Inside diameter | | Tungsten Base A Outside diameter | | Tungsten Base A Step diameter | | Gap size | | Tungsten Base B Inside diameter | | Tungsten Base B Outside diameter | | Insert specification Inside diameter | |
|---|---|---|---|---|---|---|---|---|---|---|---|---|---|---|
| | Tungsten Base A (I.D.) | Tolerance (mm) | Tungsten Base A (O.D.) | Tolerance (mm) | Tungsten Base A (O.D.) | Tolerance (mm) | Size (mm) | Tolerance (mm) | Tungsten Base B (I.D.) | Tolerance (mm) | Tungsten Base B (O.D.) | Tolerance (mm) | Insert (I.D.) | Tolerance (mm) |
| 07.00 | 17.30mm | +/-0.10 | 21.00mm | -0.05/+0.00 | 19.30mm | -0.05/+0.00 | 0.02mm | +/-.0025 | 19.30mm | -0.00/+0.05 | 21.00mm | -0.05/+0.00 | 21.00mm | -0.00/+0.05 |
| 07.50 | 17.70mm | +/-0.10 | 21.40mm | -0.05/+0.00 | 19.70mm | -0.05/+0.00 | 0.02mm | +/-.0025 | 19.70mm | -0.00/+0.05 | 21.40mm | -0.05/+0.00 | 21.40mm | -0.00/+0.05 |
| 08.00 | 18.10mm | +/-0.10 | 21.80mm | -0.05/+0.00 | 20.10mm | -0.05/+0.00 | 0.02mm | +/-.0025 | 20.10mm | -0.00/+0.05 | 21.80mm | -0.05/+0.00 | 21.80mm | -0.00/+0.05 |
| 08.50 | 18.50mm | +/-0.10 | 22.20mm | -0.05/+0.00 | 20.50mm | -0.05/+0.00 | 0.02mm | +/-.0025 | 20.50mm | -0.00/+0.05 | 22.20mm | -0.05/+0.00 | 22.20mm | -0.00/+0.05 |
| 09.00 | 18.90mm | +/-0.10 | 22.60mm | -0.05/+0.00 | 20.90mm | -0.05/+0.00 | 0.02mm | +/-.0025 | 20.90mm | -0.00/+0.05 | 22.60mm | -0.05/+0.00 | 22.60mm | -0.00/+0.05 |
| 09.50 | 19.40mm | +/-0.10 | 23.10mm | -0.05/+0.00 | 21.40mm | -0.05/+0.00 | 0.02mm | +/-.0025 | 21.40mm | -0.00/+0.05 | 23.10mm | -0.05/+0.00 | 23.10mm | -0.00/+0.05 |
| 10.00 | 19.80mm | +/-0.10 | 23.50mm | -0.05/+0.00 | 21.80mm | -0.05/+0.00 | 0.02mm | +/-.0025 | 21.80mm | -0.00/+0.05 | 23.50mm | -0.05/+0.00 | 23.50mm | -0.00/+0.05 |
| 10.50 | 20.20mm | +/-0.10 | 23.90mm | -0.05/+0.00 | 22.20mm | -0.05/+0.00 | 0.02mm | +/-.0025 | 22.20mm | -0.00/+0.05 | 23.90mm | -0.05/+0.00 | 23.90mm | -0.00/+0.05 |
| 11.00 | 20.60mm | +/-0.10 | 24.30mm | -0.05/+0.00 | 22.60mm | -0.05/+0.00 | 0.02mm | +/-.0025 | 22.60mm | -0.00/+0.05 | 24.30mm | -0.05/+0.00 | 24.30mm | -0.00/+0.05 |
| 11.50 | 21.00mm | +/-0.10 | 24.70mm | -0.05/+0.00 | 23.00mm | -0.05/+0.00 | 0.02mm | +/-.0025 | 23.00mm | -0.00/+0.05 | 24.70mm | -0.05/+0.00 | 24.70mm | -0.00/+0.05 |
| 12.00 | 21.40mm | +/-0.10 | 25.10mm | -0.05/+0.00 | 23.40mm | -0.05/+0.00 | 0.02mm | +/-.0025 | 23.40mm | -0.00/+0.05 | 25.10mm | -0.05/+0.00 | 25.10mm | -0.00/+0.05 |
| 12.50 | 21.80mm | +/-0.10 | 25.50mm | -0.05/+0.00 | 23.80mm | -0.05/+0.00 | 0.02mm | +/-.0025 | 23.80mm | -0.00/+0.05 | 25.50mm | -0.05/+0.00 | 25.50mm | -0.00/+0.05 |
| 13.00 | 22.20mm | +/-0.10 | 25.90mm | -0.05/+0.00 | 24.20mm | -0.05/+0.00 | 0.02mm | +/-.0025 | 24.20mm | -0.00/+0.05 | 25.90mm | -0.05/+0.00 | 25.90mm | -0.00/+0.05 |

FIG. 22E

| | C | W | Ta | Ti | Ni | Cr% | Fe | Mo% | Nb | Co | Mn | Cu | Cu | Al | Si | Zn | Ag | Au | Pt | Pd |
|---|---|---|---|---|---|---|---|---|---|---|---|---|---|---|---|---|---|---|---|---|
| Tungsten Carbide (Nickel) | 0.00% | 85.00% | 0.00% | 0.00% | 12.00% | 2.50% | 0.00% | 0.00% | 0.00% | 0.00% | 0.00% | 0.00% | 0.00% | 0.00% | 0.00% | 0.00% | 0.00% | 0.00% | 0.00% | 0.00% |
| Tungsten Carbide (hybrid) | 0.00% | 70.00% | 0.00% | 0.00% | 0.00% | 3.00% | 0.00% | 0.00% | 0.00% | 27.00% | 0.00% | 0.00% | 0.00% | 0.00% | 0.00% | 0.00% | 0.00% | 0.00% | 0.00% | 0.00% |
| Tungsten Carbide (Cobalt) | 0.00% | 85.00% | 0.00% | 0.00% | 0.00% | 2.50% | 0.00% | 0.00% | 0.00% | 12.00% | 0.00% | 0.00% | 0.00% | 0.00% | 0.00% | 0.00% | 0.00% | 0.00% | 0.00% | 0.00% |
| Tantalum (hybrid) | 4.99% | 10.70% | 59.50% | 0.02% | 19.40% | 0.08% | 0.12% | 0.00% | 0.00% | 0.23% | 0.00% | 0.00% | 0.00% | 0.00% | 0.00% | 0.00% | 0.00% | 0.00% | 0.00% | 0.00% |
| Tantalum Carbide (Nickel) | 0.00% | 0.00% | 85.00% | 0.00% | 12.00% | 2.50% | 0.00% | 0.00% | 0.00% | 0.00% | 0.00% | 0.00% | 0.00% | 0.00% | 0.00% | 0.00% | 0.00% | 0.00% | 0.00% | 0.00% |
| Tantalum Carbide (Cobalt) | 0.00% | 0.00% | 85.00% | 0.00% | 0.25% | 2.50% | 0.20% | 6.00% | 0.00% | 12.00% | 0.00% | 0.00% | 0.00% | 0.00% | 0.00% | 0.00% | 0.00% | 0.00% | 0.00% | 0.00% |
| Cobalt Chrome | 0.22% | 0.00% | 0.00% | 0.00% | 0.00% | 28.50% | 0.20% | 6.00% | 0.00% | 65.00% | 0.00% | 0.00% | 0.00% | 0.00% | 0.00% | 0.00% | 0.00% | 0.00% | 0.00% | 0.00% |
| Titanium | 0.00% | 0.00% | 0.00% | 99.90% | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| 316 Stainless steel | 0.00% | 0.00% | 0.00% | 0.00% | 12.00% | 17.00% | 65.00% | 2.50% | 0.00% | 0.00% | 2.00% | 0.00% | 0.00% | 0.00% | 1.00% | 0.00% | 0.00% | 0.00% | 0.00% | 0.00% |
| 9K gold | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% | 37.50% | 0.00% | 0.00% |
| 10K gold | 0.00% | 0.00% | 0.00% | 0.00% | 1.40% | 0.00% | 0.00% | 0.00% | 0.00% | 0.00% | 0.00% | 0.00% | 4.90% | 0.00% | 0.03% | 4.20% | 52.00% | 37.50% | 0.00% | 0.00% |
| 14K gold | 0.00% | 0.00% | 0.00% | 0.00% | 0.00% | 0.00% | 0.00% | 0.00% | 0.00% | 0.00% | 0.00% | 0.00% | 20.50% | 0.00% | 0.00% | 1.40% | 20.00% | 58.50% | 0.00% | 0.00% |
| 18k gold | 0.00% | 0.00% | 0.00% | 0.00% | 7.00% | 0.00% | 0.00% | 0.00% | 0.00% | 0.00% | 0.00% | 0.00% | 3.00% | 0.00% | 0.00% | 1.00% | 0.00% | 75.00% | 0.00% | 14.00% |
| Brass | 0.00% | 0.00% | 0.00% | 0.00% | 0.00% | 0.00% | 0.00% | 0.00% | 0.00% | 0.00% | 0.00% | 0.00% | 65.00% | 0.00% | 0.00% | 35.00% | 0.00% | 0.00% | 0.00% | 0.00% |
| Copper | 0.00% | 0.00% | 0.00% | 0.00% | 0.00% | 0.00% | 0.00% | 0.00% | 0.00% | 0.00% | 0.00% | 0.00% | 99.90% | 0.00% | 0.00% | 0.00% | 0.00% | 0.00% | 0.00% | 0.00% |

FIG. 23

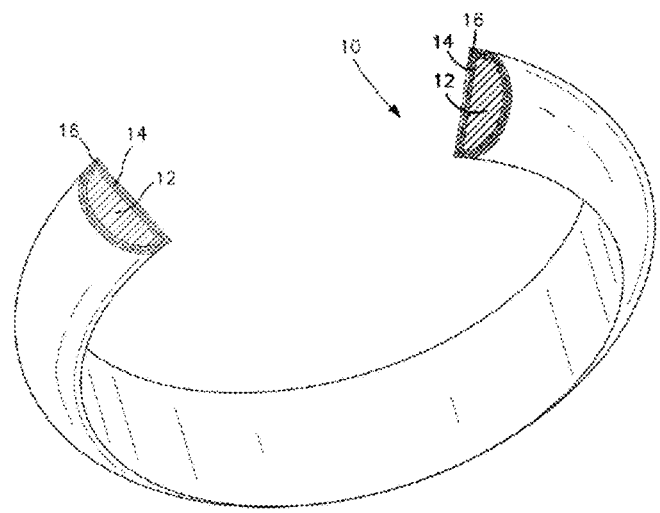
FIG. 31
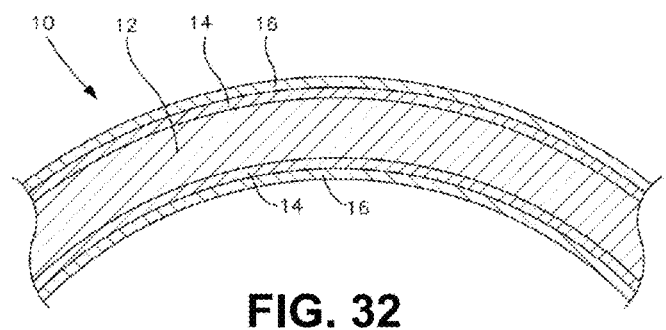
FIG. 32
|  |  | Cr/Steel 30/70 | Cr/Steel 60/40 | Cr/Steel 70/30 | Cr/Steel 75/25 | Cr/Steel 80/20 | Cr/Steel 90/10 |
|---|---|---|---|---|---|---|---|
| Carbon | C | 0.03% | 0.021% | 0.012% | 0.009% | 0.008% | 0.006% | 0.003% |
| Manganese | Mn | 2.00% | 1.400% | 0.800% | 0.600% | 0.500% | 0.400% | 0.200% |
| Silicon | Si | 1.00% | 0.700% | 0.400% | 0.300% | 0.250% | 0.200% | 0.100% |
| Phosphorus | P | 0.05% | 0.032% | 0.018% | 0.014% | 0.011% | 0.009% | 0.005% |
| Sulphur | S | 0.03% | 0.021% | 0.012% | 0.009% | 0.008% | 0.006% | 0.003% |
| Chromium | Cr | 17.00% | 11.900% | 6.800% | 5.100% | 4.250% | 3.400% | 1.700% |
| Molybdenum | Mo | 2.50% | 1.750% | 1.000% | 0.750% | 0.625% | 0.500% | 0.250% |
| Nickel | Ni | 12.00% | 8.400% | 4.800% | 3.600% | 3.000% | 2.400% | 1.200% |
| Iron | Fe | 65.00% | 45.500% | 26.000% | 19.500% | 16.250% | 13.000% | 6.500% |
| 316 Steel % |  | 70% | 40% | 30% | 25% | 20% | 10% |
| Pure Chrome % |  | 30% | 60% | 70% | 75% | 80% | 90% |
| Total |  | 100% | 100% | 100% | 100% | 100% | 100% |
FIG. 33

JEWELRY AND METHODS OF FORMING THE SAME FROM MULTIPLE COMPONENTS

CROSS REFERENCE TO RELATED APPLICATIONS

The present application claims the benefit of U.S. Provisional Application Ser. No. 62/514,590 filed 2 Jun. 2017, which is incorporated herein by reference in its entirety.

FIELD

The present application related generally to compositions of matter and articles of manufacture, such as jewelry items, and methods for their production, including jewelry formed from multiple components and methods of making same.

BACKGROUND

In this specification where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

Jewelry such as finger rings, pendants, bracelets, and necklaces have traditionally been made of soft metals such as gold, silver and platinum because those metals are malleable, and easily formed by casting, forging and molding. Recently, jewelry items have been formed from harder materials such as alloys or composites such as "cemented carbides," as well as from combinations of harder materials and soft metals. An alloy is a mixture or metallic solid solution composed of two or more elements. A cemented carbide is a composite material composed of a metal where carbide particles act as the aggregate and a metallic binder serves as the matrix. The carbide particles are typically combined with the binder through sintering.

Some specific attempts to form jewelry from cemented carbides, such as tungsten carbide, include U.S. Pat. Nos. 6,553,667; 6,990,736; 6,993,842; 7,032,314; and 7,076,972. Such jewelry is much more resistant to scratching and other damage than traditional jewelry made of softer metals.

Additional compositions providing desirable jewelry characteristics would be advantageous. The articles provided herewith address that need. In particular, conventional jewelry materials can be difficult or relatively expensive to manufacture:

While certain aspects of conventional technologies have been discussed to facilitate the present disclosure, Applicants in no way disclaim these technical aspects, and it is contemplated that the claims may encompass or include one or more of the conventional technical aspects discussed herein.

SUMMARY

A new method of jewelry construction has been designed and developed. This method is used for constructing jewelry items from various materials, including identical materials, similar materials, or different materials. The construction method is referred to herein as "over-under bypass" and it allows for easy and secure assembly of jewelry items, including rings. The types of jewelry items that can benefit from the over-under bypass construction methods described and claimed herein include rings, finger rings, wedding bands, earrings, bracelets, necklaces, cuff links, pendants, broaches, and other types of jewelry items. The materials that are used for purposes of constructing the jewelry items include one or more of metals, metallic materials, ceramics, alloys of each or any of the foregoing, or combinations of any of the foregoing. The ceramics include one or more of carbides, nitrides, borides, combinations of any of the foregoing, or other ceramic materials. In one or more embodiments, other materials that are used for purposes of constructing the jewelry items include one or more of wood, stone, gemstones, carbon fiber, carbon, glass, rubber, plastic, organic materials, inorganic materials, combinations of any of the foregoing, or other materials.

With the combination of precious metal bonded material and contemporary metals we can deliver a product that satisfies the consumers need for a wedding band with substantial weight and heft as well as the look and luster of precious metal at a competitive entry level price point.

In one or more embodiments, the jewelry item comprises three components. These components include an over component, an under component and a center component. In one or more embodiments, the over component and under component each comprises or is formed from a first material, while the center component comprises or is formed from a second material. In one or more embodiments, the over component comprises or is formed from a first material, the under component comprises or is formed from a second material, and the center component comprises or is formed from a third material. In one or more embodiments, the over component, under component, and center component, each comprises or is formed from a first material. In one or more embodiments, the over component and center component each comprise or is formed from a first material, while the under component comprises or is formed from a second material. In one or more embodiments, the over component is comprised of or is formed from a first material, and the under component and center component each comprises or is formed from a second material.

In one or more embodiments, the first material is the same as the second material. In one or more embodiments, the first material is different than the second material. In one or more embodiments, the first material comprises or is a metal. In one or more embodiments, the second material comprises or is a metal. In one or more embodiments, the third material comprises or is a metal. In one or more embodiments, the first material comprises or is a precious metal. In one or more embodiments, the second material comprises or is a precious metal. In one or more embodiments, the third material comprises or is a precious metal. In one or more embodiments, the first material comprises or is a ceramic material. In one or more embodiments, the second material comprises or is a ceramic material. In one or more embodiments, the third material comprises or is a ceramic material. In one or more embodiments, the first materials comprises or is a metallic material. In one or more embodiments, the second material comprises or is a metallic material. In one or more embodiments, the third material comprises or is a metallic material. In one or more embodiments, the first material comprises or is at least one of a metal alloy or metallic alloy. In one or more embodiments, the second material comprises or is at least one of a metal alloy or metallic alloy. In one or more embodiments, the third material comprises or is at least one of a metal alloy or metallic alloy. In one or more embodiments, the center component comprises or is at least one of a non-metal material or a non-ceramic material.

In one or more embodiments, the metal or metallic material comprises or is at least one of Aluminum, Bismuth, Bohrium, Cadmium, Chromium, Cobalt, Copper, Dubnium, Gallium, Gold, Hafnium, Hassium, Indium, Iridium, Iron, Lead, Manganese, Meitnerium, Molybdenum, Nickel, Niobium, Osmium, Palladium, Platinum, Rhenium, Rhodium, Ruthenium, Rutherfordium, Scandium, Seaborgium, Silver, Tantalum, Technetium, Thallium, Tin, Titanium, Tungsten, Vanadium, Yttrium, Zinc, Zirconium, alloys of each or any of the foregoing, or combinations of any of the foregoing.

In one or more embodiments, the ceramic material comprises or is at least one of a silicide, carbide, nitride or boride, or any combination of any of the foregoing.

In one or more embodiments, the first material comprises or is at least one of titanium nitride (TiN), titanium(2) nitride (Ti$_2$N), titanium carbo-nitride (TiCN), titanium-aluminum nitride (TiAlN), titanium-aluminum carbo-nitride (TiAlCN), chromium nitride (CrN), zirconium nitride (ZrN), chromium-titanium nitride (CrTiN), aluminum-titanium nitride (AlTiN), aluminum-titanium-chromium nitride (AlTiCrN), titanium-zirconium (TiZi), titanium-niobium-zirconium (TiNiZi), tungsten nitride (WN), titanium diboride (TiB$_2$), tungsten carbide, cobalt, tungsten, titanium, titanium carbide, zirconium, tantalum, rhodium, gold, silver, platinum, palladium, iridium, iron, stainless steel, cobalt chrome, cobalt chromium, nickel, nitinol, aluminum, aluminum carbide, vanadium, ruthenium, copper, brass, bronze, tungsten copper, zinc, tin, German silver, niobium, molybdenum, hafnium, rhenium, chromium, a steel alloy, gold nitride, silver nitride, aluminum nitride, vanadium nitride, tantalum nitride, chromium carbide, zirconium carbide, tantalum carbide, cobalt chrome molybdenum, or alloys of each of the foregoing and any combinations thereof.

In one or more embodiments, the second material comprises or is at least one of titanium nitride (TiN), titanium(2) nitride (Ti2N), titanium carbo-nitride (TiCN), titanium-aluminum nitride (TiAlN), titanium-aluminum carbo-nitride (TiAlCN), chromium nitride (CrN), zirconium nitride (ZrN), chromium-titanium nitride (CrTiN), aluminum-titanium nitride (AlTiN), aluminum-titanium-chromium nitride (AlTiCrN), titanium-zirconium (TiZi), titanium-niobium-zirconium (TiNiZi), tungsten nitride (WN), titanium diboride (TiB2), tungsten carbide, cobalt, tungsten, titanium, titanium carbide, zirconium, tantalum, rhodium, gold, silver, platinum, palladium, iridium, iron, stainless steel, cobalt chrome, cobalt chromium, nickel, nitinol, aluminum, aluminum carbide, vanadium, ruthenium, copper, brass, bronze, tungsten copper, zinc, tin, German silver, niobium, molybdenum, hafnium, rhenium, chromium, a steel alloy, gold nitride, silver nitride, aluminum nitride, vanadium nitride, tantalum nitride, chromium carbide, zirconium carbide, tantalum carbide, cobalt chrome molybdenum, or alloys of each of the foregoing and any combinations thereof.

In one or more embodiments, the third material comprises or is at least one or titanium nitride (TiN), titanium(2) nitride (Ti2N), titanium carbo-nitride (TiCN), titanium-aluminum nitride (TiAlN), titanium-aluminum carbo-nitride (TiAlCN), chromium nitride (CrN), zirconium nitride (ZrN), chromium-titanium nitride (CrTiN), aluminum-titanium nitride (AlTiN), aluminum-titanium-chromium nitride (AlTiCrN), titanium-zirconium (TiZi), titanium-niobium-zirconium (TiNiZi), tungsten nitride (WN), titanium diboride (TiB2), tungsten carbide, cobalt, tungsten, titanium, titanium carbide, zirconium, tantalum, rhodium, gold, silver, platinum, palladium, iridium, iron, stainless steel, cobalt chrome, cobalt chromium, nickel, nitinol, aluminum, aluminum carbide, vanadium, ruthenium, copper, brass, bronze, tungsten copper, zinc, tin, German silver, niobium, molybdenum, hafnium, rhenium, chromium, a steel alloy, gold nitride, silver nitride, aluminum nitride, vanadium nitride, tantalum nitride, chromium carbide, zirconium carbide, tantalum carbide, cobalt chrome molybdenum, or alloys of each of the foregoing and any combinations thereof.

In one or more embodiments, the first material comprises or is at least one of wood, stone, gemstone, crystal, carbon fiber, carbon, glass, rubber, plastic, organic materials, inorganic materials, combinations of any of the foregoing, or other synthetic or natural materials.

In one or more embodiments, at least one of the over component and the under component comprises or is formed from a precious metal. The precious metal component is machined to a high tolerance. When assembled, the over component and the under component have the flexibility of being combined with any type of center component. This allows for a wide variety of choices while minimizing inventory. In one or more embodiments, at least one of the over component and the under component comprises or is formed from a non-precious component, such as, for example, non-precious metals, ceramics, and other materials. These components, which comprise a base kit, are designed to have close tolerances and fit very tightly together. They are then ready to accept a precious metal insert in a simple assembly process. This method allows for the ability to customize with low inventory level requirements.

In one or more embodiments, the center component comprises or is formed from a bonded material, such as, for example, an outer layer of gold with an inner layer of silver. The bonded material and a method for bonding the material are described in further detail below.

In one or more embodiments, possible base component materials, i.e., the over component and the under component, include tungsten carbide, any variation of tungsten carbide, tantalum carbide, cobalt/chrome, titanium and all its alloys, stainless steel and all its alloys, carbon fiber and all possible composites, carbon fiber (pre-preg, twill, forged, tube), fiber glass (pre-preg, twill, forged, tube), kevlar (pre-preg, twill, forged, tube), base metals and all base metal alloys, including copper, nickel, tin, zinc.

In one or more embodiments, possible base component materials include ceramics and ceramic composites, such as, for example, zirconium dioxide, silicon carbide (SiC), titanium boride (TiB), titanium carbide (TiC).

In one or more embodiments, possible insert materials, i.e., the center component includes precious metals, such as, for example, gold, silver platinum and all alloys thereof.

In one or more embodiments, possible insert materials include non-precious materials, such as, for example, tungsten carbide, any variation of tungsten carbide, tantalum carbide, cobalt/chrome, titanium and all of its alloys, stainless steel and all of its alloys, zirconium dioxide, silicon carbide (SiC), titanium boride (TiB), or titanium carbide (TiC).

BRIEF DESCRIPTION OF THE DRAWINGS

The set of accompanying illustrative drawings shows various example embodiments of this disclosure. Such drawings are not to be construed as necessarily limiting this disclosure. Like numbers and/or similar numbering scheme can refer to like and/or similar elements throughout.

FIG. 7A shows the point of measurement of the outer diameter of an under component A, according to an embodiment of the present disclosure.

FIG. 7B shows the points of measurement of the inner diameter and the outer diameter of an over component B, according to an embodiment of the present disclosure.

FIG. 7C shows an assembled ring having an under components, an over component (i.e., component A+component B), and a center component, according to an embodiment of the present disclosure.

FIG. 7D shows measurements and tolerances for a compression fit construction of a ring according to an embodiment of the present disclosure.

FIG. 8A shows the point of measurement of the outer diameter of an under component A, according to an embodiment of the present disclosure.

FIG. 8B shows the points of measurement of the inner diameter and the outer diameter of an over component B, according to an embodiment of the present disclosure.

FIG. 8C shows an assembled ring having an under components, an over component (i.e., component A+component B), and a center component, according to an embodiment of the present disclosure.

FIG. 8D shows measurements and tolerances for a slip-fit construction of a ring according to an embodiment of the present disclosure.

FIGS. 14A-14H show various designs for a central component of a ring according to embodiments of the present disclosure.

FIG. 15 shows a magnified view of a micro-section of a bonded materials, according to an embodiment of the present disclosure.

FIG. 16 shows a cross sectional view of a reversibly assembled ring having an O-ring gasket according to an embodiment of the present disclosure.

FIG. 17 shows a cross sectional view of a reversibly assembled ring having two O-ring gaskets according to an embodiment of the present disclosure.

FIG. 18 shows a cross sectional view of a reversibly assembled ring having an O-ring gasket according to an embodiment of the present disclosure.

FIG. 19 shows a cross sectional view of an assembled ring having a step construction according to an embodiment of the present disclosure.

FIG. 20A shows a top view of an o-ring gasket in a flat seated position according to an embodiment of the present disclosure.

FIG. 20B shows a cross sectional view of an o-ring gasket in an upright sideways position according to an embodiment of the present disclosure.

FIG. 20C shows a cross sectional view of one portion along the circumference of an o-ring gasket between the outside diameter and inside diameter according to an embodiment of the present disclosure.

FIG. 21A shows the point of measurement of the outer diameter of an under component A, according to an embodiment of the present disclosure.

FIG. 21B shows the points of measurement of the inner diameter and the outer diameter of an over component B, according to an embodiment of the present disclosure.

FIG. 21C shows an o-ring gasket, according to an embodiment of the present disclosure.

FIG. 21D shows an assembled ring having an under components, an over component (i.e., component A+component B), and a center component, according to an embodiment of the present disclosure.

FIG. 21E shows measurements and tolerances for a step-fit construction of a ring according to an embodiment of the present disclosure.

FIG. 22A shows the point of measurement of the outer diameter and inner diameter of an under component A, according to an embodiment of the present disclosure.

FIG. 22B shows the points of measurement of the inner diameter and the outer diameter of an over component B, according to an embodiment of the present disclosure.

FIG. 22C shows the point of measurement of the inner diameter of a center component, according to an embodiment of the present disclosure.

FIG. 22D shows an assembled ring having an under components, an over component (i.e., component A+component B), and a center component, according to an embodiment of the present disclosure.

FIG. 22E shows measurements and tolerances for a step-fit construction of a ring according to an embodiment of the present disclosure.

FIG. 23 shows a table of various compositions of the over component, under component, and/or center component, according to one or more embodiments of the present disclosure.

FIG. 31 shows a ring in accordance with an illustrative embodiment with a transverse cross-sectional cutout.

FIG. 32 shows a longitudinal cross-section of a ring in accordance with an illustrative embodiment.

FIG. 33 shows one embodiment of a chrome-steel (chromium-steel) composition of the second coating by component percentage.

DETAILED DESCRIPTION

Figures 1A, 1B:
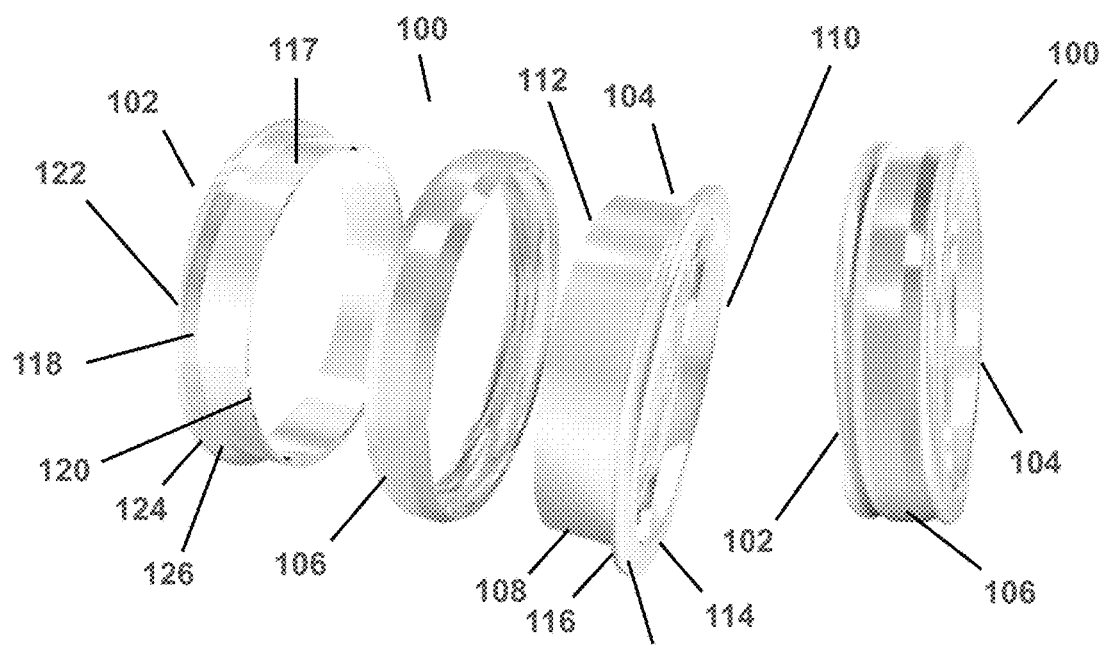
FIG. 1A shows an unassembled over component, under component and center component, according to an embodiment of the present disclosure.
FIG. 1B shows an assembled ring including an over component, under component and center component, according to an embodiment of the present disclosure.

This disclosure is now described more fully with reference to the set of accompanying illustrative drawings, in which example embodiments of this disclosure are shown. This disclosure can be embodied in many different forms and should not be construed as necessarily being limited to the example embodiments disclosed herein. Rather, the example embodiments are provided so that this disclosure is thorough and complete, and fully conveys various concepts of this disclosure to those skilled in a relevant art.

Features described with respect to certain example embodiments can be combined and sub-combined in and/or with various other example embodiments. Also, different aspects and/or elements of example embodiments, as disclosed herein, can be combined and sub-combined in a similar manner as well. Further, some example embodiments, whether individually and/or collectively, can be components of a larger system, wherein other procedures can take precedence over and/or otherwise modify their application. Additionally, a number of steps can be required before, after, and/or concurrently with example embodiments, as disclosed herein. Note that any and/or all methods and/or processes, at least as disclosed herein, can be at least partially performed via at least one entity in any manner.

Various terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Various terminology used herein is for describing particular example embodiments and is not intended to be necessarily limiting of this disclosure. As used herein, various singular forms "a," "an" and "the" are intended to include various lural forms as well, unless a context clearly indicates otherwise. Various terms "comprises," "includes" and/or "comprising," "including" when used in this specification, specify a presence of stated features, integers, steps, operations, elements, and/or components, but do not preclude the presence and/or addition of one or more other features, integers, steps, operations, elements, components, and/or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

Example embodiments of this disclosure are described herein with reference to illustrations of idealized embodiments (and intermediate structures) of this disclosure. As such, variations from various illustrated shapes as a result, for example, of manufacturing techniques and/or tolerances, are to be expected. Thus, various example embodiments of this disclosure should not be construed as necessarily limited to various particular configurations of systems illustrated herein, but are to include deviations in configuration that result, for example, from selection of components.

Unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized and/or overly formal sense unless expressly so defined herein.

Furthermore, relative terms such as "below," "lower," "above," "upper," "first," "second," and "third" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various example terms "below" and "lower" can encompass both an orientation of above and below.

As used herein, a term "about" and/or "substantially" refers to a +/−10% variation from a nominal value/term. Such variation is always included in any given value/term provided herein, whether or not such variation is specifically referred thereto.

All of the numerical values contained in this disclosure are to be construed as being characterized by the above-described modifier "about," are also intended to include the exact numerical values disclosed herein. The ranges disclosed herein should be construed to encompass all values within the upper and lower limits of the ranges, unless indicated otherwise. Moreover, all ranges include the upper and lower limits.

As used herein, "substantially free of nickel" means that nickel is not intentionally added to the composition as a constituent additive, but does not necessarily exclude the presence of trace or impurity levels of nickel within the composition. By way of example only, trace amounts on the order of about 0.062 wt. % Ni, or less, may be present in the composition.

All percentages disclosed herein refer to percent by weight, relative to the overall weight of the composition, unless otherwise described herein. The weight percentages disclosed herein may be measured by an Inductively Coupled Mass Spectrometry ("ICP-MS"). ICP— is a type of mass spectrometry which is capable of detecting metals and several non-metals at concentrations as low as one part in 1015 (part per quadrillion, ppq) on non-interfered low-background isotopes. This is achieved by ionizing the sample with inductively coupled plasma and then using a mass spectrometer to separate and quantify those ions. The sample is ionized by inductively coupled plasma and then the ions are separated and quantified by a mass spectrometer. When this is used to analyze materials comprising cemented carbon, carbon may appear in the analyzed results. Carbon may be detected by LECO 744 Series: Carbon and sulfur in inorganic material by the combustion infrared Detection technique. This may be performed in accordance with ASTM E1019 and ASTM E1409, LECO Combustion Analysis methods include: CARBON & SULFUR ANALYSIS which may include weighing the material, and heating and combusting in the presence of pure oxygen. During the process, carbon and sulfur are oxidized to form $CO_2$ and $SO_2$ which may be measured.

If any disclosures are incorporated herein by reference and such disclosures conflict in part and/or in whole with this disclosure, then to an extent of a conflict, if any, and/or a broader disclosure, and/or broader definition of terms, this disclosure controls. If such disclosures conflict in part and/or in whole with one another, then to an extent of a conflict, if any, a later-dated disclosure controls.

In FIG. 1A, there is shown unassembled components of a ring 100 according to an embodiment of the present disclosure. The ring 100 includes an over component 102, an under component 104, and a center component 106. In FIG. 1B, there is shown an assembled ring 100, including an over component 102, an under component 104, and a center component 106. The over/under construction provides an under component 104 that comprises a cylindrical portion 108 extending from a proximal end 110 to a distal end 112. The proximal end 110 includes a rim 114 that extends laterally from the cylindrical portion 108 and that is flush with the proximal end 110. In one or more embodiments, the rim 114 may extend perpendicularly from the cylindrical portion 108. In one or more embodiments, the rim 114 may extend at an acute angle or at an obtuse angle from the cylindrical portion 108. In one or more embodiments, the rim 114 may be offset from the proximal end 110, such as, for example, being set back from the proximal end 110. The rim 114 includes a proximal edge 115 and a distal edge 116.

In one or more embodiments, the rim 114 of the under component 104 may have a particular shape, such as, for example, rounded, beveled edge, flat edge, flat with a broken edge, or any other shape.

The over/under construction provides an over component 102 that comprises a cylindrical portion 117 extending from a proximal end 118 to a distal end 120. The proximal end 118 includes a rim 122 that extends laterally from the cylindrical portion 117 and that is flush with the proximal end 118. In one or more embodiments, the rim 122 may extend perpendicularly from the cylindrical portion 117. In one or more embodiments, the rim 122 may extend at an acute angle or at an obtuse angle from the cylindrical portion 117. In one or more embodiments, the rim 122 may be offset from the proximal end 118, such as, for example, being set back from the proximal end 118. The rim 122 includes a proximal edge 124 and a distal edge 126.

The distal end 112 of the under component 104 extends to a position flush with a proximal edge 124 of the rim 122 of the over component 102. Alternatively, the distal end 112 of the under component 104 may extend to a position aligned with the rim 122 when it is set back from the proximal end 118, or to a position aligned with the distal edge 126 of the over component 102.

The distal end 120 of the over component 102 extends to a position flush with a distal edge 116 of the rim 114 of the under component 104. Alternatively, the distal end 120 of the over component 104 may extend to a position offset from distal edge 116 of the rim 122 of the over component 102.

In one or more embodiments, the inner dimension, such as, for example, the inner diameter or inner circumference, of the under component 104 defines the ring size measurement of the ring 100. In one or more embodiments, the outer dimension of the under component is approximately or about equal to the outer dimension of the over component 102. In one or more embodiments the outer dimension of the over component 102 is approximately or about equal to the inner dimension of the central component 106. In one or more embodiments, the outer dimension of the under component is less than the outer dimension of the over component 102. In one or more embodiments the outer dimension of the over component 102 is less than the inner dimension of the central component 106.

In one or more embodiments, the rim 122 of the under component 102 may have a particular shape, such as, for example, rounded, beveled edge, flat edge, flat with a broken edge, or any other shape. The rim 114 of the under component 104 may have the same shape or a different shape than the rim 122 of the over component 102.

Figure 2:
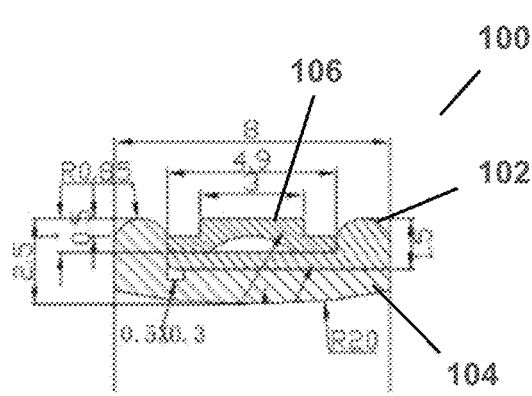
FIG. 2 shows a cross sectional view of an assembled ring using a friction method according to an embodiment of the present disclosure.

As shown in FIG. 2, in one or more embodiments, the over component 102, under component 104 and center component 106 of the ring 100 are assembled and maintained in the assembled configuration based on friction using an interference fit or compression fit method. In such a configuration the over component 102 and under component 104 are coupled using only a friction force. This friction force is generated based on close tolerances of the over component 102 and under component 104. An interference fit or compression fit, also known as a press fit or friction fit is a fastening between two parts which is achieved by friction after the parts are pushed together or assembled, rather than by any other means of fastening. An interference fit or compression fit method is difficult to achieve with components made from a very hard material such as a ceramic. Using a design as described herein, such a method can successfully couple the components. To support an interference fit or compression fit design, all component bonding surfaces should have a level of roughness to create a greater surface area for a stronger bond. Further, all parts of the assembly should be clean and oil free before assembling.

Examples of tolerances that can be used to achieve a coupling using the interference fit or compression fit method for a ring having a tungsten carbide over component and a tungsten carbide under component are shown in FIGS. 7A-7D. FIG. 7A shows the point of measurement of the outer diameter of the under component A. FIG. 7B shows the points of measurement of the inner diameter and the outer diameter of the over component B. FIG. 7C shows an assembled ring having an under components, an over component (i.e., A+B), and a center component, and shows the gap between the over component and the under component. FIG. 7D is a table showing, for each ring size, the measurements of the outside diameter of the under component, the inside diameter of the over component, the gap size between the over component and the under component, the outside diameter of the over component, the inside diameter of the center component, and the tolerances of each of the components and of the gap size.

Figure 3:
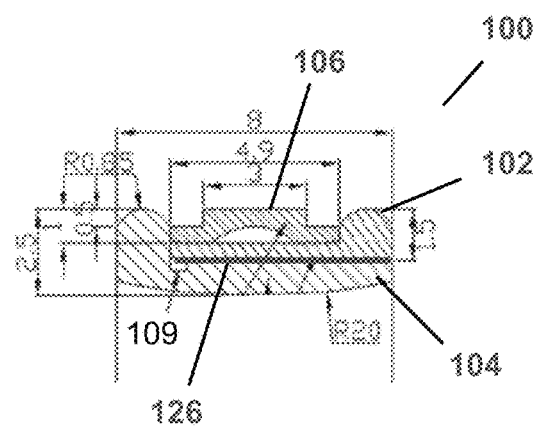
FIG. 3 shows a cross sectional view of an assembled ring using a bonding agent method according to an embodiment of the present disclosure.

As shown in FIG. 3, in one or more embodiments, the over component 102, under component 104 and center component 106 of the ring 100 are assembled and maintained in the assembled configuration using a bonding agent 126 such as, for example, an adhesive or glue or a retaining compound, based on a slip-fit method. In such a configuration the over component 102 and under component 104 are coupled using the bonding agent 126. The bonding agent 126 may be any compound that binds the over component 102 and the under component 104. A retaining compound is used to secure non-threaded, slip-fit, cylindrical assemblies, such as the over component 102 and the under component 104 with its ability to expand during the curing process and fill any tiny gaps. One example of a retaining compound that may be used includes Loctite 620 manufactured by Henkel which is specifically designed to secure non-threaded, slip-fit, fit, cylindrical assemblies and having an ability to expand during the curing process and fill any tiny gaps up to 0.015" wide. Alternative retaining compounds include Vibra-tite and Cyberbond.

Examples of tolerances that can be used to achieve a coupling using the slip-fit method for a ring having a tungsten carbide over component and a tungsten carbide under component are shown in FIGS. 8A-8D. FIG. 8A shows the point of measurement of the outer diameter of the under component A. FIG. 8B shows the points of measurement of the inner diameter and the outer diameter of the over component B. FIG. 8C shows an assembled ring having an under components, an over component (i.e., A+B), and a center component, and shows the gap between the over component and the under component. FIG. 8D is a table showing, for each ring size, the measurements of the outside diameter of the under component, the inside diameter of the over component, the gap size between the over component and the under component, the outside diameter of the over component, the inside diameter of the center component, and the tolerances of each of the components and of the gap size.

Figure 4A:
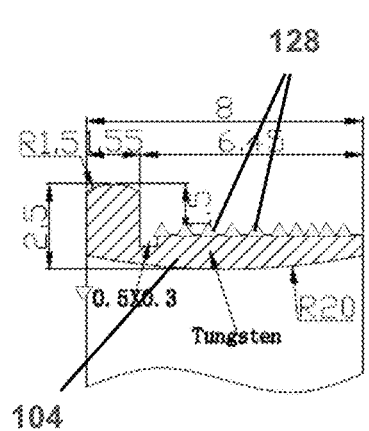
FIG. 4A shows a cross sectional view of an under component having threading according to an embodiment of the present disclosure.
Figure 4B:
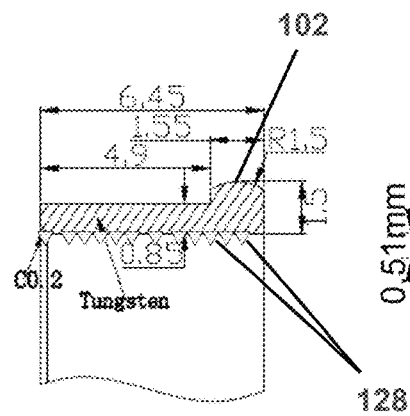
FIG. 4B shows a cross sectional view of an over component having threading according to an embodiment of the present disclosure.
Figure 4C:
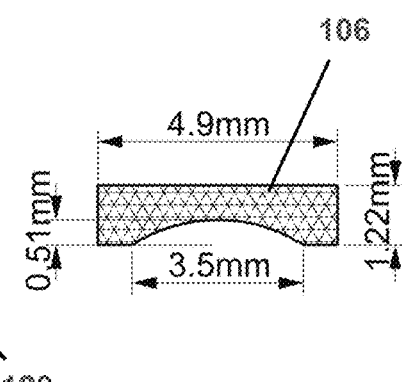
FIG. 4C shows a cross sectional view of a center component according to an embodiment of the present disclosure.

In one or more embodiments, the over component 102, under component 104 and center component 106 of the ring 100 are assembled and maintained in the assembled configuration using a threading method. In such a configuration the over component 102 and under component 104 are coupled using threading 128, as shown in FIGS. 4A and 4B, along the inside of the over component 102 (see FIG. 4B) and along the outside of the under component 104 (see FIG. 4A). This threading 128 is applied to the components using grinding and/or polishing tools or some other means. It may be incorporated using close tolerances of the over component 102 and under component 104. To support the threaded method, all component should have a fairly smooth surface area to allow for an easier assembly. Further, all parts of the assembly should be clean before assembling. The center component 106 for such an assembly is shown in FIG. 4C.

Figure 5:
FIG. 5 shows an expanded view of a roughened surface of an outer component according to an embodiment of the present disclosure.
Figure 6:
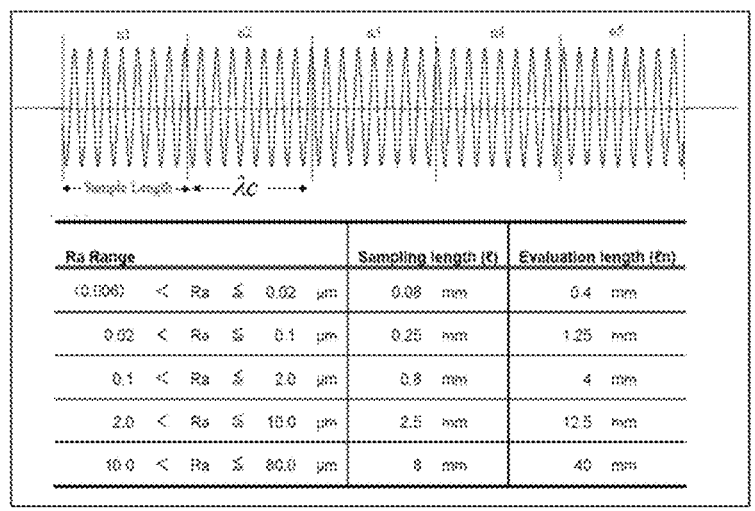
FIG. 6 shows a table of roughness values between a bright polished tungsten carbide surface and a roughed surface prepared for bonding, according to an embodiment of the present disclosure.

In FIG. 5 there is shown a surface area roughening applied to the surface area of the inside of the over component and the outside of the under component. In one or more embodiments, this type of roughening is used to improve the quality of the bonding of the over component 102 to the under component 104, as shown in FIG. 3. A comparison of the roughness values between a bright polished tungsten carbide surface and a roughed surface prepared for bonding is shown in FIG. 6.

Figures 9A, 9B, 9C, 10A, 10B, 10C, 11A, 11B, 11C, 12A, 12B, 12C, 13A, 13B, 13C:
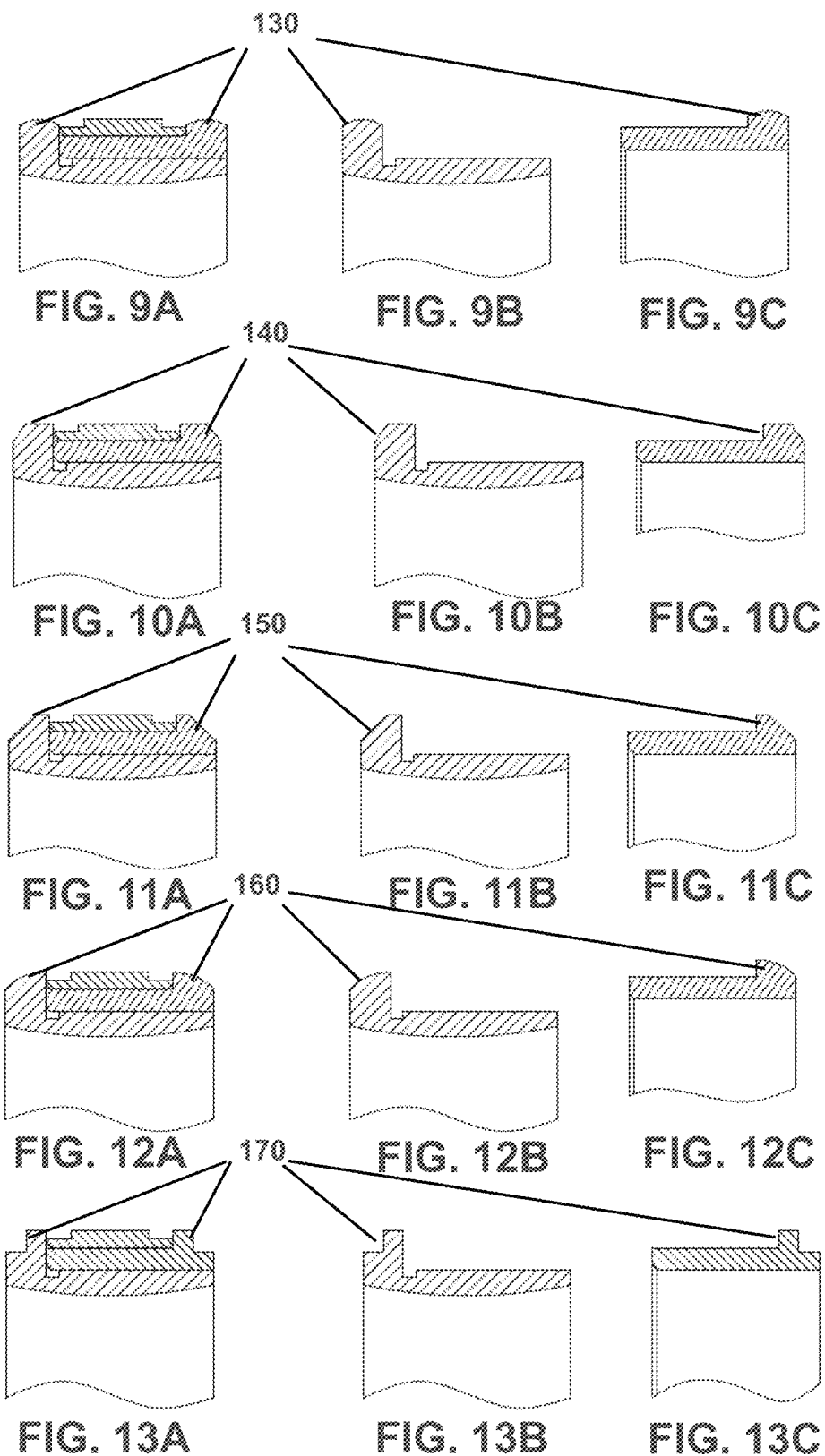
FIG. 9A shows a cross sectional view of an edge of an assembled ring according to an embodiment of the present disclosure.
FIG. 9B shows a cross sectional view of an edge of an under component according to an embodiment of the present disclosure.
FIG. 9C shows a cross sectional view of an edge of an over component according to an embodiment of the present disclosure.
FIG. 10A shows a cross sectional view of an edge of an assembled ring according to an embodiment of the present disclosure.
FIG. 10B shows a cross sectional view of an edge of an under component according to an embodiment of the present disclosure.
FIG. 10C shows a cross sectional view of an edge of an over component according to an embodiment of the present disclosure.
FIG. 11A shows a cross sectional view of an edge of an assembled ring according to an embodiment of the present disclosure.
FIG. 11B shows a cross sectional view of an edge of an under component according to an embodiment of the present disclosure.
FIG. 11C shows a cross sectional view of an edge of an over component according to an embodiment of the present disclosure.
FIG. 12A shows a cross sectional view of an edge of an assembled ring according to an embodiment of the present disclosure.
FIG. 12B shows a cross sectional view of an edge of an under component according to an embodiment of the present disclosure.
FIG. 12C shows a cross sectional view of an edge of an over component according to an embodiment of the present disclosure.
FIG. 13A shows a cross sectional view of an edge of an assembled ring according to an embodiment of the present disclosure.
FIG. 13B shows a cross sectional view of an edge of an under component according to an embodiment of the present disclosure.
FIG. 13C shows a cross sectional view of an edge of an over component according to an embodiment of the present disclosure.

In FIGS. 9A-9C there is shown an embodiment of an assembled ring 100 including an over component 102, an under component 104 and a center component 106, with each of the over component 102 and the under component 104 having a round rim edge shape 130.

In FIGS. 10A-10C there is shown an embodiment of an assembled ring 100 including an over component 102, an under component 104 and a center component 106, with each of the over component 102 and the under component 104 having a flat with bevel edge shape 140.

In FIGS. 11A-11C there is shown an embodiment of an assembled ring 100 including an over component 102, an under component 104 and a center component 106, with each of the over component 102 and the under component 104 having a bevel edge shape 150.

In FIGS. 12A-12C there is shown an embodiment of an assembled ring 100 including an over component 102, an under component 104 and a center component 106, with each of the over component 102 and the under component 104 having a full round rim edge shape 160.

In FIGS. 13A-13C there is shown an embodiment of an assembled ring 100 including an over component 102, an under component 104 and a center component 106, with each of the over component 102 and the under component 104 having a stepped edge shape 170.

In one or more embodiments other rim attributes can be used in place of the rim attributes as described above and as shown in FIGS. 9A-13C. Other rim attributes include angle edge, bevel edge, bevel step edge, broken edge, coin edge, double milgrain edge, faceted bevel edge, faceted edge, flat edge, free form edge, knife edge, milgrain edge, radial edge, rivet edge, roll edge, rope edge, round edge, serrated edge, small concave edge, steel edge, step edge, and wide step edge.

In FIGS. 14A-14H there is shown a plurality of embodiments of the center component 106. Each of the center components as shown in FIGS. 14A-14H can be formed using materials and methods as described below. FIG. 14A depicts a flat milgrain design, which includes a flat profile with a satin center finish and milgrain edges. FIG. 14B depicts a bevel cuts design, which includes a bevel edge with a satin finish and diagonal cuts. FIG. 14C depicts a serrated vertical cuts design, which includes a bevel edge with a satin finish and vertical cuts. FIG. 14D depicts a crystalline design, which includes a bevel edge profile with a crystalline finish. FIG. 14E depicts a serrated engraved design, which includes a bevel edge with a serrated finish in the center. FIG. 14F depicts a vertical cuts design, which includes a bevel edge with a satin finish and vertical cuts. FIG. 14G depicts a step edge design, which includes step edge with a brush finish and sand blast. FIG. 14H depicts a linear design, which includes a flat profile with a radius edge and machined finish.

In one or more embodiments, FIG. 15 depicts a magnified view of a micro-section of a bonded materials used for the center component, according to an embodiment of the present disclosure. The material depicted in FIG. 15 comprises an outer layer of gold at a thickness of 0.5391 mm. However, the thickness of the bonded outer layer may be any thickness, that provides for a minimization of cost while providing a real precious metal coating that will withstand normal wear over an extended period of time.

As shown in FIG. 16, in one or more embodiments, the over component 102, under component 104 and center component 106 of the ring 100 are assembled and maintained in the assembled configuration using a single gasket 180 such as, for example, an o-ring gasket, based on a reversible assembly method. In such a configuration the over component 102 and under component 104 are coupled using the single gasket 180, which retains the components in an assembled arrangement. The single gasket 180 may be any gasket that retains the over component 102 in an assembled arrangement with the under component 104. One example of a gasket that may be used includes an o-ring gasket as shown in FIGS. 20A-20C. A planar view of the o-ring gasket is shown in FIG. 20A, and the inner diameter is depicted. In FIG. 20B, a side view of the o-ring gasket is shown, where the measurement of the inner diameter is also depicted. The thickness of the o-ring gasket is shown in FIG. 20C and the flashes remaining on the o-ring gasket are depicted.

Examples of tolerances that can be used to achieve a coupling using the single o-ring gasket reversible assembly method for a ring having a tungsten carbide over component and a tungsten carbide under component are shown in FIGS. 21A-21E. FIG. 21A shows the point of measurement of the outer diameter of the under component A. FIG. 21B shows the points of measurement of the inner diameter and the outer diameter of the over component B. FIG. 21C shows an o-ring gasket and the thickness (or diameter) of the o-ring gasket. FIG. 21D shows an assembled ring having an under components, an over component (i.e., A+B), and a center component, and shows the gap between the over component and the under component. FIG. 21E is a table showing, for each ring size, the measurements of the outside diameter of the under component, the inside diameter of the over component, the gap size between the over component and the under component, the outside diameter of the over component, the inside diameter of the center component, and the tolerances of each of the components and of the gap size.

As shown in FIG. 17, in one or more embodiments, the over component 102, under component 104 and center component 106 of the ring 100 are assembled and maintained in the assembled configuration using two gaskets 180 such as, for example, two o-ring gaskets, based on a reversible assembly method. In such a configuration the over component 102 and under component 104 are coupled using the two gaskets 180, which retain the components in an assembled arrangement. The two gaskets 180 may be any gaskets that retain the over component 102 in an assembled arrangement with the under component 104. One example of gaskets that may be used includes two o-ring gaskets as shown in FIGS. 20A-20C.

As shown in FIG. 18, in one or more embodiments, the ring 100 is assembled from an under component 200 a rim component 202, and a center component 106. The components of the ring 100 are assembled and maintained in the assembled configuration using a single gasket 206 such as, for example, an o-ring gasket, based on a reversible assembly method. In such a configuration the rim component 202 and the under component 200 are coupled using the gasket 206, which retains the components in an assembled arrangement. The gasket 206 may be any gasket that retains the rim component 206 in an assembled arrangement with the under component 200. One example of gaskets that may be used includes an o-ring gasket as shown in FIGS. 20A-20C.

As shown in FIG. 19, in one or more embodiments, the over component 222 is constructed to extend approximately half the width of the under component 224. The center component 226 of the ring 100 sits on both the over component 222 and the under component 224. the over component 222, is constructed such that the distal end of the under component 224 is notched or stepped 230, forming a lower outer edge 232 and an upper outer edge 234. In certain embodiments, a portion of the step or notch 230 extends below the lower outer edge 232 to form a groove 109 (as shown in FIGS. 3, 8A and 8C) at the junction, i.e., transition, between the lower outer edge 232 and upper outer edge 234. The over component 222 extends over the lower outer edge 232 but only up to the notch 230. The upper outer edge 234 of the under component 224 has substantially the same diameter as the outer edge 236 of the over component 222. The over component 222, the under component 224 and the center component 226 are assembled and maintained in the assembled configuration using an interference fit or compression fit method or using a slip-fit method. When a slip-fit method is used, a bonding agent 228, such as, for example, an adhesive or glue or a retaining compound, is used to adhere or couple the over component 222 and the under component 224 at the border between the lower outer edge 232 of the under component 224 and the inner edge 238 of the over component 222. The bonding agent 228 may be any compound that binds the over component 222 and the under component 224. A retaining compound is used to secure non-threaded, slip-fit, cylindrical assemblies, such as the over component 222 and the under component 224 with its ability to expand during the curing process and fill any tiny gaps. One example of a retaining compound that may be used includes Loctite 620 manufactured by Henkel which is specifically designed to secure non-threaded, slip-fit, cylindrical assemblies and having an ability to expand during the curing process and fill any tiny gaps up to 0.015" wide. Alternative retaining compounds include Vibra-tite and Cyberbond.

In one or more embodiments, the notch may be formed at a ninety degree angle. In one or more other embodiments the notch may be formed at about a 20 degree angle, about a 25 degree angle, about a 30 degree angle, about a 35 degree angle, about a 40 degree angle, about a 45 degree angle, about a 50 degree angle, about a 55 degree angle, about a 60 degree angle, about a 65 degree angle, about a 70 degree angle, about a 75 degree angle, about an 80 degree angle, about an 85 degree angle, about a 90 degree angle, about a 95 degree angle, about a 100 degree angle, about a 105 degree angle, about a 110 degree angle, about a 115 degree angle, about a 120 degree angle, about a 125 degree angle, about a 130 degree angle, about a 135 degree angle, about a 140 degree angle, about a 145 degree angle, about a 150 degree angle, or about a 160 degree angle.

In one or more embodiments, the notch 230 in the under component 224 is formed beginning about 1 percent of the distance between the distal edge 242 of the rim 240 of the under component 224 and the distal edge 246 of the rim 248 of the over component 222, in the direction of the distal end 244 of the under component. In one or more embodiments, the notch is formed beginning about 2 percent, about 3 percent, about 4 percent, about 5 percent, about 6 percent, about 7 percent, about 8 percent, about 9 percent, about 10 percent, about 11 percent, about 12 percent, about 13 percent, about 14 percent, about 15 percent, about 16 percent, about 17 percent, about 18 percent, about 19 percent, about 20 percent, about 21 percent, about 22 percent, about 23 percent, about 24 percent, about 25 percent, about 26 percent, about 27 percent, about 28 percent, about 29 percent, about 30 percent, about 31 percent, about 32 percent, about 33 percent, about 34 percent, about 35 percent, about 36 percent, about 37 percent, about 38 percent, about 39 percent, about 40 percent, about 41 percent, about 42 percent, about 43 percent, about 44 percent, about 45 percent, about 46 percent, about 47 percent, about 48 percent, about 49 percent, about 50 percent, about 51 percent, about 52 percent, about 53 percent, about 54 percent, about 55 percent, about 56 percent, about 57 percent, about 58 percent, about 59 percent, about 60 percent, about 61 percent, about 62 percent, about 63 percent, about 64 percent, about 65 percent, about 66 percent, about 67 percent, about 68 percent, about 69 percent, about 70 percent, about 71 percent, about 72 percent, about 73 percent, about 74 percent, about 75 percent, about 76 percent, about 77 percent, about 78 percent, about 79 percent, about 80 percent, about 81 percent, about 82 percent, about 83 percent, about 84 percent, about 85 percent, about 86 percent, about 87 percent, about 88 percent, about 89 percent, about 90 percent, about 91 percent, about 92 percent, about 93 percent, about 94 percent, about 95 percent, about 96 percent, about 97 percent, about 98 percent, or about 99 percent of the distance between the distal edge 242 of the rim 240 of the under component 224 and the distal edge 246 of the rim 248 of the over component 222, in the direction of the distal end 244 of the under component.

Examples of tolerances that can be used to, achieve a coupling using the interference fit or compression fit method for a ring having a tungsten carbide over component and a tungsten carbide under component are shown in FIGS. 22A-22E. FIG. 22A shows the point of measurement of the outer diameter of the under component A. FIG. 22B shows the points of measurement of the inner diameter and the outer diameter of the over component B. FIG. 22C shows the point of measurement of the inner diameter of the center component. FIG. 21D shows an assembled ring having an under components, an over component (i.e., A+B), and a center component, and shows the gap between the over component and the under component. FIG. 21E is a table showing, for each ring size, the measurements of the outside diameter of the under component, the inside diameter of the over component, the gap size between the over component and the under component, the outside diameter of the over component, the inside diameter of the center component, and the tolerances of each of the components and of the gap size. In one or more embodiments the tolerances for the slip-fit method include a Gap equal to about 0.10 mm (tolerance+/−0.0025 mm). In one or more embodiments the tolerances for the compression fit method include a Gap equal to about 0.025 mm (tolerance+/−0.005 mm).

In one or more embodiments, a ring that is formed as described herein includes rings having a width ranging from about 4 mm to about 16 mm. In one or more embodiments, the ring is about 4.25 mm, about 4.50 mm, about 4.75 mm, about 5.00 mm, about 5.25 mm, about 5.50 mm, about 5.75 mm, about 6.00 mm, about 6.25 mm, about 6.50 mm, about 6.75 mm, about 7.00 mm, about 7.25 mm, about 7.50 mm, about 7.75 mm, about 8.00 mm, about 8.25 mm, about 8.50 mm, about 8.75 mm, about 9.00 mm, about 9.25 mm, about 9.50 mm, about 9.75 mm, about 10.00 mm, about 10.25 mm, about 10.50 mm, about 10.75 mm, about 11.00 mm, about 11.25 mm, about 11.50 mm, about 11.75 mm, about 12.00 mm, about 12.25 mm, about 12.50 mm, about 12.75 mm, about 13.00 mm, about 13.25 mm, about 13.50 mm, about 13.75 mm, about 14.00 mm, about 14.25 mm, about 14.50 mm, about 14.75 mm, about 15.00 mm, about 15.25 mm, about 15.50 mm, about 15.75 mm, or about 16.00 mm wide.

In one or more embodiments, a ring according the present disclosure may be constructed from a variety of materials, having carious compositions, and using a variety of construction methods. Various compositions for each of the over component, the under component and the center component are shown in FIG. 23. For example, one or more of the components of the ring may be constructed from the materials described below.

Figure 24:
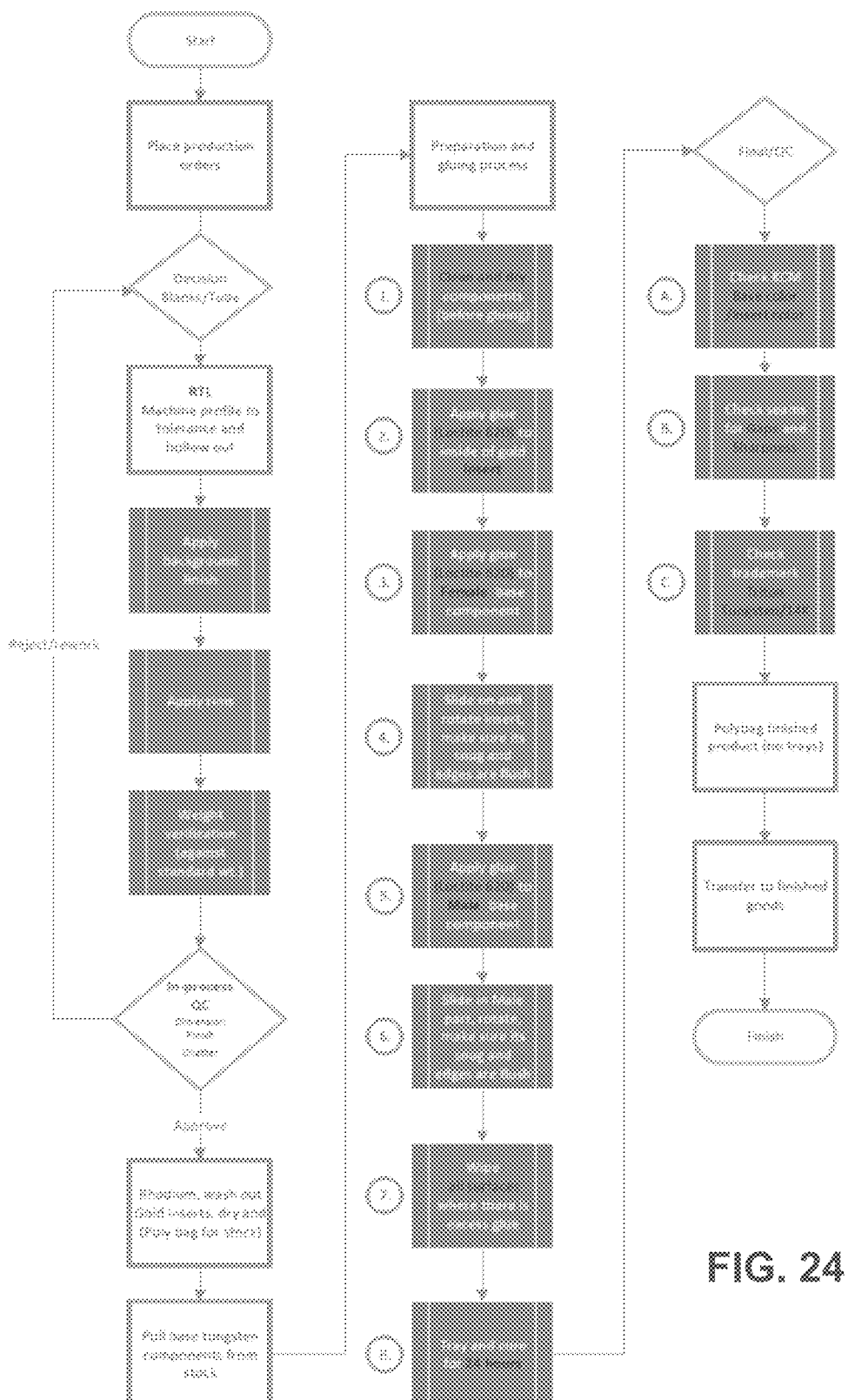
FIG. 24 shows a process for constructing a ring, according to one or more embodiments of the present disclosure.

In one or more embodiments, a process for constructing a ring is described in FIG. 24.

Figure 25:
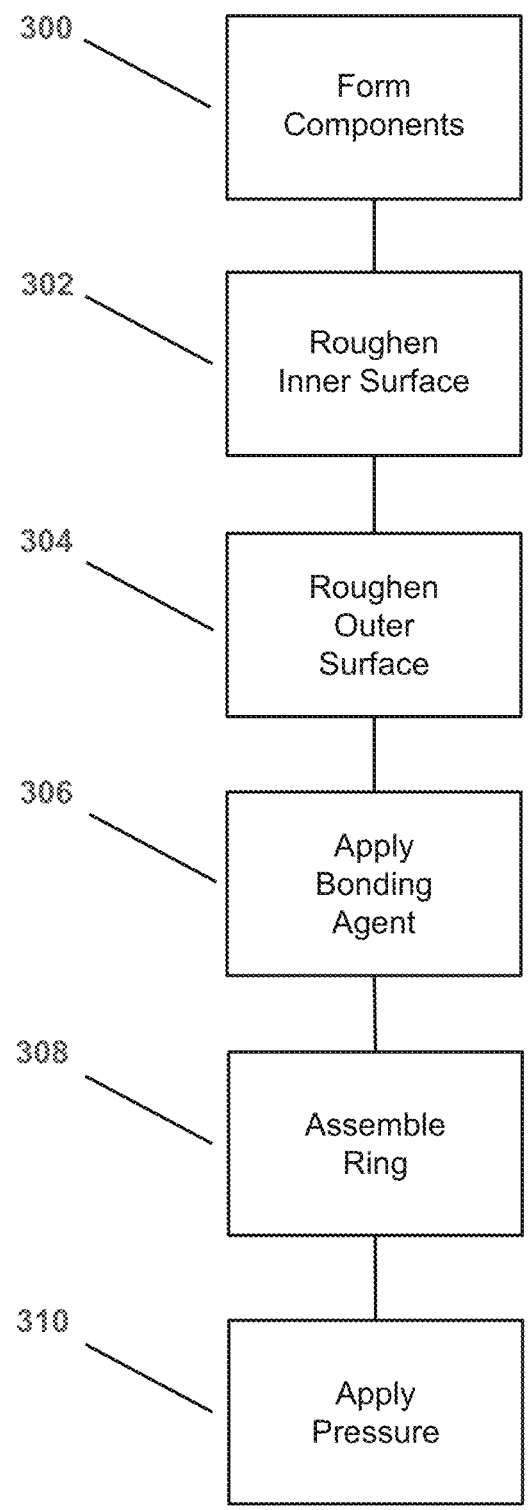
FIG. 25 shows a process for constructing a ring using a slip-fit method, according to one or more embodiments of the present disclosure.

In one or more embodiments, a process for manufacturing a ring using a slip-fit method according to an embodiment of the present disclosure is shown in FIG. 25. In step 300, the components of the ring are formed, this includes forming the over component, the under component and the center component. These components may be formed by any process currently known, such as, for example, sintering, molding, forging, stamping, carving, extruding, bonding, coating, or any other method currently known or developed in the future. In step 302, the inner surface of the over component is roughened to prepare the inner component for assembly.

In step 304, the outer surface of the under component is roughened to prepare the under component for assembly. The roughening can be accomplished by sanding, chemical etching, grinding, scratching, manual etching, or some other method, either physical, chemical or electrical, now known or future developed. In step 306, a bonding agent is applied to either the inner surface of the over component, the outer surface of the inner component, or both surfaces. In step 308, the center component is placed over the over component and then the under component is inserted into the over component. In step 310, pressure is applied until the bonding agent is fixed to the over component and under component.

Figure 26:
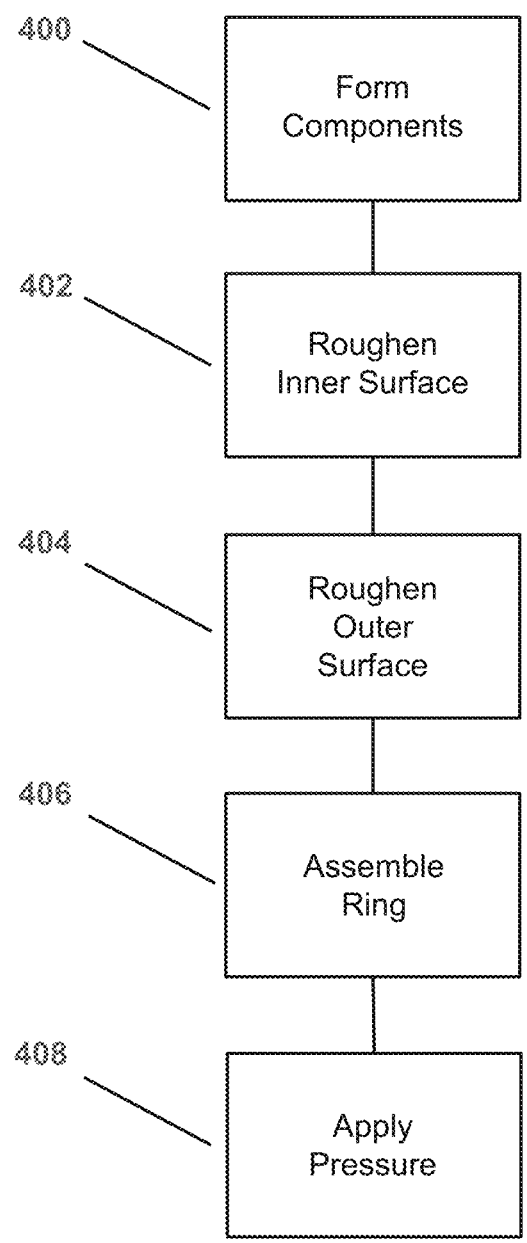
FIG. 26 shows a process for constructing a ring using a compression fit method, according to one or more embodiments of the present disclosure.

In one or more embodiments, a process for manufacturing a ring using a compression fit method according to an embodiment of the present disclosure is shown in FIG. 26. In step 400, the components of the ring are formed, this includes forming the over component, the under component and the center component. These components may be formed by any process currently known, such as, for example, sintering, molding, forging, stamping, carving, extruding, bonding, coating, or any other method currently known or developed in the future. In step 402, the inner surface of the over component is roughened to prepare the inner component for assembly. In step 404, the outer surface of the under component is roughened to prepare the under component for assembly. The roughening can be accomplished by sanding, chemical etching, grinding, scratching, manual etching, or some other method, either physical, chemical or electrical, now known or future developed. In step 406, the center component is placed over the over component and then the under component is inserted into the over component. In step 408, pressure is applied until the under component is fully inserted into the over component.

Figure 27:
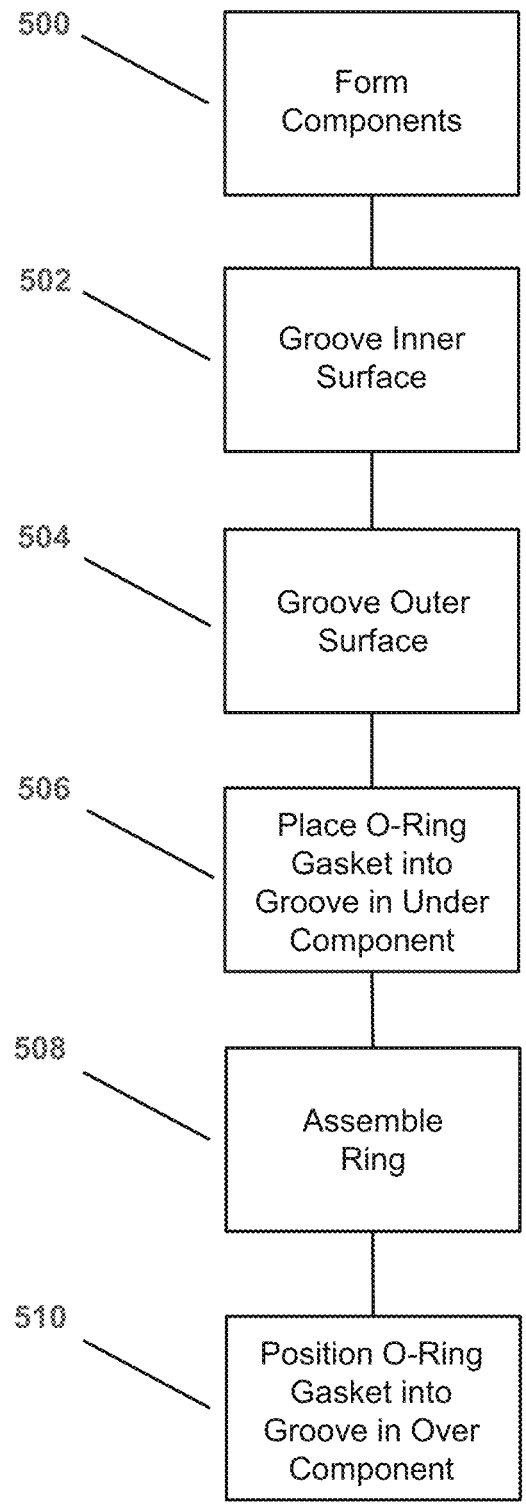
FIG. 27 shows a process for constructing a ring using an o-ring gasket, according to one or more embodiments of the present disclosure.

In one or more embodiments, a process for manufacturing a ring using an o-ring gasket according to an embodiment of the present disclosure is shown in FIG. 27. In step 500, the components of the ring are formed, this includes forming the over component, the under component and the center component. These components may be formed by any process currently known, such as, for example, sintering, molding, forging, stamping, carving, extruding, bonding, coating, or any other method currently known or developed in the future. In step 502, a groove is formed on the inner surface of the over component to prepare the inner component for location of the o-ring gasket. In step 504, a groove is formed in the outer surface of the under component to prepare the under component for placement of the o-ring gasket. The grooving can be accomplished by sanding, chemical etching, grinding, scratching, manual etching, or some other method, either physical, chemical or electrical, now known or future developed. In step 506, the o-ring gasket is placed onto the under component and positioned in the groove. In step 508, the center component is placed over the over component and then the under component is inserted into the over component. In step 510, pressure is applied until the o-ring gasket is positioned in the groove in the over component.

In one or more embodiments, the components are made of tungsten carbide employing all of the traditional methods of tungsten manufacturing. Mixing, Blending, pressing/injecting, sintering, Grinding, tumbling, honing, polishing. Tungsten carbide base components are offered in both Classic (no PVD plating) and also in White Tungsten (as described below). Colors include White, Black PVD, Classic, Black, Yellow gold, Rose Gold, Blue PVD, and all other colors.

In one or more embodiments, cemented carbide compositions are formulated with about 0.0 to about 3.5 wt. % Cr and about 10 to about 35 wt. % Co with no additional constituents. In another embodiment, cemented carbide compositions are formulated with about 1.5 to about 3.5 wt. % Cr and about 10 to about 35 wt. % Co with no additional constituents. In another embodiment, cemented carbide compositions are formulated with about 1.5 to about 3.5 wt. % Cr and about 30 to about 35 wt. % Co with no additional constituents. In another embodiment, cemented carbide compositions are formulated with about 0.0 wt. % Cr, about 0.1 wt. % Cr, about 0.2 wt. % Cr, about 0.3 wt. % Cr, about 0.4 wt. % Cr, about 0.5 wt. % Cr, about 0.6 wt. % Cr, about 0.7 wt. % Cr, about 0.8 wt. % Cr, about 0.9 wt. % Cr, about 1.0 wt. % Cr, about 1.1 wt. % Cr, about 1.2 wt. % Cr, about 1.3 wt. % Cr, about 1.4 wt. % Cr, about 1.5 wt. % Cr, about 1.6 wt. % Cr, about 1.7 wt. % Cr, about 1.8 wt. % Cr, about 1.9 wt. % Cr, about 2.0 wt. % Cr, about 2.1 wt. % Cr, about 2.2 wt. % Cr, about 2.3 wt. % Cr, about 2.4 wt. % Cr, about 2.5 wt. % Cr, about 2.6 wt. % Cr, about 2.7 wt. % Cr, about 2.8 wt. % Cr, about 2.9 wt. % Cr, about 3.0 wt. % Cr, about 3.1 wt. % Cr, about 3.2 wt. % Cr, about 3.3 wt. % Cr, about 3.4 wt. % Cr, or about 3.5 wt. % Cr, and with about 8 wt. % Co, about 9 wt. % Co, about 10 wt. % Co, about 11 wt. % Co, about 12 wt. % Co, about 13 wt. % Co, about 14 wt. % Co, about 15 wt. % Co, about 16 wt. % Co, about 17 wt. % Co, about 18 wt. % Co, about 19 wt. % Co, about 20 wt. % Co, about 21 wt. % Co, about 22 wt. % Co, about 23 wt. % Co, about 24 wt. % Co, about 25 wt. % Co, about 26 wt. % Co, about 27 wt. % Co, about 28 wt. % Co, about 29 wt. % Co, about 3 wt. % Co, about 31 wt. % Co, about 32 wt. % Co, about 33 wt. % Co, about 34 wt. % Co, or about 35 wt. % Co, and with no additional constituents.

In another embodiment, cemented carbide compositions are formulated with about 0.0-3.5 wt. % Cr and about 10-35 wt. % Co with additional constituents selected from Ti, Nb, Ta, boride, nitride Ta, Mo, V, Zr, Hf, Re, Ru, Rh, Os, Ir, Pt, Au, Ag, Fe or other rare earth elements. In another embodiment, cemented carbide compositions are formulated with about 0.0-3.5 wt. % Cr and about 30-35 wt. % Co with additional constituents selected from Ti, Nb, Ta, boride, nitride, boride, nitride Ta, Mo, V, Zr, Hf, Re, Ru, Rh, Os, Ir, Pt, Au, Ag, Fe or other rare earth elements. In another embodiment, cemented carbide compositions are formulated with about 0.0 wt. % Cr, about 0.1 wt. % Cr, about 0.2 wt. % Cr, about 0.3 wt. % Cr, about 0.4 wt. % Cr, about 0.5 wt. % Cr, about 0.6 wt. % Cr, about 0.7 wt. % Cr, about 0.8 wt. % Cr, about 0.9 wt. % Cr, about 1.0 wt. % Cr, about 1.1 wt. % Cr, about 1.2 wt. % Cr, about 1.3 wt. % Cr, about 1.4 wt. % Cr, about 1.5 wt. % Cr, about 1.6 wt. % Cr, about 1.7 wt. % Cr, about 1.8 wt. % Cr, about 1.9 wt. % Cr, about 2.0 wt. % Cr, about 2.1 wt. % Cr, about 2.2 wt. % Cr, about 2.3 wt. % Cr, about 2.4 wt. % Cr, about 2.5 wt. % Cr, about 2.6 wt. % Cr, about 2.7 wt. % Cr, about 2.8 wt. % Cr, about 2.9 wt. % Cr, about 3.0 wt. % Cr, about 3.1 wt. % Cr, about 3.2 wt. % Cr, about 3.3 wt. % Cr, about 3.4 wt. % Cr, or about 3.5 wt. % Cr, and with about 8 wt. % Co, about 9 wt. % Co, about 10 wt. % Co, about 11 wt. % Co, about 12 wt. % Co, about 13 wt. % Co, about 14 wt. % Co, about 15 wt. % Co, about 16 wt. % Co, about 17 wt. % Co, about 18 wt. % Co, about 19 wt. % Co, about 20 wt. % Co, about 21 wt. % Co, about 22 wt. % Co, about 23 wt. % Co, about 24 wt. % Co, about 25 wt. % Co, about 26 wt. % Co, about 27 wt. % Co, about 28 wt. % Co, about 29 wt. % Co, about 3 wt. % Co, about 31 wt. % Co, about 32 wt. % Co, about 33 wt. % Co, about 34 wt. % Co, or about 35 wt. % Co, and with one or more additional constituents selected from Ti, Nb, boride, nitride, Ta, Mo, V, Zr, Hf, Re, Ru, Rh, Os, Ir, Pt, Au, Ag, Fe, or other rare earth elements.

In another embodiment, cemented carbide compositions are formulated with about 0.0 to about 3.5 wt. % Cr and about 10 to about 35 wt. % Co with additional constituents comprising boride and/or nitride. In another embodiment, cemented carbide compositions are formulated with about 0.0 to about 3.5 wt. % Cr and about 10 to about 35 wt. % Co and with less than about 90 wt. % WC. In another embodiment, cemented carbide compositions are formulated with about 0.0 to about 3.5 wt. % Cr and about 30 to about 35 wt. % Co and with less than about 90 wt. % WC. In another embodiment, cemented carbide compositions are formulated with about 0.0 wt. % Cr, about 0.1 wt. % Cr, about 0.2 wt. % Cr, about 0.3 wt. % Cr, about 0.4 wt. % Cr, about 0.5 wt. % Cr, about 0.6 wt. % Cr, about 0.7 wt. % Cr, about 0.8 wt. % Cr, about 0.9 wt. % Cr, about 1.0 wt. % Cr, about 1.1 wt. % Cr, about 1.2 wt. % Cr, about 1.3 wt. % Cr, about 1.4 wt. % Cr, about 1.5 wt. % Cr, about 1.6 wt. % Cr, about 1.7 wt. % Cr, about 1.8 wt. % Cr, about 1.9 wt. % Cr, about 2.0 wt. % Cr, about 2.1 wt. % Cr, about 2.2 wt. % Cr, about 2.3 wt. % Cr, about 2.4 wt. % Cr, about 2.5 wt. % Cr, about 2.6 wt. % Cr, about 2.7 wt. % Cr, about 2.8 wt. % Cr, about 2.9 wt. % Cr, about 3.0 wt. % Cr, about 3.1 wt. % Cr, about 3.2 wt. % Cr, about 3.3 wt. % Cr, about 3.4 wt. % Cr, or about 3.5 wt. % Cr, and with about 8 wt. % Co, about 9 wt. % Co, about 10 wt. % Co, about 11 wt. % Co, about 12 wt. % Co, about 13 wt. % Co, about 14 wt. % Co, about 15 wt. % Co, about 16 wt. % Co, about 17 wt. % Co, about 18 wt. % Co, about 19 wt. % Co, about 20 wt. % Co, about 21 wt. % Co, about 22 wt. % Co, about 23 wt. % Co, about 24 wt. % Co, about 25 wt. % Co, about 26 wt. % Co, about 27 wt. % Co, about 28 wt. % Co, about 29 wt. % Co, about 3 wt. % Co, about 31 wt. % Co, about 32 wt. % Co, about 33 wt. % Co, about 34 wt. % Co, or about 35 wt. % Co, and with one or more additional constituents comprising less than about 90 wt. % WC.

In another embodiment, cemented carbide compositions are formulated with from about 10 to about 35 wt. % Co and no Cr. In another embodiment, cemented carbide compositions are formulated with from about 30 to about 35 wt. % Co and no Cr. In yet another embodiment, cemented carbide compositions are formulated with from about 15 to about 30 wt. % Co and no Cr. In another embodiment, cemented carbide compositions are formulated with from about 8 wt. % Co, about 9 wt. % Co, about 10 wt. % Co, about 11 wt. % Co, about 12 wt. % Co, about 13 wt. % Co, about 14 wt. % Co, about 15 wt. % Co, about 16 wt. % Co, about 17 wt. % Co, about 18 wt. % Co, about 19 wt. % Co, about 20 wt. % Co, about 21 wt. % Co, about 22 wt. % Co, about 23 wt. % Co, about 24 wt. % Co, about 25 wt. % Co, about 26 wt. % Co, about 27 wt. % Co, about 28 wt. % Co, about 29 wt. % Co, about 3 wt. % Co, about 31 wt. % Co, about 32 wt. % Co, about 33 wt. % Co, about 34 wt. % Co, or about 35 wt. % Co, and no Cr. In another embodiment, cemented carbide compositions are formulated with from about 10-35 wt. % Co and no Cr but with one or more additional constituents such as boride, nitride Ta, Mo, V, Zr, Hf, Re, Ru, Rh, Os, Ir, Pt, Au, Ag, Fe or other rare earth elements. In another embodiment, cemented carbide compositions are formulated with from about 30-35 wt. % Co and no Cr but with one or more additional constituents such as a boride, nitride Ta, Mo, V, Zr, Hf, Re, Ru, Rh, Os, Ir, Pt, Au, Ag, Fe or other rare earth elements. In another embodiment, cemented carbide compositions are formulated with from about 8 wt. % Co, about 9 wt. % Co, about 10 wt. % Co, about 11 wt. % Co, about 12 wt. % Co, about 13 wt. % Co, about 14 wt. % Co, about 15 wt. % Co, about 16 wt. % Co, about 17 wt. % Co, about 18 wt. % Co, about 19 wt. Co, about 20 wt. % Co, about 21 wt. % Co, about 22 wt. % Co, about 23 wt. % Co, about 24 wt. % Co, about 25 wt. % Co, about 26 wt. % Co, about 27 wt. % Co, about 28 wt. % Co, about 29 wt. % Co, about 3 wt. % Co, about 31 wt. % Co, about 32 wt. % Co, about 33 wt. % Co, about 34 wt. % Co, or about 35 wt. % Co, and no Cr but with one or more additional constituents comprising at least one of boride, nitride Ta, Mo, V, Zr, Hf, Re, Ru, Rh, Os, Ir, Pt, Au, Ag, Fe or other rare earth elements.

In an embodiment, the cemented carbide compositions are manufactured utilizing a metal injection molding (MIM) technique. In another embodiment, the cemented carbide compositions are manufactured utilizing a lost wax molding process. In still another embodiment, the cemented carbide compositions are manufactured utilizing a sintered technique. In still another embodiment, the cemented carbide compositions are manufactured utilizing an investment casting technique.

In an embodiment, cemented carbide compositions are formulated with about 0.0 to about 3.5 wt. % Cr and about 10 to about 35 wt. % Co and the remainder of the composition, for example, the binder or other portion of the article, optionally comprises one or more of: Ta, Nb, Mo, Ti, V, Zr, Hf, Re, Ru, Rh, Os, Ir, Pt, Au, Ag, and/or Fe.

In an embodiment, cemented carbide compositions are formulated with about 1.0 to about 3.5 wt. % Cr and about 10 to about 35 wt. % Co and the remainder of the composition, for example, the binder or other portion of the article, optionally comprises one or more of: Ta, Nb, Mo, Ti, V, Zr, Hf, Re, Ru, Rh, Os, Ir, Pt, Au, Ag, and/or Fe.

In another embodiment, cemented carbide compositions are formulated with about 0.0 to about 3.5 wt. % Cr and about 10 to about 35 wt. % Co and the remainder of the composition, for example, the binder or other portion of the article, comprises may optionally have one or more of: Ta, Nb, Mo, Ti, V, Zr, Hf, Re, Ru, Rh, Os, Ir, Pt, Au, Ag, and/or Fe. In another embodiment, cemented carbide compositions are formulated with about 1.0 to about 3.5 wt. % Cr and about 10 to about 35 wt. % Co and the remainder of the composition, for example, the binder or other portion of the article, comprises may optionally have one or more of: Ta, Nb, Mo, Ti, V, Zr, Hf, Re, Ru, Rh, Os, Ir, Pt, Au, Ag, and/or Fe. In another embodiment, cemented carbide compositions are formulated with about 0.0 to about 3.5 wt. % Cr and about 30 to about 35 wt. % Co and the remainder of the composition, for example, the binder or other portion of the article, comprises one or more of: Ta, Nb, Mo, Ti, V, Zr, Hf, Re, Ru, Rh, Os, Ir, Pt, Au, Ag, and/or Fe. In another embodiment, cemented carbide compositions are formulated with about 0.0 wt. % Cr, about 0.1 wt. % Cr, about 0.2 wt. % Cr, about 0.3 wt. % Cr, about 0.4 wt. % Cr, about 0.5 wt. % Cr, about 0.6 wt. % Cr, about 0.7 wt. % Cr, about 0.8 wt. % Cr, about 0.9 wt. % Cr, about 1.0 wt. % Cr, about 1.1 wt. % Cr, about 1.2 wt. % Cr, about 1.3 wt. % Cr, about 1.4 wt. % Cr, about 1.5 wt. % Cr, about 1.6 wt. % Cr, about 1.7 wt. % Cr, about 1.8 wt. % Cr, about 1.9 wt. % Cr, about 2.0 wt. % Cr, about 2.1 wt. % Cr, about 2.2 wt. % Cr, about 2.3 wt. % Cr, about 2.4 wt. % Cr, about 2.5 wt. % Cr, about 2.6 wt. % Cr, about 2.7 wt. % Cr, about 2.8 wt. % Cr, about 2.9 wt. % Cr, about 3.0 wt. % Cr, about 3.1 wt. % Cr, about 3.2 wt. % Cr, about 3.3 wt. % Cr, about 3.4 wt. % Cr, or about 3.5 wt. % Cr, and with about 8 wt. % Co, about 9 wt. % Co, about 10 wt. % Co, about 11 wt. % Co, about 12 wt. % Co, about 13 wt. % Co, about 14 wt. % Co, about 15 wt. % Co, about 16 wt. % Co, about 17 wt. % Co, about 18 wt. % Co, about 19 wt. % Co, about 20 wt. % Co, about 21 wt. % Co, about 22 wt. % Co, about 23 wt. % Co, about 24 wt. % Co, about 25 wt. % Co, about 26 wt. % Co, about 27 wt. % Co, about 28 wt. % Co, about 29 wt. % Co, about 3 wt. % Co, about 31 wt. % Co, about 32 wt. % Co, about 33 wt. % Co, about 34 wt. % Co, or about 35 wt. % Co, and the remainder of the composition, for example, the binder or other portion of the article, optionally comprises one or more of: Ta, Nb, Mo, Ti, V, Zr, Hf, Re, Ru, Rh, Os, Ir, Pt, Au, Ag, and/or Fe.

In an embodiment, in addition to Co and Cr, the remainder of the composition, for example, the binder or other portion of the article, optionally comprises one or more of: Ta, Nb, Mo, Ti, V, Zr, Hf, Re, Ru, Rh, Os, Ir, Pt, Au, Ag, and/or Fe.

In one or more embodiment, the article includes one or more materials, including, without limitation, one or more of Ta, Nb, Mo, Ti, V, Zr, Hf, Re, Ru, Rh, Os, or Ir used to form a cermet, or a carbide, boride, and/or nitride based composition.

In an embodiment, compositions, and articles, including jewelry articles and components of jewelry articles, formed at least in part thereby, according to the certain embodiments of the present disclosure, are substantially free of nickel.

Compositions, and articles, including jewelry articles and components of jewelry articles, formed at least in part thereby, according to certain embodiments of the present disclosure, include one or more rare earth metals, cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), or yttrium (Y), Actinium, Thorium, Protactinium, Uranium, Neptunium, Plutonium, Americium, Curium, Berkelium, Californium, Einsteinium, Fermium, Mendelevium, Nobelium, Lawrencium.

In some embodiments, an article formed according to the principles of the present disclosure further possesses a density of about 10.00 to about 15.00 g/cm$^3$. By way of non-limiting example, according to certain optional embodiments the following compositions possess the following density values.

| % of Cobalt Binder | gm/cm$^3$ |
| --- | --- |
| 35 | 12.14 |
| 30 | 12.72 |
| 22 | 13.30 |
| 20 | 13.32 |

In some embodiments, an article formed according to the principles of the present disclosure further possesses a hardness of about 900 HV to about 1150 HV.

In other embodiments, an article formed according to the principles of the present disclosure further possesses a hardness of about 700 HV to about 1400 HV or about 800 HV to about 1400 HV.

In some embodiments, an article formed according to the principles of the present disclosure further possesses a cracking load of no more than about 1000 lbf.

In some embodiments, an article formed according to the principles of the present disclosure optionally possesses a coloration characterized by L*, a*, b* values of about L*48.5, about a*0.77, and about b*3.7 where L* is the black-white range where a L*=0 yields black and a L* of 100 indicates a diffuse white; a* is the green-magenta scale where negative values indicate green while positive values indicate magenta; and b* is the blue to yellow range where negative values indicate blue and positive values indicate yellow.

In some embodiments, an article formed according to the principles of the present disclosure are characterized as having an average grain size of preferably about 2 to about 4 μm and more preferably about 1.4 μm to about 2.0 μm, as measured using ASTM390-92(06).

In some embodiments, an article formed according to the principles of the present disclosure possesses a corrosion resistance, when tested utilizing Salt Spray (ASTM B117, ISO 9227).

In some embodiments, an article formed according to the principles of the present disclosure possess an abrasion resistance.

In some embodiments, the article is in the form of an item of jewelry.

In some embodiments, the jewelry article or component of the jewelry article is a ring, ornamental ring, engagement ring, toe ring, watch, watchcase, bracelet, necklace, pendant, electronic accessories, charm, armlet, brocade, pin, clip, hairclip, fob, ornamental piercing, earring, nose ring, dog tag, chain, amulet, bangle bracelet, cuff bracelet, link bracelet, cuff link, key chain, money clip, cell phone charm, signet ring, class ring, friendship ring or purity ring or a component any of the foregoing.

In some embodiments, the article is in the form of a finger ring.

In some embodiments, the article includes at least one of a precious metal, a stone, a gemstone, a crystal, or another material suitable for use in jewelry affixed to the article.

In some embodiments, the article includes one or more coatings, including coatings as described and disclosed in U.S. Pat. Nos. 8,927,107, 8,932,437, 8,956,510, and 9,034,488, and in U.S. patent application Ser. Nos. 13/152,226, 14/166,776, 14/589,924, and 14/715,556, each of which is incorporated herein in its entirety for all purposes.

In some embodiments, one or more of the problems and deficiencies of the prior art discussed above are addressed. However, it is contemplated that certain embodiments are useful in addressing other problems and deficiencies, or provide benefits and advantages, in a number of technical areas. Therefore the claims should not necessarily be construed as being limited to addressing any of the particular problems or deficiencies discussed herein.

In various samples formulated using the various embodiments, chemical analysis was performed for samples BC-30 and BC-35. As used herein BC-30 and BC-35 refer to samples using 30% and 35% cobalt based binder respectively. Some examples are shown in Table 1.

TABLE 1

| Chemical Analysis (Wt %) | | |
| --- | --- | --- |
| Element | Sample BC-30 | Sample BC-35 |
| Silicon | 0.07 | 0.05 |
| Iron | <0.01 | 0.02 |
| Copper | — | — |
| Manganese | 0.02 | 0.02 |
| Nickel | 0.01 | 0.01 |
| Cobalt | 26.20 | 29.53 |
| Potassium | 0.02 | 0.02 |
| Chromium | 1.55 | 1.30 |
| Titanium | 1.17 | 1.32 |
| Tantalum | 0.05 | 0.05 |
| Carbon | 3.73 | 3.65 |
| Sulfur | <0.01 | <0.01 |

TABLE 1-continued

| Chemical Analysis (Wt %) | | |
|---|---|---|
| Element | Sample BC-30 | Sample BC-35 |
| Tungsten | Balance | Balance |
| Density (g/ml) | 12.845 | 12.563 |

The reported density values are measured according to conventional gravimetric techniques as detailed in ASTM B311-13.

The "HV" hardness number values described herein refer to the hardness value measured according to the Vickers hardness test, performed according to the ASTM:E384-11$^{\varepsilon 1}$ standard (last revised March 2012) see www.astm.org, and incorporated herein by reference in its entirety.

This test method covers determination of the Knoop and Vickers hardness of materials, the verification of Knoop and Vickers hardness testing machines, and the calibration of standardized Knoop and Vickers test blocks. This test method covers Knoop and Vickers hardness tests made utilizing test forces in micro (9.807×10–3 to 9.807 N) (1 to 1000 gf) and macro (>9.807 to 1176.80 N) (>1 kg to 120 kgf) ranges. This test method includes all of the requirements to perform macro Vickers hardness tests as previously defined in Test Method E92, Standard Test Method for Vickers Hardness Testing.

Hardness tests have been found to be very useful for materials evaluation, quality control of manufacturing processes and research and development efforts. Hardness, although empirical in nature, can be correlated to tensile strength for many metals, and is an indicator of wear resistance and ductility. Microindentation hardness tests extend testing to materials that are too thin or too small for macroindentation hardness tests. Microindentation hardness tests also allow specific phases or constituents and regions or gradients too small for macroindentation hardness testing to be evaluated.

Because the Knoop and Vickers hardness will reveal hardness variations that may exist within a material, a single test value may not be representative of the bulk hardness. The Vickers indenter usually produces a geometrically similar indentation at all test forces. Except for tests at very low forces that produce indentations with diagonals smaller than about 25 μm, the hardness number will be essentially the same as produced by Vickers machines with test forces greater than 1 kgf, as long as the material being tested is reasonably homogeneous. For isotropic materials, the two diagonals of a Vickers indentation are equal in size. The Knoop indenter does not produce a geometrically similar indentation as a function of test force. Consequently, the Knoop hardness will vary with test force. Due to its rhombic shape, the indentation depth is shallower for a Knoop indentation compared to a Vickers indentation under identical test conditions. The two diagonals of a Knoop indentation are markedly different. Ideally, the long diagonal is 7.114 times longer than the short diagonal, but this ratio is influenced by elastic recovery. Thus, the Knoop indenter is very useful for evaluating hardness gradients or thin coatings of sectioned samples.

The reported "cracking load" values are measured according to the following methodology. In an embodiment, crack load testing was performed on BC-30 using a Stuller ring cracker. The ring cracker was applied to the ring and after additional power was supplied, the BC-30 sample flexed significantly before cracking into 3-4 pieces. The pieces did not shatter in shards but after the test, slight mars or indentations could be seen on the surface of the BC-30 parts. In another crack test, standard vise-grip or locking pliers are used to apply the force to the ring. In the BC-30 vise grip test, the locking mechanism was hand tightened with significant pressure. The ring itself cracked into a few pieces with generally no sharp edges. The ring did not splinter into shards. When testing with the same vise-grip method on TC850 ring, the sample cracked in many small shards having sharp edges.

In an embodiment, various specimens are subjected to crack testing resulting in the performance identified in Table 2.

TABLE 2

| CONFORMANCE/NONCONFORMANCE/ AS REPORTED: As Reported | | |
|---|---|---|
| CUSTOMER SPECIMEN ID: | BC-30 | TC-850 |
| PES SPECIMEN ID: | H576 | H577 |
| Original Specimen Width (inches) | 0.327 | 0.313 |
| Original Specimen Thickness (inches) | 0.0868 | 0.0952 |
| Peak Load (lbf) | 746 | 627 |
| Ultimate Compressive Strength (ksi) | 13.1 | 10.5 |
| Test Comment Code(s) | N | N |

An Intron 4206 30K Universal testing machine was used for load testing. Load or compression testing included applying an increasing amount of pressure to an annular part of a given geometry of the object, (i.e.: cross sectional thickness and volume) at a fixed head speed (0.05"/min). The test measured and recorded the amount of pressure at which the object begin to deform and the amount of pressure it took for the object to crack. The objective of the test was to compare the test results against materials of different composition, in an embodiment that included different binder percentages and make up. The results illustrated the increased ductility and overall toughness of the material as compared to standard formulations.

As used herein, "L," "a," and "b," refer to the color values measured according to the CIE 1976 (L*, a*, b*) color space (or CIELAB) scale. These values disclosed herein were measured by a Konica Minolta Spectrophotometer model CM-600. In an embodiment, as shown in Table 3, the following values were obtained for various samples.

TABLE 3

| | Data Name | L*(D65) | a*(D65) | b*(D65) |
|---|---|---|---|---|
| Target | Averaged Target BC-30 | 48.5 | 0.77 | 3.7 |
| Target | Averaged Target TC850 | 79.12 | 0.82 | 5.02 |
| Target | Averaged Target Cobalt | 80.61 | 1.05 | 5.89 |
| Target | Averaged Target White | 88.25 | 0.75 | 5.03 |
| Target | Averaged Target Black | 29.37 | 0.25 | 1.69 |
| Target | Averaged Target Yellow | 86.72 | 6.1 | 31.19 |
| Target | Averaged Target Rose | 85.31 | 14.76 | 25.94 |

In an embodiment L*48.5, a*0.77, b*3.7 were the values measured on an average target BC-30 object.

The average grain sizes reported herein are measured according to the ASTM E112-113 "Standard Test Methods for Determining Average Grain Size" adopted in 2013 and incorporated herein by reference in its entirety. In an embodiment, the average grain size was preferably about 2-4 μm and more preferably about 1.4 μm-2.0 μm as measured using ASTM390-92(06)

The corrosion resistance values described herein are measured according to the ASTM B-117, ISO9227 standard technique.

The abrasion resistance values described herein are measured according to the ASTM D4060 standard.

All of the stated compositions and methods disclosed herein are to be construed as "comprising," "consisting essentially of," and "consisting of" the stated constituents and method steps.

Articles, including jewelry articles and components of jewelry articles, formed according to the principles of the present disclosure can be formed, at least in part, from a particular composition.

According to further alternative embodiments, the composition is selected from a combination of one or more, or all, elements listed in the table below, in any of the amounts described in Table 4.

TABLE 4

| Constituent | Relative amounts in wt. %, modified in all cases by the term "about" |
|---|---|
| Co | 10-35%, 8%, 10%, 15%, 20%, 22%, 25%, 30% or 35% |
| Cr | 0-5%, 0.8%, 1.0%, 1.5%, 2.0%, 2.2%, 3.0%, 3.5%, 4%, 4.5% of 5% |
| C | 3% and 6.5%, 3%, 3.5%, 4%, 4.5%, 5%, 5.5%, 6%, 6.5% |
| Ta | <1%, (0 to 1%) .10%, .25%, .75% or 1% |
| Ti | <1% (0 to 1%) .10%, .25%, .75% or 1% |
| Fe | <1%, (0 to 1%) .10%, .25%, .75% or 1% |
| W | 40%-90%, 40%, 50%, 60%, 70%, 80%, 90% |
| Ni | <1% (0 to 1%) .10%, .25%, .75% or 1% |
| Si | <1%,. (0 to 1%), 10%, .25%, .75% or 1% |
| Mn | 0 to 1% .10%, .25%, .75% or 1% |
| K | 0 to 1% .10%, .25%, .75% or 1% |
| S | <1%, (0 to 1%), .10%, .25%, .75% or 1% |

Trace amounts of the following materials can be included in certain embodiments of the composition: Silicon, Manganese, Potassium, Copper, Sulfur, Nickel, Niobium, Molybdenum, Vandium, Zirconium, Hafnium, Rhenium, Ruthenium, Rhodium, Osmium and Iridium and other rare earth elements. In certain embodiment, the trace amounts may be about 0.0 to about 1.0 wt. % of the composition.

With respect to Co, the composition may include about 10 to about 35 wt. % of Co. Amounts of Co significantly below lower limit are not preferred because of the increased brittleness as a result of lower metallic binder content. Compositions that include Co in amounts above the upper limit of this range are not preferred because they will be too ductile and difficult to sinter, and not have the right balance of toughness and abrasion resistance.

With respect to Cr, the composition may include about 1.0 to about 5 wt. % Cr. Amounts of Cr significantly below lower limit are not preferred because the composition will not have oxidation resistance needed for daily consumer product usage. Compositions that include Cr in amounts above the upper limit of this range are not preferred because of increased grain growth, brittleness, and ETA phase.

With respect to Ni, the composition is preferably substantially free of nickel. In addition, or in the alternative, the compositions of the present disclosure may be formulated to comply with the EN1811/2011 standard for products intended to come into direct and prolonged contact with the skin.

Carbon exists in the composition in the form of a carbide with Cr ($Cr_xC_y$). Various carbide forms are contemplated, including one or more of: $Cr_3C_2$, $Cr_7C_3$, and/or $Cr_{23}C_6$. With respect to C, the composition may include about 3.0 to about 6.5 wt. % C. Amounts of C significantly below this lower limit are not preferred because the tungsten component will not be properly carburized for best performance. Compositions that include C in amounts above the upper limit of this range are not preferred because of brittleness, ETA Phase, and over carburization.

Compositions formed according to the principles of the present disclosure may include, in addition to the above-described elements, one or more of the following constituent elements, alone or in any combination: Ta, Nb, Mo, Ti, V, Zr, Hf, Re, Ru, Rh, Os, Ir, Pt, Au, Ag and/or Fe.

In an embodiment, rare earth additions (dopants) may be added to the primary materials and binders. Rare earth additions may provide desirable properties to the objects and may be added to the manufacturing process in any known way. Rare earth additives have been investigated and developed for mass production due to their obvious physical and mechanical properties such as hardness, transverse rupture strength, impact toughness, wear resistance, cutting life and so on. The studies on rare-earth doped cemented carbides in China including manufacturing techniques are reviewed in the "Study on rare-earth doped cemented carbides in China" by Liu Sha as reported in the Int. Journal of Refractory Metals & Hard Materials 27 (2009) 528-243, incorporated herein by reference in its entirety.

In some embodiment, the rare earth dopants include Lanthanum (La), Yttrium (Y), Samarium (Sm), NeoDynium (Nd), Cerium (Ce), PraseoDymium (Pr), and Gadolimium (Gd).

In some embodiments, the object composition may be broken down into three phases Alpha, Beta and Gamma, where Alpha ($\alpha$) is the primary material such as WC, Beta ($\beta$) is a metallic binder such as Co or Ni, and Gamma ($\gamma$) is any ancillary additives such as TiC or TaC. In some embodiments, the $\gamma$ phase may be broken into multiple phases.

In certain embodiments, objects made from the following formulations exhibited desirable properties. Various properties and formulations are shown in Table 5.

TABLE 5

| $\alpha$ Phase | | $\beta$ Phase | | $\gamma$ Phase | | $\gamma$-2 Phase | |
|---|---|---|---|---|---|---|---|
| 72% | WC | 8% | Co | 8% | TiC | 12% | TaC |
| 76% | WC | 8% | Co | 6% | TiC | 10% | TaC |
| 80% | WC | 10% | Co | 5% | TiC | 5% | TaC |

As will be understood by those skilled in the art, complex grades can have multiple elements/compounds to modify and formulate specific properties. In some embodiments, objects made from the above compositions had various transverse rupture strength (TRS), hardness, and density In some embodiments, the entire article is made from the composition. In other embodiments, only a portion of the article is made from the composition. For example, the decorative portion of a pin can be made from the composition and the rest of the pin can be made from standard materials. Where the article is a finger ring, the composition can comprise the majority of the ring, except for an inlaid gemstone, or an inlay in an annular groove formed in the composition, e.g., as illustrated in relation to rings made from tungsten carbide in U.S. Pat. No. 7,076,972. Those rings have at least one depression that extends into, and at least substantially around the circumference of, an outer surface of the finger ring. In some embodiments, the depression in those rings is substantially filled with a precious metal.

In additional embodiments, the composition can comprise a minority of the article, for example as a portion of a sculpture primarily made of other materials, or as a contrasting band in a ring made primarily from another metal such as gold or silver.

In some embodiments, the article is a decorative or artistic item, for example, a sculpture, a portion of a picture frame, a paperweight, a portion of a piece of furniture (e.g., an inlay), or jewelry. Non-limiting examples of jewelry that can be made from the Ti-based composition are rings (e.g., finger rings, toe rings, nose rings), pendants, tags, dog tags, hairclips, chains, watchcases, pins, bracelets, anklets, necklaces, earrings and charms.

The item of jewelry comprising the composition can further comprise any other material used in jewelry affixed or integrated into the item. Examples include a precious metal (e.g., gold, silver, platinum) either as part of the composition or affixed to the item, a stone, a gemstone, a crystal, or any other material suitable for use in jewelry affixed to the item.

In particular embodiments, the item of jewelry is a finger ring or a watch casing. The ring or watch casing can be made entirely of the composition, or the ring or watch casing can further comprise other materials, for example an inlaid gemstone, or an inlay in an annular groove formed in the composition. In an embodiment, the jewelry article may include inlays, gems, gemstones, minerals, rocks, stones, wood, rubber, or other precious or semi precious materials or metals. Inlays may include metals, stones, gems, minerals, glass, wood, rubber, plastic or any other materials including but not limited to gold, silver, platinum, steel, titanium, cobalt chrome, stainless steel, aluminum, carbon fiber, texallium fibers, and kevlar fibers. The inlay may cover a whole or a part of the jewelry article and can be flush mounted or surface mounted using any known techniques.

The articles, including jewelry articles and components of jewelry articles, provided herein can be made by any method known. In some embodiments, an ingot, bar, sheet or other form of the composition is provided, followed by cutting, shaping and polishing the ingot or bar to form a piece having a desired shape, then optionally polishing the piece with a finish polish.

In an embodiment, the article maybe manufactured by investment casting or other traditional industrial process based on and also called lost-wax casting. Investment or lost wax casting is described in US Patent Publication No. 2013/0287622 to Hoffman and U.S. Pat. No. 6,013,125 to Quraishi et al. entitled Investment of Powders and Method for Rapid Preparation of Investment Molds, both of which are incorporated herein in there entirety by reference.

In lost wax casting casts can be made of a wax model itself (the direct method); or of a wax copy of a model that need not be of wax (the indirect method). Wax casting may generally include producing a master pattern (model making) and then forming a mold, known as the master die. Wax patterns may be attached to a sprue or each other by means of a heated metal tool and then chased. Next, the ceramic mold, known as the investment, is produced by three repeating steps: coating, stuccoing, and hardening. The first step involves dipping the cluster into a slurry of fine refractory material and then letting any excess drain off, so a uniform surface is produced. In the second step, the cluster is stuccoed with a coarse ceramic particle, by dipping it into a fluidized bed, placing it in a rainfall-sander, or by applying by hand. Finally, the coating is allowed to harden. These steps are repeated until the investment is the required thickness. The investment is then allowed to completely dry.

Drying can be enhanced by applying a vacuum or minimizing the environmental humidity. It is then turned upside-down and placed in a furnace or autoclave to melt out and/or vaporize the wax. The mold is then subjected to a burnout to remove any moisture and residual wax, and to sinter the mold.

The steps of the indirect process include model-making, where an artist or mold-maker creates an original model from wax, clay, or another material. Wax and oil-based clay are often preferred because these materials retain their softness. Next, a mold is made of the original model or sculpture. The rigid outer molds contain the softer inner mold, which is the exact negative of the original model. Inner molds are usually made of latex, polyurethane rubber or silicone, which is supported by the outer mold. The outer mold can be made from plaster, but can also be made of fiberglass or other materials. Most molds are made of at least two pieces, and a shim with keys is placed between the parts during construction so that the mold can be put back together accurately. If there are long, thin pieces extending out of the model, they are often cut off of the original and molded separately. Sometimes many molds are needed to recreate the original model, especially for large models.

Once the mold is finished, molten wax is poured into it and swished around until an even coating, usually about ⅛ inch (3 mm) thick, covers the inner surface of the mold. This is repeated until the desired thickness is reached. Another method is to fill the entire mold with molten wax and let it cool until a desired thickness has set on the surface of the mold. After this the rest of the wax is poured out again, the mold is turned upside down and the wax layer is left to cool and harden. With this method it is more difficult to control the overall thickness of the wax layer.

This hollow wax copy of the original model is removed from the mold. The model-maker may reuse the mold to make multiple copies, limited only by the durability of the mold. Each hollow wax copy is then "chased": a heated metal tool is used to rub out the marks that show the parting line or flashing where the pieces of the mold came together. The wax is dressed to hide any imperfections. The wax now looks like the finished piece. Wax pieces that were molded separately can now be heated and attached; foundries often use registration marks to indicate exactly where they go. The wax copy is sprued with a treelike structure of wax that will eventually provide paths for the molten casting material to flow and for air to escape. The carefully planned spruing usually begins at the top with a wax "cup," which is attached by wax cylinders to various points on the wax copy. The spruing does not have to be hollow, as it will be melted out later in the process. A sprued wax copy is dipped into a slurry of silica, then into a sand-like stucco, or dry crystalline silica of a controlled grain size. The slurry and grit combination is called ceramic shell mold material, although it is not literally made of ceramic. This shell is allowed to dry, and the process is repeated until at least a half-inch coating covers the entire piece. The bigger the piece, the thicker the shell needs to be. Only the inside of the cup is not coated, and the cup's flat top serves as the base upon which the piece stands during this process.

The ceramic shell-coated piece is placed cup-down in a kiln, whose heat hardens the silica coatings into a shell, and the wax melts and runs out. The melted wax can be recovered and reused, although it is often simply burned up. Now all that remains of the original artwork is the negative space formerly occupied by the wax, inside the hardened ceramic shell. The feeder, vent tubes and cup are also now hollow. The ceramic shell is allowed to cool, then is tested to see if water will flow freely through the feeder and vent tubes. Cracks or leaks can be patched with thick refractory paste. To test the thickness, holes can be drilled into the shell, then patched. The shell is reheated in the kiln to harden the patches and remove all traces of moisture, then placed cup-upwards into a tub filled with sand. Metal is melted in a crucible in a furnace, then poured carefully into the shell. The shell has to be hot because otherwise the temperature difference would shatter it. The filled shells are then allowed to cool.

The shell is hammered or sand-blasted away, releasing the rough casting. The sprues, which are also faithfully recreated in metal, are cut off, the material to be reused in another casting. Metal-chasing. Just as the wax copies were chased, the casting is worked until the telltale signs of the casting process are removed, so that the casting now looks like the original model. Pits left by air bubbles in the casting and the stubs of the spruing are filed down and polished. Prior to silica-based casting molds, these molds were made of a variety of other fire-proof materials, the most common being plaster based, with added grout, and clay based.

The cemented articles, including jewelry articles and components of jewelry articles, of the present disclosure may also be made utilizing metal Injection Molding (MIM). As is well known, the MIM process may involve steps that combine metal powders with wax and/or plastic binders to produce a "feedstock" mix that can be injected as a liquid or semiliquid into a hollow mold using plastic injection molding machines. The "green part" is cooled and de-molded in the plastic molding machine. Next, a portion of the binder material is removed using solvent, thermal furnaces, catalytic process, or a combination of methods. The resulting part, in a condition called "brown" stage, requires the metal to be condensed utilizing a sintering process. MIM parts may be sintered in a single step or may be pre-sintered in multiple steps. Metals and articles, including jewelry articles and components of jewelry articles, manufactured utilizing the MIM process are compatible with traditional metal conditioning treatments such as plating, passivating, annealing, carburizing, nitriding, and precipitation hardening.

The cemented articles, including jewelry articles and components of jewelry articles, of the present disclosure may also be formed utilizing green machining techniques. As is known in the art, green machining involves the shaping or machining of an article in an unfired state. Green machining of may be done whenever possible since the machining of the cemented articles, including jewelry articles and components of jewelry articles, after sintering is very costly. Green machining may utilize CNC machines, lathes, drilling equipment, cut-off saws, surface grinders, rotary grinders, as well as any other machines used to form an object. Machining may require the use of carbide and PCD tools and abrasive wheels.

A "blank" of the article can then be cut from the bar or sheet, for example using wire electric discharge machining (EDM). Any internal areas that need to be hollowed out of the blank (e.g., the center portion of a ring) can be removed, e.g., using a sink EDM. A CNC lathe can then be used to prepare the outer shape of the article, followed by polishing. At this point, any inlays, setting or engraving can be performed. Where the article is a ring or similar article that requires internal sizing, a CNC lathe, followed by an inner polish can be used at this point.

After the above shaping of the article, the article can be subjected to one or more heat treatment(s), followed by final polishing followed and any additional engraving desired, for example using a CNC lathe or CNC engraving.

The articles, including jewelry articles and components of jewelry articles, of the present disclosure may also be formed utilizing a sinter hot isostatic pressing (HIP) process. HIP may be used as part of a sintering (powder metallurgy) process for fabrication of metal matrix composites such as the articles, including jewelry articles and components of jewelry articles, of the present disclosure. The HIP process subjects a component to both elevated temperature and isostaic gas pressure in a high pressure containment vessel. The pressurizing gas most widely used typically an inert gas such as Argon, so that the material does not chemically react with the pressurized gas, During the process, a chamber is heated, causing the pressure inside the vessel to increase. Traditionally, the gas may be applied at pressures between 7,350 psi (50.7 MPa) and 45,000 psi (310 MPa), with 15,000 psi (100 MPa) being most common. When castings are treated with HIP, the simultaneous application of heat and pressure may eliminate internal voids and microporosity through a combination of plastic deformation, creep, and diffusion bonding.

Alternatively, articles, including jewelry articles and components of jewelry articles, having any of the compositions described herein can be formed by a powder metallurgy process, wherein the above-described constituent components are blended in powder form, then pressed or injected to form a blank. The constituents described herein may be provided in their elemental powdered form. Alternatively, the powders may themselves be combinations of different metals or constituent components. The blank may approximate the final shape or form of the article. This is often referred to as "near-net-shape." The blank can then be consolidated by sintering. The result of the sintering is a dense object possessing the desired coloration, hardness, abrasion resistance and other features as described herein. One non-limiting example of a possible powder metallurgy based formation technique is Hot Isostatic Pressing (HIP).

An article, such as any of the jewelry articles and components of jewelry articles described herein, formed at least in part from cermet can be produced by any suitable technique that results in a dense object having the desired physical properties as well as the desired coloration. For example, suitable methods may comprise combining the constituent elements in powder form, pressing or injecting the powders to form a blank or near net-shape object, and sintering to consolidate the blank or object and provide a grey/dark grey/black appearance. Examples of specific techniques for pressing, injecting, molding and sintering to form a final article, such as an article of jewelry, have been previously described above in connection with powder metallurgical techniques.

These techniques can also be used to form articles, such as jewelry articles and components of jewelry articles, and are incorporated herein by reference. For example, the methods or techniques described in the United States Patent Application Publication No. US 2012-0304694 may be used, the content of which is incorporated herein by reference in its entirety for all purposes.

Articles formed according to the principles of the present disclosure, including jewelry articles and components of jewelry articles described herein, may have one or more advantageous properties and/or characteristics.

According to other embodiments of the present disclosure, articles, including jewelry articles and components of jewelry articles, can be formed which possess a favorable density property. More specifically, articles, including jewelry articles and components of jewelry articles, formed according to the principles of the present disclosure may possess density values of about 9.00 to about 15.00 g/cm³. In an embodiment, the density readings for BC-30 were 12.58 g/cm³ and for samples of TC-850 were 14.55 g/cm³. In additional embodiments, sample densities were measured, as shown in Table 6.

TABLE 6

| New densities | BC-30CR2 = 12.45 gm/cm³ |
| | BC-35CR2 = 12.14 gm/cm³ |
| Comparative densities | TC850 = 13.95 gm/cm³ |
| | CP-Titanium = 4.51 gm/cm³ |
| | 316 Steel = 7.99 gm/cm³ |
| | 10 KW Gold = 11.07 gm/cm³ |

Additionally, densities for other samples included CP—Ti: 4.51 g/cm³; 316 steel: 7.99 g/cm³ and 10 k white gold: 11.07 g/cm³

According to certain embodiments, articles, including jewelry articles and components of jewelry articles, formed according to the principles of the present disclosure possess a Vickers hardness number (HV) of about 900 HV to 1150 HV. According to one specific and non-limiting embodiment, the material of the present disclosure has a hardness of about 1280 HV. In an embodiment, a sample of BC-30 had a HV of about 800 HV to about 1400 HV. In another embodiment, sample of TC-850 had a HV of about 900 HV-about 1400 HV. In another embodiment, sample of TC-850 had a HV of about 1345 HV.

According to certain embodiments, articles, including jewelry articles and components of jewelry articles, formed according to the principles of the present disclosure are significantly lighter than those formed from other materials. In an embodiment, several samples were formed for the same article made from TC850 vs. BC-30 (i.e., mostly TC as compared to TC in conjunction with chromium). As evidenced by these samples, as shown in Table 7, the BC-30 samples formed from TC in conjunction with chromium in accordance with the present disclosure weighed significantly less than the samples made from mostly TC.

TABLE 7

| Sample | TC850 Wgt. in gms. | BC-30 Wgt. in gms | Difference in gms. | % difference |
|---|---|---|---|---|
| 1 | 11.36 | 9.83 | 1.52 | −13% |
| 2 | 11.27 | 9.92 | 1.35 | −12% |

TABLE 7-continued

| Sample | TC850 Wgt. in gms. | BC-30 Wgt. in gms | Difference in gms. | % difference |
|---|---|---|---|---|
| 3 | 8.21 | 7.32 | 0.89 | −11% |
| 4 | 11.83 | 9 | 2.83 | −24% |

According to further optional embodiments, an article formed according to the principles of the present disclosure possesses a cracking load of no more than about 1000 lbf.

According to additional embodiments, an article formed according to the principles of the present disclosure possesses a coloration characterized by a range of L, a, and b values. More specifically, articles, including jewelry articles and components of jewelry articles, formed according to the principles of the present disclosure possess a "L*" value of about 40-80. According to further embodiments, the articles, including jewelry articles and components of jewelry articles, further possess an "a*" value of about 0-1.0. According to additional embodiments, the articles, including jewelry articles and components of jewelry articles, further possess a "b*" value of about 2.0-7.0. According to one illustrative, non-limiting example, an article formed according to the principles of the present disclosure possesses a coloration characterized as: L*=about 48.5, a*=about 0.77, and b*=about 3.7. In an embodiment, the following samples were created and analyzed using a Konica-Minolta CM-700 spectrometer. Measurements for a number of samples is shown in Tables 8-9, and FIG. 6.

TABLE 8

| | Data Name | L*(D65) | a*(D65) | b*(D65) |
|---|---|---|---|---|
| Target | Average Target BC-30 | 48.5 | 0.77 | 3.7 |
| Target | Average Target BC-30 | 79.12 | 0.82 | 5.02 |

TABLE 9

| | Data Name | L*(D65) | a*(D65) | b*(D65) | dL*(D65) | da*(D65) | db*(D65) | dE*ab(D65) | dE00(D65) |
|---|---|---|---|---|---|---|---|---|---|
| Target | Averaged Target BC-10 | 48.5 | 0.77 | 3.7 | — | — | — | — | — |
| 1 | BC-10#0001 | 47.75 | 0.71 | 3.27 | −0.75 | −0.05 | −0.42 | 0.86 | 0.83 |
| 2 | BC-10#0002 | 48.73 | 0.67 | 3.22 | 0.23 | −0.09 | −0.48 | 0.54 | 0.49 |
| 3 | BC-10#0003 | 51.6 | 0.84 | 3.85 | 3.1 | 0.07 | 0.15 | 3.1 | 3.1 |
| 4 | BC-10#0004 | 46.67 | 0.81 | 3.96 | −1.83 | 0.05 | 0.27 | 1.85 | 1.81 |
| 5 | BC-10#0005 | 47.52 | 0.8 | 4.21 | −0.97 | 0.03 | 0.51 | 1.1 | 1.06 |
| Target | Averaged Target TC850 | 79.12 | 0.82 | 5.02 | — | — | — | — | — |
| 1 | TC850#0001 | 78.15 | 0.75 | 4.88 | −0.97 | −0.07 | −0.14 | 0.99 | 0.7 |
| 2 | TC850#0002 | 78.37 | 0.89 | 5.22 | −0.75 | 0.07 | 0.21 | 0.78 | 0.56 |
| 3 | TC850#0003 | 77.6 | 0.86 | 5.51 | −1.52 | 0.03 | 0.49 | 1.6 | 1.14 |
| 4 | TC850#0004 | 80.55 | 0.75 | 4.59 | 1.42 | −0.07 | −0.42 | 1.49 | 1.05 |
| 5 | TC850#0005 | 80.86 | 0.86 | 4.92 | 1.73 | 0.04 | −0.1 | 1.73 | 1.2 |

Figure 36:
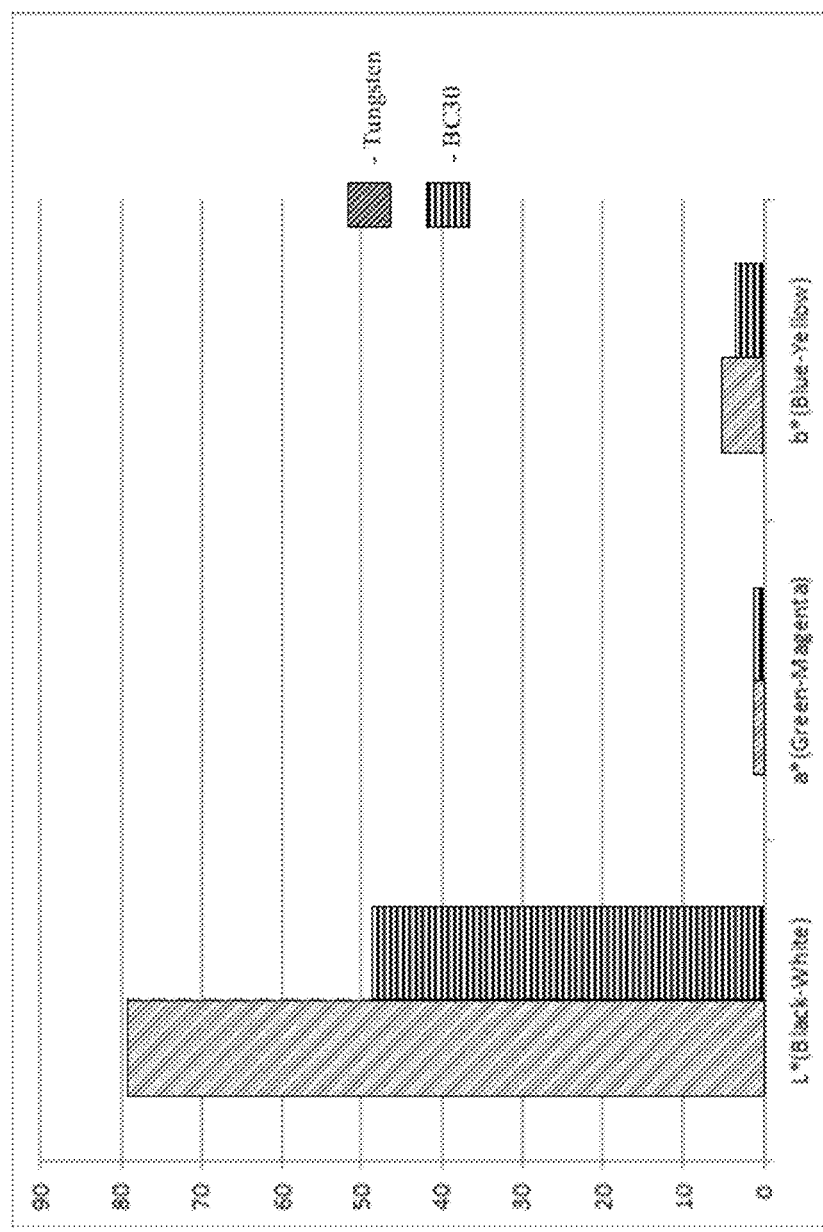
FIG. 36 is a graph showing a comparison between the color values for samples of BC-30 and Tungsten samples, in accordance with the present disclosure.

FIG. 36 shows a graph depicting the color values for samples of BC-30 and Tungsten samples. As graphed, the color characteristics for BC-30 yield different results especially in the L* (Black-White) range when compared with objects containing high levels of tungsten, such as TC-850.

For base line comparisons, analysis of color readings of yellow with Yttrium, rose with Yttrium as well as straight cobalt-chrome and black Tungsten Carbide were performed. As is understood by those skilled in the art, the additional materials and additives generally impacts the optical characteristics of the object. The color characteristics of other samples are shown in Table 10.

TABLE 10

| | Data Name | L*(D65) | a*(D65) | b*(D65) | dL*(D65) | da*(D65) | db*(D65) | dE*ab(D65) | dE00(D65) |
|---|---|---|---|---|---|---|---|---|---|
| Target | Averaged Target BC-10 | 48.5 | 0.77 | 3.7 | — | — | — | — | — |
| 1 | BC-10#0001 | 47.75 | 0.71 | 3.27 | −0.75 | −0.05 | −0.42 | 0.86 | 0.83 |
| 2 | BC-10#0002 | 48.73 | 0.67 | 3.22 | 0.23 | −0.09 | −0.48 | 0.54 | 0.49 |
| 3 | BC-10#0003 | 51.6 | 0.84 | 3.85 | 3.1 | 0.07 | 0.15 | 3.1 | 3.1 |
| 4 | BC-10#0004 | 46.67 | 0.81 | 3.96 | −1.83 | 0.05 | 0.27 | 1.85 | 1.81 |
| 5 | BC-10#0005 | 47.52 | 0.8 | 4.21 | −0.97 | 0.03 | 0.51 | 1.1 | 1.06 |
| Target | Averaged Target TC850 | 79.12 | 0.82 | 5.02 | — | — | — | — | — |
| 1 | TC850#0001 | 78.15 | 0.75 | 4.88 | −0.97 | −0.07 | −0.14 | 0.99 | 0.7 |
| 2 | TC850#0002 | 78.37 | 0.89 | 5.22 | −0.75 | 0.07 | 0.21 | 0.78 | 0.56 |
| 3 | TC850#0003 | 77.6 | 0.86 | 5.51 | −1.52 | 0.03 | 0.49 | 1.6 | 1.14 |
| 4 | TC850#0004 | 80.55 | 0.75 | 4.59 | 1.42 | −0.07 | −0.42 | 1.49 | 1.05 |
| 5 | TC850#0005 | 80.86 | 0.86 | 4.92 | 1.73 | 0.04 | −0.1 | 1.73 | 1.2 |
| Target | Averaged Target Cobalt | 80.61 | 1.05 | 5.89 | — | — | — | — | — |
| 1 | Cobalt#0001 | 79.27 | 1.16 | 6.21 | −1.34 | 0.1 | 0.32 | 1.38 | 0.97 |
| 2 | Cobalt#0002 | 79.72 | 1.01 | 5.66 | −0.89 | −0.05 | −0.24 | 0.93 | 0.65 |
| 3 | Cobalt#0003 | 81.5 | 1.03 | 5.8 | 0.89 | −0.02 | −0.1 | 0.89 | 0.61 |
| 4 | Cobalt#0004 | 80.91 | 1.04 | 5.73 | 0.3 | −0.01 | −0.17 | 0.34 | 0.24 |
| 5 | Cobalt#0005 | 81.62 | 1.04 | 6.09 | 1 | −0.02 | 0.19 | 1.02 | 0.7 |
| Target | Averaged Target White | 88.25 | 0.75 | 5.03 | — | — | — | — | — |
| 1 | White#0001 | 85.67 | 0.82 | 4.75 | −2.57 | 0.07 | −0.28 | 2.59 | 1.68 |
| 2 | White#0002 | 88.25 | 0.81 | 5.29 | 0 | 0.06 | 0.25 | 0.26 | 0.22 |
| 3 | White#0003 | 89.62 | 0.73 | 4.96 | 1.38 | −0.02 | −0.07 | 1.38 | 0.87 |
| 4 | White#0004 | 89.87 | 0.69 | 4.96 | 1.62 | −0.06 | −0.07 | 1.63 | 1.03 |
| 5 | White#0005 | 87.7 | 0.71 | 5.2 | −0.54 | −0.04 | 0.17 | 0.57 | 0.38 |
| Target | Averaged Target Black | 29.37 | 0.25 | 1.69 | — | — | — | — | — |
| 1 | Black#0001 | 29.19 | 0.16 | 1.78 | −0.18 | −0.09 | 0.08 | 0.22 | 0.21 |
| 2 | Black#0002 | 28.39 | 0.24 | 0.65 | −0.98 | −0.01 | −1.04 | 1.43 | 1.24 |
| 3 | Black#0003 | 31.46 | 0.17 | 1.23 | 2.09 | −0.09 | −0.46 | 2.14 | 1.69 |
| 4 | Black#0004 | 29.13 | 0.41 | 2.89 | −0.24 | 0.16 | 1.2 | 1.24 | 1.12 |
| 5 | Black#0005 | 28.55 | 0.3 | 1.98 | −0.83 | 0.05 | 0.29 | 0.87 | 0.69 |
| Target | Averaged Target Yellow | 86.72 | 6.1 | 31.19 | — | — | — | — | — |
| 1 | Yellow#0001 | 86.58 | 6.28 | 31.65 | −0.14 | 0.18 | 0.46 | 0.51 | 0.23 |
| 2 | Yellow#0002 | 86.09 | 6.21 | 31.65 | −0.63 | 0.11 | 0.46 | 0.79 | 0.45 |
| 3 | Yellow#0003 | 86.27 | 5.9 | 29.54 | −0.45 | −0.2 | −1.65 | 1.72 | 0.76 |
| 4 | Yellow#0004 | 87.77 | 5.87 | 31.17 | 1.05 | −0.23 | −0.02 | 1.07 | 0.7 |
| 5 | Yellow#0005 | 86.87 | 6.24 | 31.96 | 0.15 | 0.14 | 0.77 | 0.8 | 0.34 |
| Target | Averaged Target Rose | 85.31 | 14.76 | 25.94 | — | — | — | — | — |
| 1 | Rose#0001 | 85.55 | 14.98 | 26.46 | 0.24 | 0.22 | 0.52 | 0.61 | 0.29 |
| 2 | Rose#0002 | 85.94 | 14.88 | 26.31 | 0.62 | 0.12 | 0.37 | 0.73 | 0.44 |
| 3 | Rose#0003 | 84.48 | 15.1 | 26.37 | −0.83 | 0.34 | 0.43 | 0.99 | 0.6 |
| 4 | Rose#0004 | 85.86 | 14.2| | 824.78 | 0.55 | −0.55 | −1.16 | 1.4 | 0.67 |
| 5 | Rose#0005 | 84.72 | 14.63 | 25.82 | −0.6 | −0.12 | −0.12 | 0.62 | 0.4 |

According to further alternative embodiments, the cemented carbide compositions according to the principles of the present disclosure possesses a favorable average grain sized property. For example, articles, including jewelry articles and components of jewelry articles, formulated according to the principles of the present disclosure may possess a average grain size of preferably about 2 to about 4 μm and more preferably about 1.4 μm to about 2.0 μm, when measured according to the previously mentioned ASTM E112-113 standard.

Articles, including jewelry articles and components of jewelry articles, formed from compositions of the present disclosure may further optionally possess favorable corrosion resistance values when measured according to the previously mentioned ASTM B-117 standard.

Articles, including jewelry articles and components of jewelry articles, formed according to additional alternative embodiments may further optionally possess favorable abrasion resistance properties of about when measured according to the previously mentioned ASTM D4060 standard.

As noted above with respect to the reported "cracking load" values, when compositions formed according to the principles of the present disclosure are utilized to produce articles of jewelry to be worn on the body, another important property is the ability of such articles formed thereby to be removed from the body in the event of an emergency. Thus, the compositions formulated according to the principles of the present disclosure have been designed to serve the need of a scratch resistant product, yet still have the ability to be removed by conventional techniques involving applying pressure to the article jewelry in a vice-like handheld or stationary tool in order to crack or shatter the article. The ability to remove a jewelry article according to such a process is not traditionally a property of an article comprising cobalt-chrome. The article breaks into a small number of pieces (3-5) as compared to TC which shatters into many tiny shards.

A similar consideration of the composition when utilized to produce finished articles in the form of jewelry is the ease in which the material can be machined or removed. Accordingly, the compositions formulated according to the principles of the present disclosure have been designed so as to facilitate machining and/or engraving through use of traditional diamond-based grinding and/or cutting tools, as well as electrical discharge machining (EDM).

EXAMPLES

| Element | Sample #1 | Sample #2 |
|---|---|---|
| Silicon | 0.15 | 0.10 |
| Iron | 0.08 | — |

-continued

| Element | Sample #1 | Sample #2 |
|---|---|---|
| Copper | — | — |
| Manganese | 0.02 | 0.02 |
| Nickel | 0.02 | 0.04 |
| Cobalt | 17.25 | 17.31 |
| Potassium | — | — |
| Chromium | 1.45 | 1.44 |
| Titanium | 0.56 | 0.56 |
| Tantalum | 0.02 | 0.02 |
| Carbon | 4.80 | 4.85 |
| Sulfur | 0.01 | 0.01 |
| Tungsten | Balance | Balance |
| Density (g/cc) | 12.67 | 13.13 |
| Max Load (lbs) | 1129 | 1016 |
| Displacement @ Max Load (in) | 0.012 | 0.012 |
| Vickers Hardness | 1056 | 1130 |

Traditional cemented carbide blending and mixing process are described in U.S. Pat. No. 6,928,734 to West, entitled Jewelry Ring and Method of Manufacturing Same, as well as U.S. Pat. No. 3,515,540 to Meadows entitled Mixed Cobalt/Tungsten Carbide Powders, both of which are incorporated here in there entirety by reference.

In other embodiments, as shown in Tables 11-16, various objects and samples were constructed using traditional press and sinter processes and various amounts of cobalt with chromium additions as well as some small quantities of dopants such as carbide, nitride, boride.

TABLE 11

| | W wt % | Co wt % | Ni wt % | Cr wt % | Other wt % | Material |
|---|---|---|---|---|---|---|
| Embodiment-1 | 62 | 35 | 0 | 2 | 1 | TaC |
| Embodiment-2 | 62 | 35 | 0 | 2 | 1 | NbC |
| Embodiment-3 | 62 | 35 | 0 | 2 | 1 | MoC |
| Embodiment-4 | 62 | 35 | 0 | 2 | 1 | TiC |
| Embodiment-5 | 62 | 35 | 0 | 2 | 1 | VC |
| Embodiment-6 | 62 | 35 | 0 | 2 | 1 | ZrC |
| Embodiment-7 | 62 | 35 | 0 | 2 | 1 | Hf |
| Embodiment-8 | 62 | 35 | 0 | 2 | 1 | Re |
| Embodiment-9 | 62 | 35 | 0 | 2 | 1 | Ru |
| Embodiment-10 | 62 | 35 | 0 | 2 | 1 | Os |
| Embodiment-11 | 62 | 35 | 0 | 2 | 1 | Ir |
| Embodiment-12 | 62 | 35 | 0 | 2 | 1 | Pt |

TABLE 12

| | W wt % | Co wt % | Ni wt % | Cr wt % | Other wt % | Material |
|---|---|---|---|---|---|---|
| Embodiment-1 | 67 | 30 | 0 | 2 | 1 | TaC |
| Embodiment-2 | 67 | 30 | 0 | 2 | 1 | NbC |
| Embodiment-3 | 67 | 30 | 0 | 2 | 1 | MoC |
| Embodiment-4 | 67 | 30 | 0 | 2 | 1 | TiC |
| Embodiment-5 | 67 | 30 | 0 | 2 | 1 | VC |
| Embodiment-6 | 67 | 30 | 0 | 2 | 1 | ZrC |
| Embodiment-7 | 67 | 30 | 0 | 2 | 1 | Hf |
| Embodiment-8 | 67 | 30 | 0 | 2 | 1 | Re |
| Embodiment-9 | 67 | 30 | 0 | 2 | 1 | Ru |
| Embodiment-10 | 67 | 30 | 0 | 2 | 1 | Os |
| Embodiment-11 | 67 | 30 | 0 | 2 | 1 | Ir |
| Embodiment-12 | 67 | 30 | 0 | 2 | 1 | Pt |

TABLE 13

| | W wt % | Co wt % | Ni wt % | Cr wt % | Other wt % | Material |
|---|---|---|---|---|---|---|
| Embodiment-1 | 72 | 25 | 0 | 2 | 1 | TaC |
| Embodiment-2 | 72 | 25 | 0 | 2 | 1 | NbC |
| Embodiment-3 | 72 | 25 | 0 | 2 | 1 | MoC |
| Embodiment-4 | 72 | 25 | 0 | 2 | 1 | TiC |
| Embodiment-5 | 72 | 25 | 0 | 2 | 1 | VC |
| Embodiment-6 | 72 | 25 | 0 | 2 | 1 | ZrC |
| Embodiment-7 | 72 | 25 | 0 | 2 | 1 | Hf |
| Embodiment-8 | 72 | 25 | 0 | 2 | 1 | Re |
| Embodiment-9 | 72 | 25 | 0 | 2 | 1 | Ru |
| Embodiment-10 | 72 | 25 | 0 | 2 | 1 | Os |
| Embodiment-11 | 72 | 25 | 0 | 2 | 1 | Ir |
| Embodiment-12 | 72 | 25 | 0 | 2 | 1 | Pt |

TABLE 14

| | W wt % | Co wt % | Ni wt % | Cr wt % | Other wt % | Material |
|---|---|---|---|---|---|---|
| Embodiment-1 | 77 | 20 | 0 | 2 | 1 | TaC |
| Embodiment-2 | 77 | 20 | 0 | 2 | 1 | NbC |
| Embodiment-3 | 77 | 20 | 0 | 2 | 1 | MoC |
| Embodiment-4 | 77 | 20 | 0 | 2 | 1 | TiC |
| Embodiment-5 | 77 | 20 | 0 | 2 | 1 | VC |
| Embodiment-6 | 77 | 20 | 0 | 2 | 1 | ZrC |
| Embodiment-7 | 77 | 20 | 0 | 2 | 1 | Hf |
| Embodiment-8 | 77 | 20 | 0 | 2 | 1 | Re |
| Embodiment-9 | 77 | 20 | 0 | 2 | 1 | Ru |
| Embodiment-10 | 77 | 20 | 0 | 2 | 1 | Os |
| Embodiment-11 | 77 | 20 | 0 | 2 | 1 | Ir |
| Embodiment-12 | 77 | 20 | 0 | 2 | 1 | Pt |

TABLE 15

| | W wt % | Co wt % | Ni wt % | Cr wt % | Other wt % | Material |
|---|---|---|---|---|---|---|
| Embodiment-1 | 82 | 15 | 0 | 2 | 1 | TaC |
| Embodiment-2 | 82 | 15 | 0 | 2 | 1 | NbC |
| Embodiment-3 | 82 | 15 | 0 | 2 | 1 | MoC |
| Embodiment-4 | 82 | 15 | 0 | 2 | 1 | TiC |
| Embodiment-5 | 82 | 15 | 0 | 2 | 1 | VC |
| Embodiment-6 | 82 | 15 | 0 | 2 | 1 | ZrC |
| Embodiment-7 | 82 | 15 | 0 | 2 | 1 | Hf |
| Embodiment-8 | 82 | 15 | 0 | 2 | 1 | Re |
| Embodiment-9 | 82 | 15 | 0 | 2 | 1 | Ru |
| Embodiment-10 | 82 | 15 | 0 | 2 | 1 | Os |
| Embodiment-11 | 82 | 15 | 0 | 2 | 1 | Ir |
| Embodiment-12 | 82 | 15 | 0 | 2 | 1 | Pt |

TABLE 16

| | W wt % | Co wt % | Ni wt % | Cr wt % | Other wt % | Material |
|---|---|---|---|---|---|---|
| Embodiment-1 | 87 | 10 | 0 | 2 | 1 | TaC |
| Embodiment-2 | 87 | 10 | 0 | 2 | 1 | NbC |
| Embodiment-3 | 87 | 10 | 0 | 2 | 1 | MoC |
| Embodiment-4 | 87 | 10 | 0 | 2 | 1 | TiC |
| Embodiment-5 | 87 | 10 | 0 | 2 | 1 | VC |
| Embodiment-6 | 87 | 10 | 0 | 2 | 1 | ZrC |
| Embodiment-7 | 87 | 10 | 0 | 2 | 1 | Hf |
| Embodiment-8 | 87 | 10 | 0 | 2 | 1 | Re |
| Embodiment-9 | 87 | 10 | 0 | 2 | 1 | Ru |
| Embodiment-10 | 87 | 10 | 0 | 2 | 1 | Os |

TABLE 16-continued

|  | W wt % | Co wt % | Ni wt % | Cr wt % | Other wt % | Material |
|---|---|---|---|---|---|---|
| Embodiment-11 | 87 | 10 | 0 | 2 | 1 | Ir |
| Embodiment-12 | 87 | 10 | 0 | 2 | 1 | Pt |

In the press and sinter process used in the above embodiments, once a suitable press and mold have been prepared, the first step in making the object is to mix a predetermined combination of powdered metal or ceramic constituents to develop a sinterable metallic or ceramic powder. Once properly measured and disposed within the mold cavity, the powder is compressed by the mold to develop an oversized "green" ring blank that, although somewhat fragile, is stable enough to allow certain processing to be accomplished prior to sintering. For example, mold lines may be trimmed and smoothed, surfaces may be sanded or textured, facets may be smoothed, etc. But once properly prepared, the next step is to load the blank at room temperature into a non-atmospheric sintering chamber and raise the temperature thereof to controlled temperatures, typically varying between about 1000° C. to about 2000° C. and then slowly cooling back to atmospheric temperature. Once cooled, the hardened object blank configuration can be ground and polished to provide the hard metal or ceramic ring component.

TABLE 17

|  | α Phase |  | β Phase |  | β-2 Phase |  | γ Phase |  | γ-2 Phase |  |  | Metallic binder % |
|---|---|---|---|---|---|---|---|---|---|---|---|---|
| 1 | 68% | WC |  |  | Co | 30% | Ni | 2% | Cr2 |  |  | 100% | 32% |
| 2 | 73% | WC |  |  | Co | 25% | Ni | 2% | Cr2 |  |  | 100% | 27% |
| 3 | 78% | WC |  |  | Co | 20% | Ni | 2% | Cr2 |  |  | 100% | 22% |
| 4 | 71% | WC |  |  | Co | 25% | Ni | 2% | Cr2 | 2% | TaNC | 100% | 29% |
| 5 | 76% | WC |  |  | Co | 20% | Ni | 2% | Cr2 | 2% | TaNC | 100% | 24% |
| 6 | 73% | WC | 20% | Co | 5% | Ni | 2% | Cr2 |  |  | 100% | 27% |
| 7 | 78% | WC | 15% | Co | 5% | Ni | 2% | Cr2 |  |  | 100% | 22% |
| 8 | 78% | WC | 10% | Co | 10% | Ni | 2% | Cr2 |  |  | 100% | 22% |
| 9 | 76% | WC | 15% | Co | 5% | Ni | 2% | Cr2 | 2% | TaNC | 100% | 24% |
| 10 | 76% | WC | 10% | Co | 10% | Ni | 2% | Cr2 | 2% | TaNC | 100% | 24% |
|  |  |  |  |  |  |  |  |  |  |  |  |  | 25% |

In an embodiment, nickel is used instead of, or in combination with, cobalt. As illustrated in Table 17, nickel in about 20 to about 30 wt. % may be used to replace cobalt in an embodiment. In another embodiment, cobalt-nickel blends in the ratios of about 5 to about 10 wt. % nickel and about 10 to about 20 wt. % cobalt may be used.

In some embodiments, the present disclosure relates to a method for producing a coated jewelry article or a coated component of a jewelry article, comprising: providing a jewelry article or a component of a jewelry article; and subjecting the jewelry article or the component of a jewelry article to a layering process to obtain a coated jewelry article or component of a jewelry article comprising a coating, wherein the jewelry article or component of a jewelry article and the coating form a surface that is resistant to deformation and wear and substantially retains the color of the coating material. In further embodiments, the first coated jewelry article or component of the jewelry article comprises cobalt, or cobalt and a material as described herein, or alloys of each of the foregoing and any combinations thereof. In additional embodiments, the coating comprises at least one of tungsten carbide, cobalt, tungsten, titanium, titanium carbide, zirconium, tantalum, rhodium, gold, silver, platinum, palladium, iridium, iron, stainless steel, 316 stainless steel, cobalt chrome, cobalt chromium, nickel, nitinol, aluminum, aluminum carbide, vanadium, ruthenium, copper, tungsten copper, zinc, tin, German silver, niobium, molybdenum, rhenium, hafnium, alloys of each of the foregoing and any combinations thereof.

In some embodiments, the coating comprises cobalt-chromium. In further embodiments, the jewelry article or component of the jewelry article is a ring, ornamental ring, engagement ring, toe ring, watch, bracelet, necklace, pendant, charm, armlet, brocade, pin, clip, hairclip, fob, ornamental piercing, earring, nose ring, dog tag, amulet, bangle bracelet, cuff bracelet, link bracelet, cuff link, key chain, money clip, cell phone charm, signet ring, class ring, friendship ring or purity ring or a component any of the foregoing. In still further embodiments, the coating comprises at least one of titanium nitride (TiN), titanium(2) nitride (Ti.sub.2N), titanium carbo-nitride (TiCN), titanium-aluminum nitride (TiAlN), titanium-aluminum carbo-nitride (TiAlCN), chromium nitride (CrN), zirconium nitride (ZrN), chromium-titanium nitride (CrTiN), aluminum-titanium nitride (AlTiN), aluminum-titanium-chromium nitride (AlTiCrN), titanium-zirconium (TiZi), titanium-niobium-zirconium (TiNiZi), tungsten nitride (WN), titanium diboride (TiB.sub.2), tungsten carbide, cobalt, tungsten, titanium, titanium carbide, zirconium, tantalum, rhodium, gold, silver, platinum, palladium, iridium, iron, stainless steel, cobalt chrome, cobalt chromium, nickel, nitinol, aluminum, aluminum carbide, vanadium, ruthenium, copper, brass, bronze, tungsten copper, zinc, tin, German silver, niobium, molybdenum, hafnium, rhenium, chromium, a steel alloy, gold nitride, silver nitride, aluminum nitride, vanadium nitride, tantalum nitride, chromium carbide, zirconium carbide, tantalum carbide, cobalt chrome molybdenum and alloys of each of the foregoing and any combinations thereof. In additional embodiments, the coating comprises at least one of cobalt-chromium, cobalt, stainless steel, nickel, chromium and zirconium. In some embodiments, the coating is selected from the group consisting of a metal, a metal compound, a material having metallic properties, a metallic compound, a metal alloy, a metal carbide, a metal nitride and a metal boride.

In some embodiments, the coating exhibits electrical conductivity. In further embodiments, the coating is deposited onto the substrate using electroplating, physical vapor deposition (PVD) or chemical vapor deposition (CVD). In still further embodiments, the coating alters the luster of the jewelry article. In additional embodiments, the luster is selected from color change, adamantine, dull, greasy, metallic, pearly, resinous, silky, submetallic, vitreous, waxy, asterism, aventurescence, chatoyancy, and schiller. In additional embodiments, the jewelry article or component of the jewelry article is capable of being manipulated prior to the layering process. In some embodiments, the manipulation is performed using at least one of a CNC machine, a laser, photo lithography, a water jet, a lathe, a tumbler, a drill, a saw, a file, power tools and hand tools.

In some embodiments, the present invention relates to a jewelry article or component of a jewelry article having a metal or metallic coating, comprising: a jewelry article or a component of a jewelry article; and a coating comprising a metal, a metal compound, a material having metallic properties or a compound having metallic properties, wherein the coating is coupled to the jewelry article or component of the jewelry article, and wherein the jewelry article or component of the jewelry article and the coating form a surface that is resistant to deformation and wear and substantially retains the color of the coating material. In further embodiments, the jewelry article or component of the jewelry article comprises cobalt and one or more of titanium nitride (TiN), titanium(2) nitride (Ti.sub.2N), titanium carbo-nitride (TiCN), titanium-aluminum nitride (TiAlN), titanium-aluminum carbo-nitride (TiAlCN), chromium nitride (CrN), zirconium nitride (ZrN), chromium-titanium nitride (CrTiN), aluminum-titanium nitride (AlTiN), aluminum-titanium-chromium nitride (AlTiCrN), titanium-zirconium (TiZi), titanium-niobium-zirconium (TiNiZi), tungsten nitride (WN), titanium diboride (TiB.sub.2), tungsten carbide, chromium, or one of the other materials described herein, and alloys of each of the foregoing and any combinations thereof.

In some embodiments, the coated jewelry article or component of the jewelry article comprises cobalt and tungsten carbide. In further embodiments, the coating exhibits electrical conductivity. In still further embodiments, the coating is deposited onto the jewelry article or component of the jewelry article using electroplating, physical vapor deposition (PVD) or chemical vapor deposition (CVD). In additional embodiments, the coating comprises at least one of titanium nitride (TiN), titanium(2) nitride (Ti.sub.2N), titanium carbo-nitride (TiCN), titanium-aluminum nitride (TiAlN), titanium-aluminum carbo-nitride (TiAlCN), chromium nitride (CrN), zirconium nitride (ZrN), chromium-titanium nitride (CrTiN), aluminum-titanium nitride (AlTiN), aluminum-titanium-chromium nitride (AlTiCrN), titanium-zirconium (TiZi), titanium-niobium-zirconium (TiNiZi), tungsten nitride (WN), titanium diboride (TiB.sub.2), tungsten carbide, cobalt, tungsten, titanium, titanium carbide, zirconium, tantalum, rhodium, gold, silver, platinum, palladium, iridium, iron, stainless steel, cobalt chrome, cobalt chromium, nickel, nitinol, aluminum, aluminum carbide, vanadium, ruthenium, copper, brass, bronze, tungsten copper, zinc, tin, German silver, niobium, molybdenum, hafnium, rhenium, chromium, a steel alloy, gold nitride, silver nitride, aluminum nitride, vanadium nitride, tantalum nitride, chromium carbide, zirconium carbide, tantalum carbide, cobalt chrome molybdenum and alloys of each of the foregoing and any combinations thereof. In some embodiments, the coating comprises cobalt-chromium. In additional embodiments, the coating alters the luster of the metallic substance. In some embodiments, the luster is selected from color change, adamantine, dull, greasy, metallic, pearly, resinous, silky, submetallic, vitreous, waxy, asterism, aventurescence, chatoyancy, and schiller.

In some embodiments, the coating is selected from the group consisting of a metal, a metal alloy, a material having metallic properties, a metallic compound, a metal carbide, a metal nitride and a metal boride. In further embodiments, the jewelry article or component of the jewelry article is a ring, ornamental ring, engagement ring, toe ring, watch, bracelet, necklace, pendant, charm, armlet, brocade, pin, clip, hairclip, fob, ornamental piercing, earring, nose ring, dog tag, amulet, bangle bracelet, cuff bracelet, link bracelet, cuff link, key chain, money clip, cell phone charm, signet ring, class ring, friendship ring or purity ring or a component any of the foregoing. In still further embodiments, the coating comprises at least one of titanium nitride (TiN), titanium(2) nitride (Ti.sub.2N), titanium carbo-nitride (TiCN), titanium-aluminum nitride (TiAlN), titanium-aluminum carbo-nitride (TiAlCN), chromium nitride (CrN), zirconium nitride (ZrN), chromium-titanium nitride (CrTiN), aluminum-titanium nitride (AlTiN), aluminum-titanium-chromium nitride (AlTiCrN), titanium-zirconium (TiZi), titanium-niobium-zirconium (TiNiZi), tungsten nitride (WN), titanium diboride (TiB.sub.2), tungsten carbide, cobalt, tungsten, titanium, titanium carbide, zirconium, tantalum, rhodium, gold, silver, platinum, palladium, iridium, iron, stainless steel, cobalt chrome, cobalt chromium, nickel, nitinol, aluminum, aluminum carbide, vanadium, ruthenium, copper, brass, bronze, tungsten copper, zinc, tin, German silver, niobium, molybdenum, hafnium, rhenium, chromium, a steel alloy, gold nitride, silver nitride, aluminum nitride, vanadium nitride, tantalum nitride, chromium carbide, zirconium carbide, tantalum carbide, cobalt chrome molybdenum and alloys of each of the foregoing and any combinations thereof. In additional embodiments, the coating comprises at least one of cobalt-chromium, cobalt, stainless steel, nickel, chromium and zirconium.

In some embodiments, the present invention relates to a method for producing a jewelry article or a coated component of a jewelry article, comprising: (a) providing a jewelry article or a coated component of a jewelry article; (b) subjecting the jewelry article or coated component of the jewelry article to a first layering process to obtain a first coated jewelry article or coated component of a jewelry article comprising a first coating; and (c) subjecting the first coated jewelry article or coated component of the jewelry article to a second layering process to obtain a second coated jewelry article or coated component of a jewelry article comprising a second coating. In further embodiments, the jewelry article or coated component of the jewelry article comprises cobalt and at least one of tungsten carbide, or at least one of the other materials described herein and combinations and alloys of each of the foregoing. In additional embodiments, the first coating comprises cobalt and at least one of a metal, a material having metallic properties, a metal compound, a metallic compound, a metal alloy, a metal carbide and a metal boride.

In some embodiments, the jewelry article is a ring, ornamental ring, engagement ring, toe ring, watch, watchcase, watchband, bracelet, necklace, pendant, charm, armlet, brocade, pin, clip, hairclip, fob, ornamental piercing, earring, nose ring, dog tag, amulet, bangle bracelet, cuff bracelet, link bracelet, cuff link, key chain, money clip, cell phone charm, signet ring, class ring, friendship ring or purity ring or a component thereof. In further embodiments, the first coating comprises at least one of titanium diboride (TiB.sub.2), tungsten carbide, cobalt, tungsten, titanium, titanium carbide, zirconium, tantalum, rhodium, gold, silver, platinum, palladium, iridium, iron, stainless steel, cobalt chrome, cobalt chromium, nickel, nitinol, aluminum, aluminum carbide, vanadium, ruthenium, copper, brass, bronze, zinc, tin, German silver, niobium, molybdenum, hafnium, rhenium, chromium, a steel alloy, chromium carbide, zirconium carbide, tantalum carbide, cobalt chrome molybdenum and combinations and alloys of each of the foregoing. In further embodiments, the first coating is chromium. In still further embodiments, the first coating exhibits electrical conductivity. In additional embodiments, the first coating is deposited onto the substrate using vapor deposition, physical vapor deposition (PVD) or chemical vapor deposition (CVD).

In some embodiments, the second coating comprises at least one of titanium nitride (TiN), titanium(2) nitride (Ti.sub.2N), titanium carbo-nitride (TiCN), titanium-aluminum nitride (TiAlN), titanium-aluminum carbo-nitride (TiAlCN), chromium nitride (CrN), zirconium nitride (ZrN), chromium-titanium nitride (CrTiN), aluminum-titanium nitride (AlTiN), aluminum-titanium-chromium nitride (AlTiCrN), tungsten nitride (WN), titanium diboride (TiB.sub.2), tungsten carbide, cobalt, tungsten, titanium, titanium carbide, zirconium, tantalum, rhodium, gold, silver, platinum, palladium, iridium, iron, stainless steel, cobalt chrome, cobalt chromium, nickel, nitinol, aluminum, aluminum carbide, vanadium, ruthenium, copper, brass, bronze, tungsten copper, zinc, tin, German silver, niobium, molybdenum, hafnium, rhenium, chromium, a steel alloy, gold nitride, silver nitride, aluminum nitride, vanadium nitride, tantalum nitride, chromium carbide, zirconium carbide, tantalum carbide, cobalt chrome molybdenum and combinations and alloys of each of the foregoing. In further embodiments, the second coating alters the luster of the jewelry article. In still further embodiments, the luster is selected from color change, adamantine, dull, greasy, metallic, pearly, resinous, silky, submetallic, vitreous, waxy, asterism, aventurescence, chatoyancy, and schiller. In additional embodiments, the second coating exhibits electrical conductivity. In some embodiments, the second coating is deposited onto the substrate using electroplating, physical vapor deposition (PVD) or chemical vapor deposition (CVD). In further embodiments, the substrate is capable of being manipulated prior to the first layering process. In still further embodiments, the manipulation is performed using at least one of a CNC machine, a laser, photo lithography, a water jet, a lathe, a tumbler, a drill, a saw, a file, a tool, power tools and hand tools.

In some embodiments, the present invention relates to a coated jewelry item or a coated component of a jewelry item having a plurality of metal or metallic layers, comprising: a jewelry item or a component of a jewelry item; a first coating comprising a metal, a metal compound, a material having metallic properties or a compound having metallic properties, wherein the first coating is coupled to the jewelry item or the component of the jewelry item; and a second coating comprising a metal, a metal compound, a material having metallic properties or a compound having metallic properties, wherein the second coating is coupled to the first coating, and wherein the jewelry item or the component of the jewelry item, the first coating and the second coating form a surface that is resistant to deformation and wear. In further embodiments, the jewelry item or the component of the jewelry item, the first coating and the second coating form a surface that substantially retains the color of the second coating. In further embodiments, the jewelry item or the component of the jewelry item, comprises cobalt and at least one of tungsten carbide, chromium, or one of the other materials described herein and combinations and alloys of each of the foregoing. In additional embodiments, the first coating comprises at least one of a metal, a material having metallic properties, a metal compound, a metallic compound, a metal alloy, a metal carbide and a metal boride. In some embodiments, the first coating exhibits electrical conductivity.

In some embodiments, the first coating is deposited onto the jewelry item or the component of the jewelry item, using vapor deposition, physical vapor deposition (PVD) or chemical vapor deposition (CVD). In further embodiments, the first coating comprises at least one of titanium diboride (TiB.sub.2), tungsten carbide, cobalt, tungsten, titanium, titanium carbide, zirconium, tantalum, rhodium, gold, silver, platinum, palladium, iridium, iron, stainless steel, cobalt chrome, cobalt chromium, nickel, nitinol, aluminum, aluminum carbide, vanadium, ruthenium, copper, brass, bronze, zinc, tin, German silver, niobium, molybdenum, hafnium, rhenium, chromium, a steel alloy, chromium carbide, zirconium carbide, tantalum carbide, cobalt chrome molybdenum and combinations and alloys of each of the foregoing. In still further embodiments, the second coating comprises at least one of titanium nitride (TiN), titanium(2) nitride (Ti.sub.2N), titanium carbo-nitride (TiCN), titanium-aluminum nitride (TiAlN), titanium-aluminum carbo-nitride (TiAlCN), chromium nitride (CrN), zirconium nitride (ZrN), chromium-titanium nitride (CrTiN), aluminum-titanium nitride (AlTiN), aluminum-titanium-chromium nitride (AlTiCrN), tungsten nitride (WN), titanium diboride (TiB.sub.2), tungsten carbide, cobalt, tungsten, titanium, titanium carbide, zirconium, tantalum, rhodium, gold, silver, platinum, palladium, iridium, iron, stainless steel, cobalt chrome, cobalt chromium, nickel, nitinol, aluminum, aluminum carbide, vanadium, ruthenium, copper, brass, bronze, tungsten copper, zinc, tin, German silver, niobium, molybdenum, hafnium, rhenium, chromium, a steel alloy, gold nitride, silver nitride, aluminum nitride, vanadium nitride, tantalum nitride, chromium carbide, zirconium carbide, tantalum carbide, cobalt chrome molybdenum and combinations and alloys of each of the foregoing. In additional embodiments, the second coating alters the luster of the metallic substance. In some embodiments, the luster is selected from color change, adamantine, dull, greasy, metallic, pearly, resinous, silky, submetallic, vitreous, waxy, asterism, aventurescence, chatoyancy, and schiller. In further embodiments, the second coating exhibits electrical conductivity. In still further embodiments, the second coating is deposited onto the substrate using electroplating, physical vapor deposition (PVD) or chemical vapor deposition (CVD). In additional embodiments, the first coating is selected from the group consisting of a metal, a material having metallic properties, a metal compound, a metallic compound, a metal alloy, metal carbide and metal boride. In some embodiments, the second coating is selected from the group consisting of a metal, a material having metallic properties, a metal compound, a metallic compound, a metal alloy, metal carbide and metal boride. In further embodiments, the second coating comprises at least one of gold, silver, platinum, palladium, rhodium, ruthenium and an alloy of any of the foregoing. In still further embodiments, the second coating is a galvanic coating.

In some embodiments, the present invention further comprises washing the coated jewelry article or the coated component of the jewelry article. In further embodiments, the coated jewelry article, coated component of the jewelry article or coated jewelry item exhibits a non-gray color or luster. In other embodiments, the coated jewelry article, coated component of the jewelry article or coated jewelry item substantially retain the color of the second coating. In still further embodiments, the jewelry article, component of the jewelry article or jewelry item comprises cobalt and at least one of tungsten carbide, chrome, chromium, cobalt chrome or cobalt chromium. In additional embodiments, the coated jewelry article, coated component of the jewelry article or coated jewelry item comprises at least one layer of tungsten carbide, chrome, chromium, cobalt chrome or cobalt chromium. In some embodiments, the coated jewelry article, coated component of the jewelry article or coated jewelry item comprises at least one layer of steel, 316 stainless steel, nickel, nitinol, zirconium, cobalt, chrome, chromium, titanium-zirconium (TiZi), titanium-niobium-zirconium (TiNiZi) and an alloy of any of the foregoing. In further embodiments, the present invention relates to a method for making a jewelry ring comprising a substrate, a first coating of a metal, a material having metallic properties, a metal compound, a metallic compound, a metal alloy, metal carbide and metal boride, and an external metal or metallic coating, the method comprising cutting, pressing, molding, casting, striking, extruding, sintering and/or shaping the substrate into a ring shape; depositing the first coating onto the substrate; and depositing the external metal or metallic coating onto the first coating.

A method for making a jewelry ring comprising a substrate, a first coating of a metal, a material having metallic properties, a metal compound, a metallic compound, a metal alloy and a metal carbide, and an external metallic coating is additionally provided. The method comprises cutting, pressing, molding, casting, striking, extruding, sintering and/or shaping the substrate into a ring shape; depositing the first coating onto the substrate; and depositing the external metallic coating onto the first coating.

In some embodiments, the present disclosure relates to a method for producing a coated jewelry article or a coated component of a jewelry article, comprising: providing a jewelry article or a component of a jewelry article; and subjecting the jewelry article or the component of a jewelry article to a layering process to obtain a coated jewelry article or component of a jewelry article comprising a coating, wherein the jewelry article or component of a jewelry article and the coating form a surface that is resistant to deformation and wear and substantially retains the color of the coating material. In further embodiments, the first coated jewelry article or component of the jewelry article comprises at least one of tungsten carbide, cobalt, tungsten, titanium, titanium carbide, zirconium, tantalum, rhodium, gold, silver, platinum, palladium, iridium, iron, stainless steel, 316 stainless steel, cobalt chrome, cobalt chromium, nickel, nitinol, aluminum, aluminum carbide, vanadium, ruthenium, copper, tungsten copper, zinc, tin, German silver, niobium, molybdenum, rhenium, hafnium, alloys of each of the foregoing and any combinations thereof. In still further embodiments, the coated jewelry article or component of the jewelry article comprises tungsten carbide. In additional embodiments, the coating comprises at least one of tungsten carbide, cobalt, tungsten, titanium, titanium carbide, zirconium, tantalum, rhodium, gold, silver, platinum, palladium, iridium, iron, stainless steel, 316 stainless steel, cobalt chrome, cobalt chromium, nickel, nitinol, aluminum, aluminum carbide, vanadium, ruthenium, copper, tungsten copper, zinc, tin, German silver, niobium, molybdenum, rhenium, hafnium, alloys of each of the foregoing and any combinations thereof.

In some embodiments, the coating comprises cobalt-chromium. In further embodiments, the jewelry article or component of the jewelry article is a ring, ornamental ring, engagement ring, toe ring, watch, bracelet, necklace, pendant, charm, armlet, brocade, pin, clip, hairclip, fob, ornamental piercing, earring, nose ring, dog tag, amulet, bangle bracelet, cuff bracelet, link bracelet, cuff link, key chain, money clip, cell phone charm, signet ring, class ring, friendship ring or purity ring or a component any of the foregoing.

In still further embodiments, the coating comprises at least one of titanium nitride (TiN), titanium(2) nitride (Ti2N), titanium carbo-nitride (TiCN), titanium-aluminum nitride (TiAlN), titanium-aluminum carbo-nitride (TiAlCN), chromium nitride (CrN), zirconium nitride (ZrN), chromium-titanium nitride (CrTiN), aluminum-titanium nitride (AlTiN), aluminum-titanium-chromium nitride (AlTiCrN), titanium-zirconium (TiZi), titanium-niobium-zirconium (TiNiZi), tungsten nitride (WN), titanium diboride (TiB2), tungsten carbide, cobalt, tungsten, titanium, titanium carbide, zirconium, tantalum, rhodium, gold, silver, platinum, palladium, iridium, iron, stainless steel, cobalt chrome, cobalt chromium, nickel, nitinol, aluminum, aluminum carbide, vanadium, ruthenium, copper, brass, bronze, tungsten copper, zinc, tin, German silver, niobium, molybdenum, hafnium, rhenium, chromium, a steel alloy, gold nitride, silver nitride, aluminum nitride, vanadium nitride, tantalum nitride, chromium carbide, zirconium carbide, tantalum carbide, cobalt chrome molybdenum and alloys of each of the foregoing and any combinations thereof. In additional embodiments, the coating comprises at least one of cobalt-chromium, cobalt, stainless steel, nickel, chromium and zirconium. In some embodiments, the coating is selected from the group consisting of a metal, a metal compound, a material having metallic properties, a metallic compound, a metal alloy, a metal carbide, a metal nitride and a metal boride.

In some embodiments, the coating exhibits electrical conductivity. In further embodiments, the coating is deposited onto the substrate using electroplating, physical vapor deposition (PVD) or chemical vapor deposition (CVD). In still further embodiments, the coating alters the luster of the jewelry article. In additional embodiments, the luster is selected from color change, adamantine, dull, greasy, metallic, pearly, resinous, silky, submetallic, vitreous, waxy, asterism, aventurescence, chatoyancy, and schiller. In additional embodiments, the jewelry article or component of the jewelry article is capable of being manipulated prior to the layering process. In some embodiments, the manipulation is performed using at least one of a CNC machine, a laser, photo lithography, a water jet, a lathe, a tumbler, a drill, a saw, a file, power tools and hand tools.

In some embodiments, the present invention relates to a jewelry article or component of a jewelry article having a metal or metallic coating, comprising: a jewelry article or a component of a jewelry article; and a coating comprising a metal, a metal compound, a material having metallic properties or a compound having metallic properties, wherein the coating is coupled to the jewelry article or component of the jewelry article, and wherein the jewelry article or component of the jewelry article and the coating form a surface that is resistant to deformation and wear and substantially retains the color of the coating material. In further embodiments, the jewelry article or component of the jewelry article comprises at least one of titanium nitride (TiN), titanium(2) nitride (Ti2N), titanium carbo-nitride (TiCN), titanium-aluminum nitride (TiAlN), titanium-aluminum carbo-nitride (TiAlCN), chromium nitride (CrN), zirconium nitride (ZrN), chromium-titanium nitride (CrTiN), aluminum-titanium nitride (AlTiN), aluminum-titanium-chromium nitride (AlTiCrN), titanium-zirconium (TiZi), titanium-niobium-zirconium (TiNiZi), tungsten nitride (WN), titanium diboride (TiB2), tungsten carbide, cobalt, tungsten, titanium, titanium carbide, zirconium, tantalum, rhodium, gold, silver, platinum, palladium, iridium, iron, stainless steel, cobalt chrome, cobalt chromium, nickel, nitinol, aluminum, aluminum carbide, vanadium, ruthenium, copper, brass, bronze, tungsten copper, zinc, tin, German silver, niobium, molybdenum, hafnium, rhenium, chromium, a steel alloy, gold nitride, silver nitride, aluminum nitride, vanadium nitride, tantalum nitride, chromium carbide, zirconium carbide, tantalum carbide, cobalt chrome molybdenum and alloys of each of the foregoing and any combinations thereof.

In some embodiments, the coated jewelry article or component of the jewelry article comprises tungsten carbide. In further embodiments, the coating exhibits electrical conductivity. In still further embodiments, the coating is deposited onto the jewelry article or component of the jewelry article using electroplating, physical vapor deposition (PVD) or chemical vapor deposition (CVD). In additional embodiments, the coating comprises at least one of titanium nitride (TiN), titanium(2) nitride (Ti2N), titanium carbo-nitride (TiCN), titanium-aluminum nitride (TiAlN), titanium-aluminum carbo-nitride (TiAlCN), chromium nitride (CrN), zirconium nitride (ZrN), chromium-titanium nitride (CrTiN), aluminum-titanium nitride (AlTiN), aluminum-titanium-chromium nitride (AlTiCrN), titanium-zirconium (TiZi), titanium-niobium-zirconium (TiNiZi), tungsten nitride (WN), titanium diboride (TiB2), tungsten carbide, cobalt, tungsten, titanium, titanium carbide, zirconium, tantalum, rhodium, gold, silver, platinum, palladium, iridium, iron, stainless steel, cobalt chrome, cobalt chromium, nickel, nitinol, aluminum, aluminum carbide, vanadium, ruthenium, copper, brass, bronze, tungsten copper, zinc, tin, German silver, niobium, molybdenum, hafnium, rhenium, chromium, a steel alloy, gold nitride, silver nitride, aluminum nitride, vanadium nitride, tantalum nitride, chromium carbide, zirconium carbide, tantalum carbide, cobalt chrome molybdenum and alloys of each of the foregoing and any combinations thereof. In some embodiments, the coating comprises cobalt-chromium. In additional embodiments, the coating alters the luster of the metallic substance. In some embodiments, the luster is selected from color change, adamantine, dull, greasy, metallic, pearly, resinous, silky, submetallic, vitreous, waxy, asterism, aventurescence, chatoyancy, and schiller.

In some embodiments, the coating is selected from the group consisting of a metal, a metal alloy, a material having metallic properties, a metallic compound, a metal carbide, a metal nitride and a metal boride. In further embodiments, the jewelry article or component of the jewelry article is a ring, ornamental ring, engagement ring, toe ring, watch, bracelet, necklace, pendant, charm, armlet, brocade, pin, clip, hairclip, fob, ornamental piercing, earring, nose ring, dog tag, amulet, bangle bracelet, cuff bracelet, link bracelet, cuff link, key chain, money clip, cell phone charm, signet ring, class ring, friendship ring or purity ring or a component any of the foregoing. In still further embodiments, the coating comprises at least one of titanium nitride (TiN), titanium(2) nitride (Ti2N), titanium carbo-nitride (TiCN), titanium-aluminum nitride (TiAlN), titanium-aluminum carbo-nitride (TiAlCN), chromium nitride (CrN), zirconium nitride (ZrN), chromium-titanium nitride (CrTiN), aluminum-titanium nitride (AlTiN), aluminum-titanium-chromium nitride (AlTiCrN), titanium-zirconium (TiZi), titanium-niobium-zirconium (TiNiZi), tungsten nitride (WN), titanium diboride (TiB2), tungsten carbide, cobalt, tungsten, titanium, titanium carbide, zirconium, tantalum, rhodium, gold, silver, platinum, palladium, iridium, iron, stainless steel, cobalt chrome, cobalt chromium, nickel, nitinol, aluminum, aluminum carbide, vanadium, ruthenium, copper, brass, bronze, tungsten copper, zinc, tin, German silver, niobium, molybdenum, hafnium, rhenium, chromium, a steel alloy, gold nitride, silver nitride, aluminum nitride, vanadium nitride, tantalum nitride, chromium carbide, zirconium carbide, tantalum carbide, cobalt chrome molybdenum and alloys of each of the foregoing and any combinations thereof. In additional embodiments, the coating comprises at least one of cobalt-chromium, cobalt, stainless steel, nickel, chromium and zirconium.

Described herein are articles having metallic coatings. Particularly suitable external metallic coatings for these rings are any material that can be electroplated or vapor deposited onto the first coating. In some embodiments, the external metallic coating comprises a material that imparts an attractive coloration to the ring, for example platinum, rhodium, palladium, ruthenium, gold, a gold alloy, silver, a silver alloy, zirconium, tungsten nitride, tungsten carbide, or chrome. In particular embodiments, the external metallic coating modifies the luster of the article.

For example, one specific embodiment of a ring comprises a tungsten carbide substrate and a cobalt or cobalt-chromium coating.

The external metallic coating can be any coating appropriate for the metallic article. Where a hard surface is desired, for example for an article that is subject to extensive wear, such as a belt buckle, a picture frame, a paperweight, or a portion of a piece of furniture (e.g., an inlay) that may be abraded during use, the external metallic coating can be a hard material such as TiAlN, TiN, or TiB2. In other embodiments, the external metallic coating comprises a material that enhances the luster and/or imparts an attractive coloration to the article, including but not limited to platinum, rhodium, palladium, ruthenium, gold, silver, zirconium, tungsten nitride, tungsten carbide, chrome and/or alloys thereof.

Figure 28:
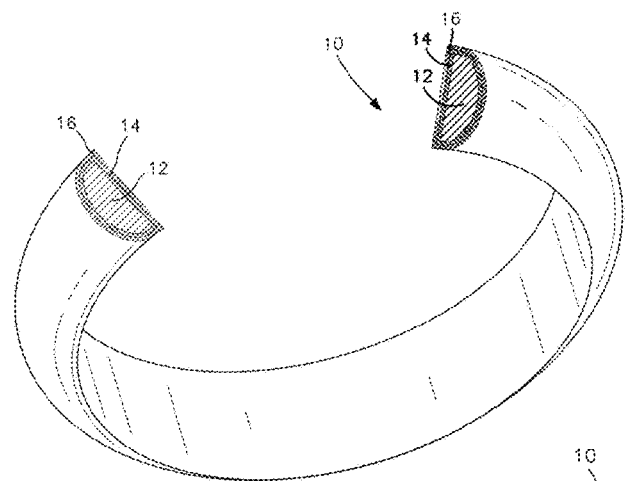
FIG. 28 shows a ring in accordance with an illustrative embodiment with a transverse cross-sectional cutout.
Figure 29:
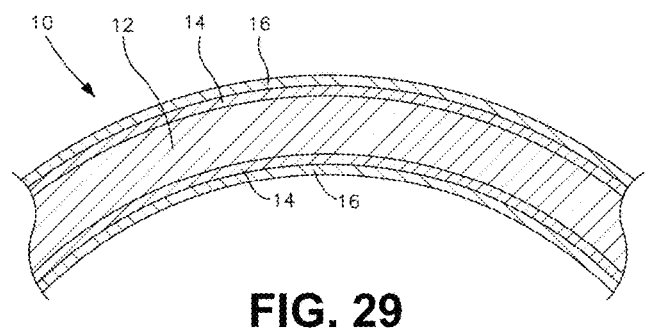
FIG. 29 is a longitudinal cross-section of a ring in accordance with an illustrative embodiment.
Figure 30:
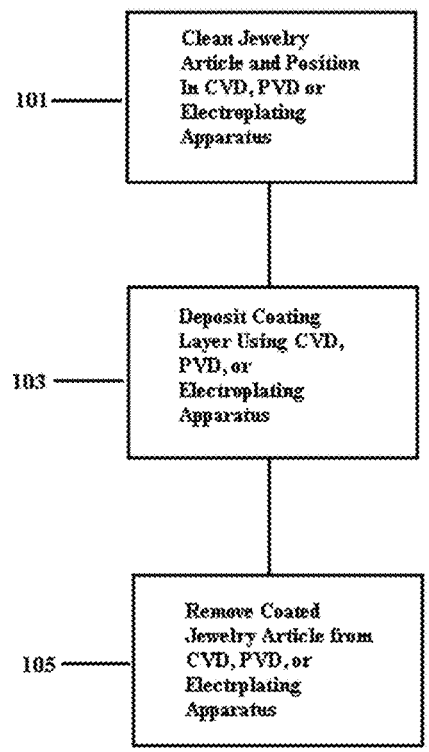
FIG. 30 shows a schematic for producing a coated jewelry article in accordance with an illustrative embodiment.

FIGS. 28 and 29 provide a transverse cutout (FIG. 28) and a longitudinal cross-section (FIG. 29) of a finger ring 10 in accordance with some embodiments. In these embodiments, the substrate 12 is coated with a coating 14. In the figures, the thicknesses of the coating 14 is not necessarily drawn to scale.

In some embodiments, the present invention relates to a method for producing a jewelry article or a coated component of a jewelry article, comprising: (a) providing a jewelry article or a coated component of a jewelry article; (b) subjecting the jewelry article or coated component of the jewelry article to a first layering process to obtain a first coated jewelry article or coated component of a jewelry article comprising a first coating; and (c) subjecting the first coated jewelry article or coated component of the jewelry article to a second layering process to obtain a second coated jewelry article or coated component of a jewelry article comprising a second coating. In further embodiments, the jewelry article or coated component of the jewelry article comprises at least one of tungsten carbide, cobalt, tungsten, titanium, titanium carbide, zirconium, tantalum, rhodium, gold, silver, platinum, palladium, iridium, iron, stainless steel, 316 stainless steel, cobalt chrome, cobalt chromium, nickel, nitinol, aluminum, aluminum carbide, vanadium, ruthenium, copper, tungsten copper, brass, bronze, zinc, tin, German silver, niobium, molybdenum, rhenium, hafnium and combinations and alloys of each of the foregoing. In still further embodiments, the first substrate is tungsten carbide. In additional embodiments, the first coating comprises at least one of a metal, a material having metallic properties, a metal compound, a metallic compound, a metal alloy, a metal carbide and a metal boride.

In some embodiments, the jewelry article is a ring, ornamental ring, engagement ring, toe ring, watch, watchcase, watchband, bracelet, necklace, pendant, charm, armlet, brocade, pin, clip, hairclip, fob, ornamental piercing, earring, nose ring, dog tag, amulet, bangle bracelet, cuff bracelet, link bracelet, cuff link, key chain, money clip, cell phone charm, signet ring, class ring, friendship ring or purity ring or a component thereof. In further embodiments, the first coating comprises at least one of titanium diboride (TiB2), tungsten carbide, cobalt, tungsten, titanium, titanium carbide, zirconium, tantalum, rhodium, gold, silver, platinum, palladium, iridium, iron, stainless steel, cobalt chrome, cobalt chromium, nickel, nitinol, aluminum, aluminum carbide, vanadium, ruthenium, copper, brass, bronze, zinc, tin, German silver, niobium, molybdenum, hafnium, rhenium, chromium, a steel alloy, chromium carbide, zirconium carbide, tantalum carbide, cobalt chrome molybdenum and combinations and alloys of each of the foregoing. In further embodiments, the first coating is chromium. In still further embodiments, the first coating exhibits electrical conductivity. In additional embodiments, the first coating is deposited onto the substrate using vapor deposition, physical vapor deposition (PVD) or chemical vapor deposition (CVD).

In some embodiments, the second coating comprises at least one of titanium nitride (TiN), titanium(2) nitride (Ti2N), titanium carbo-nitride (TiCN), titanium-aluminum nitride (TiAlN), titanium-aluminum carbo-nitride (TiAlCN), chromium nitride (CrN), zirconium nitride (ZrN), chromium-titanium nitride (CrTiN), aluminum-titanium nitride (AlTiN), aluminum-titanium-chromium nitride (AlTiCrN), tungsten nitride (WN), titanium diboride (TiB2), tungsten carbide, cobalt, tungsten, titanium, titanium carbide, zirconium, tantalum, rhodium, gold, silver, platinum, palladium, iridium, iron, stainless steel, cobalt chrome, cobalt chromium, nickel, nitinol, aluminum, aluminum carbide, vanadium, ruthenium, copper, brass, bronze, tungsten copper, zinc, tin, German silver, niobium, molybdenum, hafnium, rhenium, chromium, a steel alloy, gold nitride, silver nitride, aluminum nitride, vanadium nitride, tantalum nitride, chromium carbide, zirconium carbide, tantalum carbide, cobalt chrome molybdenum and combinations and alloys of each of the foregoing. In further embodiments, the second coating alters the luster of the jewelry article. In still further embodiments, the luster is selected from color change, adamantine, dull, greasy, metallic, pearly, resinous, silky, submetallic, vitreous, waxy, asterism, aventurescence, chatoyancy, and schiller. In additional embodiments, the second coating exhibits electrical conductivity. In some embodiments, the second coating is deposited onto the substrate using electroplating, physical vapor deposition (PVD) or chemical vapor deposition (CVD). In further embodiments, the substrate is capable of being manipulated prior to the first layering process. In still further embodiments, the manipulation is performed using at least one of a CNC machine, a laser, photo lithography, a water jet, a lathe, a tumbler, a drill, a saw, a file, a tool, power tools and hand tools.

In some embodiments, the present invention relates to a coated jewelry item or a coated component of a jewelry item having a plurality of metal or metallic layers, comprising: a jewelry item or a component of a jewelry item; a first coating comprising a metal, a metal compound, a material having metallic properties or a compound having metallic properties, wherein the first coating is coupled to the jewelry item or the component of the jewelry item; and a second coating comprising a metal, a metal compound, a material having metallic properties or a compound having metallic properties, wherein the second coating is coupled to the first coating, and wherein the jewelry item or the component of the jewelry item, the first coating and the second coating form a surface that is resistant to deformation and wear. In further embodiments, the jewelry item or the component of the jewelry item, the first coating and the second coating form a surface that substantially retains the color of the second coating. In further embodiments, the jewelry item or the component of the jewelry item, comprises at least one of tungsten carbide, cobalt, tungsten, titanium, titanium carbide, zirconium, tantalum, rhodium, gold, silver, platinum, palladium, iridium, iron, stainless steel, 316 stainless steel, cobalt chrome, cobalt chromium, nickel, nitinol, aluminum, aluminum carbide, vanadium, ruthenium, copper, tungsten copper, brass, bronze, zinc, tin, German silver, niobium, molybdenum, rhenium, hafnium and combinations and alloys of each of the foregoing. In still further embodiments, the jewelry item or the component of the jewelry item comprises tungsten carbide. In additional embodiments, the first coating comprises at least one of a metal, a material having metallic properties, a metal compound, a metallic compound, a metal alloy, a metal carbide and a metal boride. In some embodiments, the first coating exhibits electrical conductivity.

In some embodiments, the first coating is deposited onto the jewelry item or the component of the jewelry item, using vapor deposition, physical vapor deposition (PVD) or chemical vapor deposition (CVD). In further embodiments, the first coating comprises at least one of titanium diboride (TiB2), tungsten carbide, cobalt, tungsten, titanium, titanium carbide, zirconium, tantalum, rhodium, gold, silver, platinum, palladium, iridium, iron, stainless steel, cobalt chrome, cobalt chromium, nickel, nitinol, aluminum, aluminum carbide, vanadium, ruthenium, copper, brass, bronze, zinc, tin, German silver, niobium, molybdenum, hafnium, rhenium, chromium, a steel alloy, chromium carbide, zirconium carbide, tantalum carbide, cobalt chrome molybdenum and combinations and alloys of each of the foregoing. In still further embodiments, the second coating comprises at least one of titanium nitride (TiN), titanium(2) nitride (Ti2N), titanium carbo-nitride (TiCN), titanium-aluminum nitride (TiAlN), titanium-aluminum carbo-nitride (TiAlCN), chromium nitride (CrN), zirconium nitride (ZrN), chromium-titanium nitride (CrTiN), aluminum-titanium nitride (AlTiN), aluminum-titanium-chromium nitride (AlTiCrN), tungsten nitride (WN), titanium diboride (TiB2), tungsten carbide, cobalt, tungsten, titanium, titanium carbide, zirconium, tantalum, rhodium, gold, silver, platinum, palladium, iridium, iron, stainless steel, cobalt chrome, cobalt chromium, nickel, nitinol, aluminum, aluminum carbide, vanadium, ruthenium, copper, brass, bronze, tungsten copper, zinc, tin, German silver, niobium, molybdenum, hafnium, rhenium, chromium, a steel alloy, gold nitride, silver nitride, aluminum nitride, vanadium nitride, tantalum nitride, chromium carbide, zirconium carbide, tantalum carbide, cobalt chrome molybdenum and combinations and alloys of each of the foregoing. In additional embodiments, the second coating alters the luster of the metallic substance. In some embodiments, the luster is selected from color change, adamantine, dull, greasy, metallic, pearly, resinous, silky, submetallic, vitreous, waxy, asterism, aventurescence, chatoyancy, and schiller. In further embodiments, the second coating exhibits electrical conductivity. In still further embodiments, the second coating is deposited onto the substrate using electroplating, physical vapor deposition (PVD) or chemical vapor deposition (CVD). In additional embodiments, the first coating is selected from the group consisting of a metal, a material having metallic properties, a metal compound, a metallic compound, a metal alloy, metal carbide and metal boride. In some embodiments, the second coating is selected from the group consisting of a metal, a material having metallic properties, a metal compound, a metallic compound, a metal alloy, metal carbide and metal boride. In further embodiments, the second coating comprises at least one of gold, silver, platinum, palladium, rhodium, ruthenium and an alloy of any of the foregoing. In still further embodiments, the second coating is a galvanic coating.

In some embodiments, the present invention further comprises washing the coated jewelry article or the coated component of the jewelry article. In further embodiments, the coated jewelry article, coated component of the jewelry article or coated jewelry item exhibits a non-gray color or luster. In other embodiments, the coated jewelry article, coated component of the jewelry article or coated jewelry item substantially retain the color of the second coating. In still further embodiments, the jewelry article, component of the jewelry article or jewelry item comprises at least one of tungsten carbide, chrome, chromium, cobalt chrome or cobalt chromium. In additional embodiments, the coated jewelry article, coated component of the jewelry article or coated jewelry item comprises at least one layer of tungsten carbide, chrome, chromium, cobalt chrome or cobalt chromium. In some embodiments, the coated jewelry article, coated component of the jewelry article or coated jewelry item comprises at least one layer of steel, 316 stainless steel, nickel, nitinol, zirconium, cobalt, chrome, chromium, titanium-zirconium (TiZi), titanium-niobium-zirconium (TiNiZi) and an alloy of any of the foregoing. In further embodiments, the present invention relates to a method for making a jewelry ring comprising a substrate, a first coating of a metal, a material having metallic properties, a metal compound, a metallic compound, a metal alloy, metal carbide and metal boride, and an external metal or metallic coating, the method comprising cutting, pressing, molding, casting, striking, extruding, sintering and/or shaping the substrate into a ring shape; depositing the first coating onto the substrate; and depositing the external metal or metallic coating onto the first coating.

A method for making a jewelry ring comprising a substrate, a first coating of a metal, a material having metallic properties, a metal compound, a metallic compound, a metal alloy and a metal carbide, and an external metallic coating is additionally provided. The method comprises cutting, pressing, molding, casting, striking, extruding, sintering and/or shaping the substrate into a ring shape; depositing the first coating onto the substrate; and depositing the external metallic coating onto the first coating.

In a method for making a jewelry ring, according to the present disclosure, the cutting, pressing, molding, casting, striking, extruding, sintering and/or shaping of the substrate can utilize any process known in the art, for example using a vacuum arc furnace, plasma hearth melting, induction skull melting, free smithing, wire electric discharge machining (EDM), sink EDM, CNC lathe, and/or any polishing or engraving method known. Heat treatments may also be performed to impart desired characteristics to the ring.

In various embodiments, the first coating is deposited onto the substrate by physical vapor deposition or chemical vapor deposition. In additional embodiments, the external metallic coating is deposited onto the first coating using any known deposition technique, such as, for example, vapor deposition, PVD or CVD. Where a hard surface is desired, for example for an article that is subject to extensive wear, such as a portion of a picture frame, a paperweight, or a portion of a piece of furniture (e.g., an inlay) that may be abraded during use, this process provides a surface that is resistant to deformation and wear.

The present disclosure describes jewelry articles and coated components of jewelry articles as well as methods for producing the same. The articles and components produced in the context of the present disclosure advantageously comprise at least two coatings each comprising a metal, metal alloy, metalloid or compound exhibiting metallic or metalloid-like properties. In some embodiments, the first coating decreases the deformation and/or physical degradation of the jewelry article and/or coated component of a jewelry article. In some embodiments, the second coating advantageously increases the robustness, hardness and sustainability of the jewelry article and/or coated component of a jewelry article. In the context of the present invention, it is intended that the "hardness" of the jewelry article and/or coated component of a jewelry article may be determined using a standard measure for hardness, including but not limited to the Mohs scale of hardness. See, e.g. Gupta, Chemical Metallurgy: Principles and Practice, Wiley-VCH, 2003.

Figure 35:
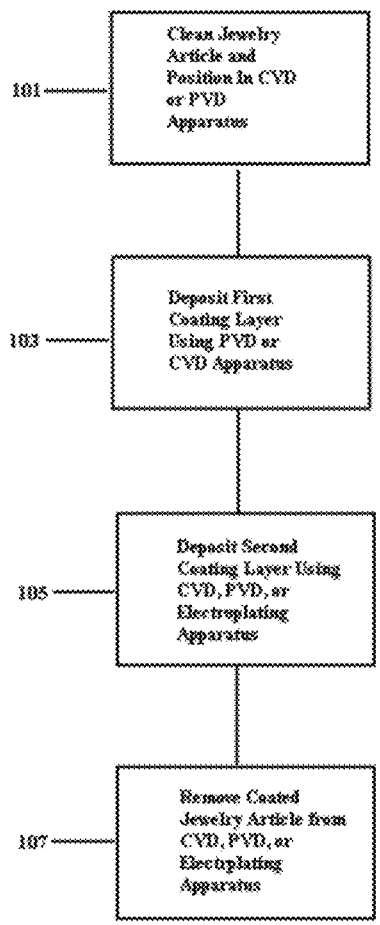
FIG. 35 shows a schematic for producing a coated jewelry article in accordance with an illustrative embodiment.

The process is shown in FIG. 35. In accordance with the present disclosure, as shown in step 101, the articles and components are first cleaned in a mild detergent solution with the aid of an ultrasonic cleaner to remove all grease and manufacturing residue. The articles and components are then placed in a rack special designed for optimal exposure in a PVD machine. Specifically, the hooks affixed to the rack are designed such that they exhibit minimal contact with the inside surface of the articles and components to avoid "shading," a defect that occurs when the PVD substrate remains in the same location and the hook used to hold the substrate in covers or occludes that area from proper coverage of the deposition layer. As shown in step 103, the articles and components are next run through a deposition process, such as a PVD or CVD process to deposit a first coating. In some embodiments, the methods of the present disclosure utilize a dual layer PVD process, which uses a multi-target PVD machine that allows for uninterrupted movement from one deposition layer to another without interruption of the vapor deposition cycle, which minimizes the risk of poor adhesion of the deposited film to the substrate. In some embodiments, the first coating is a pure chrome (chromium) deposit applied that measures approximately 0.1 microns in thickness under a vacuum in an inert atmosphere, such as argon gas. As shown in step 105, the first coated articles and components are next run through a second process, either a CVD, PVD or electroplating process, the selection may depend, for example, on the materials used, to deposit the second coating. In some embodiments, the second layer is applied during the second half of the PVD cycle as a cobalt-chrome alloy (cobalt-chromium) deposition layer made up of approximately 60% cobalt, approximately 35% chrome and approximately 5% other compounds, including but not limited to carbon, manganese, silicon, phosphorus, sulfur, molybdenum, nickel and alloys thereof. The second layer is deposited under an inert atmosphere at a thickness of approximately 0.2 microns. As shown in step 107, after deposition of the second coating the coated articles and components are removed from the PVD, CVD or electroplating equipment, and are then may be rinsed and packaged.

Figure 34:
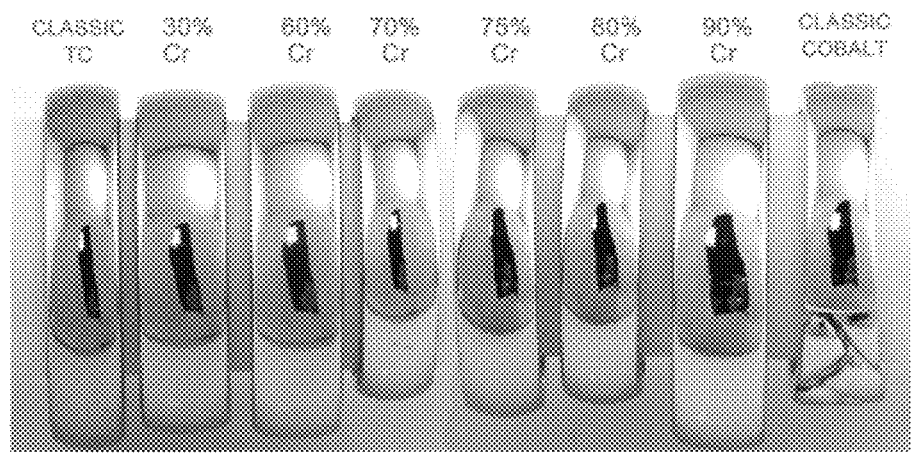
FIG. 34 shows a comparison between the appearance of varying percent compositions of chrome-steel (chromium-steel) alloys in the second coating of rings produced in accordance with the present disclosure, as well as rings essentially comprising tungsten-carbide alloy ("classic TC") or cobalt chrome alloy ("classic cobalt").

The articles and components produced in accordance with the present disclosure may comprise varying percentages of metals, materials having metallic properties, metal and/or metallic compounds, metal alloys and metal carbides. In some embodiments, as shown in FIG. 33 and FIG. 34, the articles and components may comprise chrome:stainless steel (chromium:stainless steel) ratios including but not limited to 30:70, 60:40, 70:30, 75:25, 80:20 and 90:10. In further embodiments, additional compounds, including but not limited to carbon, manganese, silicon, phosphorus, sulfur, molybdenum, nickel and alloys thereof, may comprise the articles and components produced in accordance with the present disclosure. For example, a jewelry article comprising a chrome:stainless steel ratio of 90:10 may, in some embodiments, comprise about 0.003% carbon, about 0.2% manganese, about 0.1% silicon, about 0.005% phosphorus, about 0.003% sulfur, about 1.7% chrome (chromium), about 0.25% molybdenum, about 1.2% nickel and about 6.5% iron.

Described herein are articles having two or more metallic coatings. In various embodiments, the first metallic coating provides a substrate for depositing or electroplating the second, external metallic coating.

Particularly suitable external metallic coatings for these articles are any material that can be electroplated or vapor deposited onto the first coating. In some embodiments, the external metallic coating comprises a material that imparts an attractive coloration to the article, for example platinum, rhodium, palladium, ruthenium, gold, a gold alloy, silver, a silver alloy, zirconium, tungsten nitride, tungsten carbide, or chrome or one of the materials described above. In particular embodiments, the external metallic coating modifies the luster of the article.

For example, one specific embodiment of a ring comprises a tungsten carbide substrate, a chromium first coating, and a rhodium external metallic coating.

The external metallic coating can be any coating appropriate for the metallic article. Where a hard surface is desired, for example for an article that is subject to extensive wear, such as a belt buckle, a picture frame, a paperweight, or a portion of a piece of furniture (e.g., an inlay) that may be abraded during use, the external metallic coating can be a hard material such as TiAlN, TiN, or TiB2. In other embodiments, the external metallic coating comprises a material that enhances the luster and/or imparts an attractive coloration to the article, including but not limited to titanium nitride (TiN), titanium(2) nitride (Ti2N), titanium carbonitride (TiCN), titanium-aluminum nitride (TiAlN), titanium-aluminum carbo-nitride (TiAlCN), chromium nitride (CrN), zirconium nitride (ZrN), chromium-titanium nitride (CrTiN), aluminum-titanium nitride (AlTiN), aluminum-titanium-chromium nitride (AlTiCrN), tungsten nitride (WN), titanium diboride (TiB2), tungsten carbide, cobalt, tungsten, titanium, titanium carbide, zirconium, tantalum, rhodium, gold, silver, platinum, palladium, iridium, iron, stainless steel, cobalt chrome, cobalt chromium, nickel, nitinol, aluminum, aluminum carbide, vanadium, ruthenium, copper, zinc, tin, German silver, niobium, molybdenum, hafnium, rhenium, chromium, a steel alloy, gold nitride, silver nitride, aluminum nitride, vanadium nitride, tantalum nitride, chromium carbide, zirconium carbide, tantalum carbide, cobalt chrome molybdenum and combinations and allows of each of the foregoing.

FIGS. 31 and 32 provide a transverse cutout (FIG. 31) and a longitudinal cross-section (FIG. 32) of a finger ring 10 in accordance with some embodiments. In these embodiments, the substrate 12 is coated with a first coating 14 and an external metallic coating 16. In the figures, the thicknesses of the first coating 14 and the external metallic coating 16 are not necessarily drawn to scale.

Definitions

In the description herein, a number of terms are used. In order to provide a clear and consistent understanding of the specification and claims, the following definitions are provided:

As used herein, the singular forms "a", "an" and "the" are intended to include the plural forms as well, unless the context clearly indicates otherwise. Additionally, the use of "or" is intended to include "and/or", unless the context clearly indicates otherwise.

Electroplating: Refers to the process of moving metal ions in solution via an electrical or conductive field to coat an object. This process is used for the deposition of a material, such as a metal or metal alloy, for imparting a desirable property onto the object, including but not limited to resistance to scratching, corrosivity, chipping and dulling.

Jewelry: As used herein, "jewelry" refers to personal adornments worn for ornament or utility. Jewelry includes but is in no way limited to rings, ornamental rings, engagement rings, toe rings, watches, watchcases, bracelets, necklaces, chains, pendants, charms, armlets, brocades, pins, clips, hairclips, carved beads, fobs, ornamental piercings, earrings, nose rings, body jewelry, dog tags, amulets, bangle bracelets, cuff bracelets, link bracelets, cuff links, tie clips, tie pins, tie tacks, key chains, money clips, cell phone charms, cutlerys, writing utensils, pens, charms, signet rings, class rings, friendship rings or purity rings.

Layering: As used herein, "layering" refers to a process wherein a composition, advantageously a metallic composition, is applied to a substrate optionally comprising zero, one, or more layered composition(s). In some embodiments, layering is performed using a machine or instrument capable of performing a vapor deposition or electroplating process.

Luster: As used herein, "luster" refers to the way light interacts with the surface and visual appearance of a substance. In some embodiments, the substance is a jewelry article. In further embodiments, the substance is a metallic substance that is optionally capable of being manipulated.

Manipulable: As used herein, a substance that is "manipulable" is one capable of being patterned, surface modulated, etched, carved, faceted, cut, pressed, molded, cast, stricken, extruded, inlayed, shaped, polished, grinded, scraped, rubbed, sanded, buffed and/or filed. In preferred embodiments, the substance is a substrate for use in the present disclosure.

Metal Alloy: As used herein, a "metal alloy" is a mixture of two or more metals or of substances with metallic properties. In some embodiments, metal alloys for use in the present disclosure comprise at least one transition metal including but in no way limited to tungsten, cobalt, tungsten, titanium, zirconium, tantalum, aluminum, rhodium, gold, silver, platinum, palladium, iridium, iron, stainless steel, nickel, niobium, vanadium, ruthenium, copper, zinc, tin, molybdenum, hafnium and rhenium. In certain embodiments, the metal alloy is selected from a gold alloy, silver alloy, platinum alloy, palladium alloy and iron alloy. In further embodiments, a stainless steel alloy is selected from types 18-8, 304 and 316.

Metal Carbide: A "metal carbide" is a compound comprising at least one transition metal or substance with metallic properties and carbon or carbon containing chemical group. In certain embodiments, metal carbides for use in the present disclosure include but are in no way limited to tungsten carbide, tungsten-copper carbide, tungsten-silver-copper carbide, titanium carbide, zirconium carbide, niobium carbide, hafnium carbide, vanadium carbide, tantalum carbide, chromium carbide, aluminum carbide and molybdenum carbide.

Metal Nitride: A "metal nitride" is a compound comprising at least one transition metal or substance with metallic properties and nitrogen or nitrogen containing chemical group. In some embodiments, metal nitrides for use in the present disclosure include but are in no way limited to titanium nitride, chromium nitride, zirconium nitride, tungsten nitride, gold nitride, silver nitride, aluminum nitride, vanadium nitride, tantalum nitride, aluminum-titanium-nitride, titanium-aluminum-nitride and titanium-carbon-nitride.

Metal Salt: A "metal salt" is a compound comprising at least one cationic, transition metal or cation with metallic properties and an anion. In some embodiments, metal salts for use in the present disclosure comprise at least one transition metal including but in no way limited to tungsten, cobalt, titanium, zirconium, tantalum, aluminum, rhodium, gold, silver, platinum, palladium, iridium, iron, stainless steel, cobalt, chromium, aluminum, vanadium, ruthenium, copper, zinc, tin, nickel, niobium, molybdenum, rhenium and hafnium.

Metal Sulfide: A "metal sulfide" is a compound comprising at least one transition metal or substance with metallic properties and sulfur or sulfur containing chemical group.

Polishing: As used herein, "polishing" refers to the process of smoothing and/or increasing the luster of a surface by the application of physical or chemical action or agent to a sub stance.

Vapor Deposition: Refers to a general process for the deposition of compounds onto a designated substrate. In preferred embodiments, the use of vapor deposition in the context of the present disclosure refers to chemical vapor deposition (CVD), physical vapor deposition (PVD), plasma enhanced chemical vapor deposition (PECVD), diamond CVD coating, ionized physical vapor deposition (IPVD), sputtering and thermal evaporation. In certain embodiments, vapor deposition is optionally used to add a first and/or a second layer to a substrate used to produce a jewelry article. In preferred embodiments, the first and/or second layer comprises a metal coating comprising one or more of tungsten, cobalt, tungsten, titanium, zirconium, tantalum, aluminum, rhodium, gold, silver, platinum, palladium, iridium, iron, stainless steel, nickel, niobium, vanadium, ruthenium, copper, zinc, tin, hafnium, molybdenum and rhenium. In certain embodiments, the metal alloy is selected from a gold alloy, silver alloy, platinum alloy, palladium alloy and iron alloy. In further embodiments, a stainless steel alloy is selected from types 18-8, 304 and 316.

Other embodiments within the scope of the claims herein will be apparent to one skilled in the art from consideration of the specification or practice of the invention as disclosed herein. It is intended that the specification be considered exemplary only, with the scope and spirit of the invention being indicated by the claims.

In view of the above, it will be seen that the several advantages of the invention are achieved and other advantages attained.

As various changes could be made in the above methods and compositions without departing from the scope of the invention, it is intended that all matter contained in the above description and shown in the accompanying drawings shall be interpreted as illustrative and not in a limiting sense.

All references cited in this specification are hereby incorporated by reference. The discussion of the references herein is intended merely to summarize the assertions made by the authors and no admission is made that any reference constitutes prior art. Applicants reserve the right to challenge the accuracy and pertinence of the cited references.

Other embodiments within the scope of the claims herein will be apparent to one skilled in the art from consideration of the specification or practice of the invention as disclosed herein. It is intended that the specification be considered exemplary only, with the scope and spirit of the invention being indicated by the claims.

In view of the above, it will be seen that the several advantages of the invention are achieved and other advantages attained.

As various changes could be made in the above methods and compositions without departing from the scope of the invention, it is intended that all matter contained in the above description and shown in the accompanying drawings shall be interpreted as illustrative and not in a limiting sense.

All references cited in this specification are hereby incorporated by reference. The discussion of the references herein is intended merely to summarize the assertions made by the authors and no admission is made that any reference constitutes prior art. Applicants reserve the right to challenge the accuracy and pertinence of the cited references.

Other embodiments within the scope of the claims herein will be apparent to one skilled in the art from consideration of the specification or practice of the disclosure as disclosed herein. It is intended that the specification be considered exemplary only, with the scope and spirit being indicated by the claims.

In view of the above, it will be seen that the several advantages are achieved and other advantages attained. As various changes could be made in the above methods and compositions without departing from the scope of the disclosure, it is intended that all matter contained in the above description shall be interpreted as illustrative and not in a limiting sense.

All references cited in this specification are hereby incorporated by reference. The discussion of the references herein is intended merely to summarize the assertions made by the authors and no admission is made that any reference constitutes prior art. Applicants reserve the right to challenge the accuracy and pertinence of the cited references.

Any numbers expressing quantities of ingredients, constituents, reaction conditions, and so forth used in the application are to be understood as being modified in all instances by the term "about". Notwithstanding that the numerical ranges and parameters setting forth, the broad scope of the subject matter presented herein are approximations, the numerical values set forth are indicated as precisely as possible. None of the features recited herein should be interpreted as invoking 35 U.S.C. § 112, 6, unless the term "means" is explicitly used.

The invention claimed is:

1. A jewelry item, comprising:
an under component having a first proximal end, a first distal end, a first outer surface, a first inner surface, and a groove, the under component comprising a first cylindrical portion extending from the first proximal end to the first distal end, wherein the first outer surface includes a first upper portion and a first lower portion, wherein the under component includes a first step defining a first transition between the first upper portion and the first lower portion, wherein the first step extends below the first lower portion of the first outer surface to define the groove, wherein the groove begins at the first transition and extends toward the first distal end, wherein the first upper portion begins at the first proximal end and defines a first rim, the first rim having a first proximal edge and a first distal edge, the first rim extending distally from the first proximal end, the first distal edge of the first rim positioned at the first transition between the first upper portion and the first lower portion, wherein the first lower portion extends from the groove to the first distal end of the first cylindrical portion;

an over component having a second proximal end, a second distal end, a second outer surface and a second inner surface, the over component comprising a second cylindrical portion extending from the second proximal end to the second distal end, wherein the second outer surface includes a second upper portion and a second lower portion, wherein the over component includes a second step defining a second transition between the second upper portion and the second lower portion, wherein the second upper portion begins at the second proximal end and defines a second rim, the second rim having a second proximal edge and a second distal edge, the second rim extending distally from the second proximal end, the second distal edge of the second rim positioned at the second transition between the second upper portion and the second lower portion, wherein the second lower portion extends from the second transition to the second distal end of the second cylindrical portion, wherein the first distal end of the under component extending to a position flush with the second distal edge of the second rim of the over component;

the second distal end of the over component extending to a position flush with the first distal edge of the first rim of the under component; and a central component, wherein the central component is coupled to the over component, and the over component is coupled to the under component.

2. The jewelry item of claim 1, wherein the coupling is accomplished using friction.

3. The jewelry item of claim 1, wherein the coupling is accomplished using a bonding agent.

4. The jewelry item of claim 3, wherein the bonding agent is an adhesive, a glue, or a retaining compound.

5. The jewelry item of claim 3, wherein the bonding agent is a solder.

6. The jewelry item of claim 3, wherein the coupling is accomplished using a bonding agent together with friction.

7. The jewelry item of claim 1, wherein the second cylindrical portion of the over component includes a gap extending below the inner surface and circumferentially around an interior of the second cylindrical portion of the over component.

8. The jewelry item of claim 7, wherein the gap in the over component provides a space for positioning of a bonding agent when the under component, the over component and the central component are assembled.

9. The jewelry item of claim 7, further comprising a gasket.

10. The jewelry item of claim 9, wherein the gasket is configured to fit substantially within the groove in the under component or the over component.

11. The jewelry item of claim 10, wherein the gasket is configured to fit substantially within the groove in the under component and the groove in the over component when the under component, the over component and the central component are assembled.

12. The jewelry item of claim 9, wherein the gasket is an o-ring gasket.

13. The jewelry item of claim 1, wherein a friction reducing agent is applied to at least one of the second inner surface of the over component, the second outer surface of the over component, the first outer surface of the under component, or a third inner surface of the central component prior to the coupling.

14. The jewelry item of claim 13, wherein the friction reducing agent is a bonding agent.

15. The jewelry item of claim 1, wherein at least one of the over component, the under component, or the central component is formed by sintering.

16. The jewelry item of claim 1, wherein at least one of the over component, the under component, or the central component includes a single coating.

17. The jewelry item of claim 1, wherein at least one of the over component, the under component, or the central component includes a plurality of coatings.

18. The jewelry item of claim 1, wherein the coupling is accomplished using threading.

19. The jewelry item of claim 1, wherein at least one of the second inner surface of the over component, the second outer surface of the over component, the first outer surface of the under component, or a third inner surface of the central component is roughened prior to the coupling.

20. The jewelry item of claim 1, wherein at least one of the second inner surface of the over component, the second outer surface of the over component, the first outer surface of the under component, or a third inner surface of the central component is polished or lubricated prior to the coupling.

21. The jewelry item of claim 1, wherein the groove extends circumferentially around the first cylindrical portion.

22. The jewelry item of claim 1, wherein the groove extends from the first distal edge of the first rim.

23. A jewelry ring, comprising:

an under component comprising a first cylindrical portion having a first proximal end, a first distal end, a first inner surface, a substantially smooth first outer surface, wherein the first cylindrical portion extends from the first proximal end to the first distal end, wherein the first outer surface includes a first upper portion and a first lower portion, wherein the under component includes a first step defining a first transition between the first upper portion and the first lower portion, wherein the first lower portion of the first outer surface begins at the first transition and extends to the first distal end, wherein the first upper portion begins at the first proximal end and defines a first rim, the first rim having a first proximal edge and a first distal edge, the first rim extending distally from the first proximal end, the first distal edge of the first rim positioned at the first transition between the first upper portion and the first lower portion;

an over component comprising a second cylindrical portion having a second proximal end, a second distal end, a substantially smooth second inner surface, and a second outer surface, wherein the second cylindrical portion extends from the second proximal end to the second distal end, wherein the second outer surface includes a second upper portion and a second lower portion, wherein the over component includes a second step defining a second transition between the second upper portion and the second lower portion, wherein the second upper portion begins at the second proximal end and defines a second rim, the second rim having a second proximal edge and a second distal edge, the second rim extending distally from the second proximal end, the second distal edge of the second rim positioned at the second transition between the second upper portion and the second lower portion, wherein the second lower portion extends from the second transition to the second distal end of the second cylindrical portion, wherein the first distal end of the under component extending to a position flush with the second distal edge of the second rim of the over component;

the second distal end of the over component extending to a position flush with the first distal edge of the first rim of the under component; and a central component, wherein the central component is coupled to the over component, and the over component is coupled to the under component.

24. The jewelry ring of claim 23, wherein the over component is coupled to the under component using a slip-fit method using a bonding agent.

25. The jewelry ring of claim 24, wherein at least one of the first cylindrical portion includes a roughened first outer surface or the second cylindrical portion includes a roughened second inner surface.

26. The jewelry ring of claim 23, wherein the central component is bonded to the over component, and the over component is bonded to the under component using a chemical bonding agent.

27. A jewelry item, comprising:

an under component having a first proximal end and a first distal end, the under component comprising a first cylindrical portion extending from the first proximal end to the first distal end, wherein the first proximal end includes a first rim, the first rim having a first proximal edge and a first distal edge, the first rim extending laterally from the first cylindrical portion, the first distal edge of the first rim positioned flush with a third proximal end of the first cylindrical portion and the first rim extending proximally from the third first proximal end of the cylindrical portion, wherein the first cylindrical portion includes a groove positioned at an outer surface of the third proximal end of the first cylindrical portion;

an over component having a second proximal end and a second distal end, the over component comprising a second cylindrical portion extending from the second proximal end to the second distal end, wherein the second proximal end includes a second rim, the second rim having a second proximal edge and a second distal edge, wherein the second distal edge of the second rim positioned flush with a fourth proximal end of the second cylindrical portion, wherein the second distal end of the under component extending to a position flush with the second proximal edge of the second rim of the over component;

the second distal end of the over component extending to a position flush with a first distal edge of the first rim of the under component; and a central component, wherein the central component is coupled to the over component, and the over component is coupled to the under component, wherein the coupling is accomplished using a bonding agent, and wherein the bonding agent is a solder.

28. A jewelry item, comprising:

an under component having a first proximal end and a first distal end, the under component comprising a first cylindrical portion extending from the first proximal end to the first distal end, wherein the first proximal end includes a first rim, the first rim having a first proximal edge and a first distal edge, the first rim extending laterally from the first cylindrical portion, the first distal edge of the first rim positioned flush with a third proximal end of the first cylindrical portion and extending proximally from the third proximal end of the cylindrical portion, wherein the first cylindrical portion includes a groove positioned at an outer surface of the third proximal end of the first cylindrical portion;

an over component having a second proximal end and a second distal end, the over component comprising a second cylindrical portion extending from the second proximal end to the second distal end, wherein the second proximal end includes a second rim, the second rim having a second proximal edge and a second distal edge, wherein the second distal edge of the second rim positioned flush with a fourth proximal end of the second cylindrical portion, wherein the second distal end of the under component extending to a position flush with the second proximal edge of the second rim of the over component;

the second distal end of the over component extending to a position flush with a first distal edge of the first rim of the under component; and a central component, wherein the central component is coupled to the over component, and the over component is coupled to the under component, wherein a friction reducing agent is applied to at least one of an inner portion of the over component, an outer portion of the over component, an outer portion of the under component, or an inner portion of the central component prior to the coupling, and wherein the friction reducing agent is a bonding agent.

* * * * *